US009120514B2

(12) United States Patent
Kile

(10) Patent No.: US 9,120,514 B2
(45) Date of Patent: *Sep. 1, 2015

(54) DUAL PORT LUBRICATING OIL MONITORING AND MAINTENANCE CAP FOR A ROLLER OF A TRACKED VEHICLE

(71) Applicant: Ronald J. Kile, Rosalia, AZ (US)

(72) Inventor: Ronald J. Kile, Rosalia, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/305,921

(22) Filed: Jun. 16, 2014

(65) Prior Publication Data

US 2014/0292067 A1    Oct. 2, 2014

Related U.S. Application Data

(63) Continuation-in-part of application No. 14/197,977, filed on Mar. 5, 2014, now Pat. No. 8,833,872, which is a continuation of application No. 13/011,630, filed on Jan. 21, 2011, now Pat. No. 8,684,474.

(51) Int. Cl.
*B62D 55/092* (2006.01)
*F16N 19/00* (2006.01)
*B65D 41/02* (2006.01)

(52) U.S. Cl.
CPC .............. *B62D 55/092* (2013.01); *B65D 41/02* (2013.01); *F16N 19/00* (2013.01)

(58) Field of Classification Search
CPC .............................. B62D 55/092; B62D 41/02
USPC ............ 305/117, 119, 136; 301/108.1, 108.2, 301/108.3
See application file for complete search history.

(56) References Cited

U.S. PATENT DOCUMENTS

| | | | | | |
|---|---|---|---|---|---|
| 2,723,168 | A | * | 11/1955 | Carroll | 384/380 |
| 3,316,022 | A | * | 4/1967 | Isenbarger | 301/108.2 |
| 3,331,638 | A | * | 7/1967 | Fruth | 301/108.2 |
| 3,917,362 | A | * | 11/1975 | Stedman | 384/418 |
| 4,073,540 | A | * | 2/1978 | Jackowski | 301/108.3 |
| 4,355,988 | A | * | 10/1982 | Klaus et al. | 474/91 |
| 5,066,071 | A | * | 11/1991 | Kinser | 301/108.2 |
| 5,195,807 | A | * | 3/1993 | Lederman | 301/108.1 |
| 6,203,114 | B1 | * | 3/2001 | Ehrlich | 301/124.1 |
| 6,203,144 | B1 | | 3/2001 | Zhang | |
| 6,485,110 | B1 | * | 11/2002 | Lasko et al. | 301/108.2 |

* cited by examiner

*Primary Examiner* — S. Joseph Morano
*Assistant Examiner* — Jean Charleston
(74) *Attorney, Agent, or Firm* — Michael W. Goltry; Robert A. Parsons; Parsons & Goltry

(57) ABSTRACT

A roller of a tracked vehicle includes a lubricating oil reservoir having an open end closed by a sealing body having an outer face and an opposed inner face facing the reservoir, and which is transparent to provide visual access into the reservoir through the open end for lubricating oil level and quality monitoring purposes. A depression with a raised rim is formed in the outer face of the sealing body, and a port is formed in the sealing body, which extends through the sealing body at the depression from the outer face to the inner face of the sealing body. A removable plug is applied to and closes the port, and is positioned in the depression and extends outwardly from the outer face of the sealing body no further than the raised rim isolating the plug from shearing forces across the outer face of the sealing body.

23 Claims, 43 Drawing Sheets

DUAL PORT LUBRICATING OIL MONITORING AND MAINTENANCE CAP FOR A ROLLER OF A TRACKED VEHICLE

FIELD OF THE INVENTION

The present invention relates generally to tracked vehicles and, more particularly, to maintenance caps used to cap oil reservoirs of rollers of tracked vehicles.

BACKGROUND OF THE INVENTION

A crawler-type or tracked vehicle is normally supported and propelled by an undercarriage assembly having an endless track entrained about a drive roller or sprocket, a front idler roller, a rear idler roller, and a series of track rollers. The drive roller or sprocket is driven by an engine of the work vehicle which, in turn, causes the endless track to be advanced around each of the front and rear idler rollers as well as the track rollers to advance the work vehicle.

For an endless track to function properly, it must be properly tensioned around the several rollers, and the several rollers must be properly maintained to ensure they roll with the least amount of friction while supporting the weight of the vehicle. Tracked vehicles are normally considerably heavy. As a result, the rollers are prone to generate substantial frictional heat as they are made to roll as the tracked vehicle advances. Excessive frictional heat in the rollers can lead to roller failure and expensive and time-consuming repair costs. Limiting frictional heat in rollers is accomplished with a lubricating oil, which is applied to and maintained by reservoirs formed in the rollers. The lubricating oil must be periodically replenished, and periodically replaced to ensure the oil functions properly, namely, that it reduces roller friction and draws and dissipates heat away from the rollers. Contaminated or dirty oil and reduced oil levels impede the ability of the oil to reduce friction and dissipate heat. Accordingly, proper oil maintenance in rollers is essential for proper operation of the tracked vehicle and to limit unnecessary and time-consuming roller repairs.

SUMMARY OF THE INVENTION

According to the principle of the invention, a roller of a tracked vehicle is formed with a lubricating oil reservoir having an open end closed by a cap including a sealing body that spans the open end of the reservoir. The sealing body has an outer face facing away from the open end and an opposed inner face facing the open end to the lubricating oil reservoir. The sealing body is transparent to provide visual access therethrough into the lubricating oil reservoir through the open end for lubricating oil level and quality monitoring purposes. A depression with a raised rim formed in the outer face of the sealing body. A lubricating oil maintenance port is formed in the sealing body. The port is located at the depression. The port extends through the sealing body at the depression from the outer face of the sealing body to the inner face of the sealing body. A plug is movable between an open position detached from and opening the port to provide access through the port to the reservoir through the open end of the reservoir for lubricating oil replacement and replenishment purposes, and a closed position applied to and closing the port. In the second position of the plug applied to and closing the port, the plug is positioned in the depression and extends outwardly from the outer face of the sealing body no further than the raised rim isolating the plug from shearing forces across the outer face of the sealing body. A cap gasket is applied between the cap and the open end of the reservoir providing a fluid-impervious seal between the cap and the open end of the reservoir. A plug gasket is applied to the plug, and in the second position of the plug applied to and closing the port the plug gasket is applied between the plug and the port providing a fluid-impervious seal between the plug and the port. The depression is formed in the sealing body at a central location relative to the open end of the reservoir. The cap is secured to the open end of the reservoir with fasteners. In a preferred embodiment, the fasteners are bolts. In another embodiment, the cap is threaded onto the open end of the reservoir. In a further and more specific aspect, the cap is formed with a threaded skirt that threads onto the open end of the reservoir.

According to the principle of the invention, a roller of a tracked is formed with a horizontal lubricating oil reservoir having a vertical open end closed by a cap including a sealing body that spans the open end of the reservoir. The sealing body has an outer face facing away from the open end and an opposed inner face facing the open end to the lubricating oil reservoir. A depression with a raised rim is formed in the outer face of the sealing body. A lubricating oil maintenance port is formed in the sealing body. The port is formed at the depression. The port extends through the sealing body at the depression from the outer face of the sealing body to the inner face of the sealing body. A plug is movable between an open position detached from and opening the port to provide access through the port to the reservoir through the open end for lubricating oil replacement and replenishment purposes, and a closed position applied to and closing the port. In the second position of the plug applied to and closing the port, the plug is positioned in the depression and extends outwardly from the outer face of the sealing body no further than the raised rim isolating the plug from vertical shearing forces across the outer face of the sealing body. In a particular embodiment, the plug is in the closed position applied to and closing the port, a volume of a lubricating oil applied to reservoir and extends upwardly into the reservoir along the inner face of the sealing body to level just below the port, and the sealing body is transparent to provide visual access therethrough into the lubricating oil reservoir through the open end for lubricating oil level and quality monitoring purposes. A cap gasket is applied between the cap and the open end of the reservoir providing a fluid-impervious seal between the cap and the open end of the reservoir. A plug gasket is applied to the plug, and in the second position of the plug applied to and closing the port the plug gasket is applied between the plug and the port providing a fluid-impervious seal between the plug and the port. The depression is formed in the sealing body at a central location relative to the open end of the reservoir. The cap is secured to the open end of the reservoir with fasteners. In a preferred embodiment, the fasteners are bolts. In another embodiment, the cap is threaded onto the open end of the reservoir. In a further and more specific aspect, the cap is formed with a threaded skirt that threads onto the open end of the reservoir.

A cap for closing an open end of a reservoir consists of a sealing body including a perimeter extremity sealingly engagable to the open end of the reservoir in a closure position of the sealing body spanning the open end of the reservoir. The sealing body has an outer face to face away from the open end of the reservoir in the closure position of the sealing body and an opposed inner face to face the open end of the reservoir in the closure position of the sealing body. The sealing body is transparent to provide visual access therethrough into the reservoir through the open end in the closure position of the sealing body for reservoir contents monitoring and inspection purposes. There is a depression with a raised rim formed in the outer face of the sealing body. A port is formed in the sealing body. The port is formed at the depression. The port extends through the sealing body at the depression from the outer face of the sealing body to the inner face of the sealing body. A plug is movable between an open position detached from and opening the port, and a closed position applied to and closing the port. In the second position of the plug applied to and closing the port, the plug is positioned in the depression and extends outwardly from the outer face of the sealing body no further than the raised rim isolating the plug from shearing forces across the outer face of the sealing body. A cap gasket is positionable between the perimeter extremity of the sealing body and the open end of the reservoir in the closure position of the sealing body for providing a fluid-impervious seal between the closure body and the open end of the reservoir in the closure position of the sealing body. A plug gasket is positionable between the plug and the port in the closed position of the plug for providing a fluid impervious seal between the plug and the port in the closed position of the plug. The depression is formed in the sealing body at a central location relative to the perimeter extremity of the closure body. The perimeter extremity of the sealing body is formed with spaced-apart openings to receive fasteners for fastening the perimeter extremity of the sealing body to the open end of the reservoir in the closure position of the sealing body. In another embodiment, the perimeter extremity is formed with a threaded perimeter skirt for threading onto the open end of the reservoir in the closure position of the sealing body.

According to the principle of the invention, a reservoir has an open end closed by a sealing body. The sealing body includes a perimeter extremity engaged to the open end of the reservoir and spans the open end of the reservoir. The sealing body has an outer face facing away from the open end, an opposed inner face facing the open end to the reservoir, and a depression with a rim formed in the outer face of the sealing body proximate to the perimeter extremity. The depression extends inwardly from the rim to a drain port formed in the sealing body proximate to the perimeter extremity, and the drain port extends through the sealing body at the depression from the outer face of the sealing body to the inner face of the sealing body. A drain plug is movable between a first position detached and separated from the drain port and the sealing body so as to open the drain port to provide liquid draining therethrough from the open end of the reservoir, and a second position detachably attached to the drain port and the sealing body so as to close the drain port. In the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body proximate to the perimeter extremity. A first gasket applied between the perimeter extremity of the sealing body and the open end of the reservoir for providing a fluid-impervious seal between the sealing body and the open end of the reservoir. A second gasket is applied to the drain plug. In the second position of the drain plug, the second gasket is applied between the drain plug and the drain port providing a fluid-impervious seal between the drain plug and the drain port.

According to the principle of the invention, a cap for closing an open end of a reservoir includes a sealing body having a perimeter extremity engagable to the open end of the reservoir in a closure position of the sealing body spanning the open end of the reservoir. The sealing body has an outer face to face away from the open end of the reservoir in the closure position of the sealing body, and an opposed inner face to face the open end of the reservoir in the closure position of the sealing body, a depression with a rim formed in the outer face of the sealing body proximate to the perimeter extremity, and the depression extends inwardly from the rim to a drain port formed in the sealing body proximate to the perimeter extremity, and the drain port extends through the sealing body at the depression from the outer face of the sealing body to the inner face of the sealing body. A drain plug is movable between a first position detached and separated from the drain port and the sealing body so as to open the drain port, and a second position detachably attached to the drain port and the sealing body so as to close the drain port. In the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body. A first gasket is positionable between the perimeter extremity of the sealing body and the open end of the reservoir in the closure position of the sealing body for providing a fluid-impervious seal between the closure body and the open end of the reservoir in the closure position of the sealing body. A second gasket is positionable between the drain plug and the drain port in the second position of the drain plug for providing a fluid impervious seal between the drain plug and the drain port in the second position of the drain plug. The perimeter extremity of the sealing body is formed with spaced-apart openings to receive fasteners for fastening the perimeter extremity of the sealing body to the open end of the reservoir in the closure position of the sealing body.

According to the principle of the invention, a reservoir has an open end closed by a sealing body. The sealing body includes a perimeter extremity engaged to the open end of the reservoir and spans the open end of the reservoir. The sealing body has an outer face facing away from the open end, and an opposed inner face facing the open end to the reservoir. There is a first depression with a first rim formed in the outer face of the sealing body at a central location relative to the open end of the reservoir and the perimeter extremity. The first depression extends inwardly from the first rim to a first port formed in the sealing body at the central location, and the first port extends through the sealing body at the first depression from the outer face of the sealing body to the inner face of the sealing body. A first plug is movable between a first position detached and separated from the first port and the sealing body so as to open the first port to provide access therethrough to the reservoir, and a second position detachably attached to the first port and the sealing body so as to close the first port. In the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location. There is a second depression with a second rim formed in the outer face of the sealing body proximate to the perimeter extremity. The second depression extends inwardly from the second rim to a second port formed in the sealing body proximate to the perimeter extremity, and the second port extends through the sealing body at the second depression from the outer face of the sealing body to the inner face of the sealing body. A second plug is movable between a first position detached and separated from the second port and the sealing body so as to open the second port to provide liquid draining therethrough from the open end of the reservoir proximate to the perimeter extremity, and a second position detachably attached to the second port and the sealing body so as to close the second port. In the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity. A first gasket is applied between the sealing body and the open end of the reservoir for providing a fluid-impervious seal between the sealing body and the open end of the reservoir. A second gasket applied to the first plug. In the second position of the first plug, the second gasket is applied between the first plug and the first port providing a fluid-impervious seal between the first plug and the first port. A third gasket is applied to the second plug. In the second position of the second plug, the third gasket is applied between the second plug and the second port providing a fluid-impervious seal between the second plug and the second port.

According to the principle of the invention, a cap for closing an open end of a reservoir includes a sealing body having a perimeter extremity engagable to the open end of the reservoir in a closure position of the sealing body spanning the open end of the reservoir. The sealing body has an outer face to face away from the open end of the reservoir in the closure position of the sealing body, and an opposed inner face to face the open end of the reservoir in the closure position of the sealing body. There is a first depression with a first rim formed in the outer face of the sealing body at a central location relative to the perimeter extremity. The first depression extends inwardly from the first rim to a first port formed in the sealing body at the central location, and the first port extends through the sealing body at the first depression from the outer face of the sealing body to the inner face of the sealing body. A first plug is movable between a first position detached and separated from the first port and the sealing body so as to open the first port, and a second position detachably attached to the first port and the sealing body so as to close the first port. In the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location. There is a second depression with a second rim formed in the outer face of the sealing body proximate to the perimeter extremity. The second depression extends inwardly from the second rim to a second port formed in the sealing body proximate to the perimeter extremity, and the second port extends through the sealing body at the second depression from the outer face of the sealing body to the inner face of the sealing body. A second plug is movable between a first position detached and separated from the second port and the sealing body so as to open the second port to provide liquid draining therethrough from the open end of the reservoir proximate to the perimeter extremity, and a second position detachably attached to the second port and the sealing body so as to close the second port. In the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity. A first gasket is positionable between the perimeter extremity of the sealing body and the open end of the reservoir in the closure position of the sealing body for providing a fluid-impervious seal between the closure body and the open end of the reservoir in the closure position of the sealing body. The perimeter extremity of the sealing body is formed with spaced-apart openings to receive fasteners for fastening the perimeter extremity of the sealing body to the open end of the reservoir in the closure position of the sealing body. A second gasket is positionable between the first plug and the first port in the second position of the first plug for providing a fluid impervious seal between the first plug and the first port in the second position of the first plug. A third gasket is positionable between the second plug and the second port in the second position of the second plug for providing a fluid impervious seal between the second plug and the second port in the second position of the second plug.

According to the principle of the invention, a roller of a tracked vehicle is formed with a lubricating oil reservoir having an open end closed by a sealing body, the sealing body includes a perimeter extremity engaged to the open end of the reservoir and spans the open end of the reservoir, the sealing body has an outer face facing away from the open end, an opposed inner face facing the open end to the reservoir, a depression with a rim formed in the outer face of the sealing body proximate to the perimeter extremity, the depression extends inwardly from the rim to a drain port formed in the sealing body proximate to the perimeter extremity, and the drain port extends through the sealing body at the depression from the outer face of the sealing body to the inner face of the sealing body. A drain plug is movable between a first position detached and separated from the drain port and the sealing body so as to open the drain port to provide liquid draining therethrough from the open end of the reservoir, and a second position detachably attached to the drain port and the sealing body so as to close the drain port. In the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body proximate to the perimeter extremity. A first gasket is applied between the perimeter extremity of the sealing body and the open end of the reservoir for providing a fluid-impervious seal between the sealing body and the open end of the reservoir. A second gasket is applied to the drain plug. In the second position of the drain plug, the second gasket is applied between the drain plug and the drain port providing a fluid-impervious seal between the drain plug and the drain port.

According to the principle of the invention, a roller of a tracked vehicle is formed with a horizontal lubricating oil reservoir having a vertical open end closed by a sealing body. The sealing body includes a perimeter extremity engaged to the open end of the reservoir and spans the open end of the reservoir. The sealing body has an outer face facing away from the open end, and an opposed inner face facing the open end to the reservoir. There is a first depression with a first rim formed in the outer face of the sealing body at a central location relative to the open end of the reservoir and the perimeter extremity. The first depression extends inwardly from the first rim to a first port formed in the sealing body at the central location, and the first port extends through the sealing body at the first depression from the outer face of the sealing body to the inner face of the sealing body. A first plug is movable between a first position detached and separated from the first port and the sealing body so as to open the first port to provide access therethrough to the reservoir for lubricating oil replenishment purposes, and a second position detachably attached to the first port and the sealing body so as to close the first port. In the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location. There is a second depression with a second rim formed in the outer face of the sealing body proximate to the perimeter extremity. The second depression extends inwardly from the second rim to a second port formed in the sealing body proximate to the perimeter extremity, and the second port extends through the sealing body at the second depression from the outer face of the sealing body to the inner face of the sealing body. A second is plug movable between a first position detached and separated from the second port and the sealing body so as to open the second port to provide lubricating oil draining therethrough from the open end of the reservoir proximate to the perimeter extremity, and a second position detachably attached to the second port and the sealing body so as to close the second port. In the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity. A first gasket is applied between the sealing body and the open end of the reservoir for providing a fluid-impervious seal between the sealing body and the open end of the reservoir. A second gasket applied to the first plug. In the second position of the first plug, the second gasket is applied between the first plug and the first port providing a fluid-impervious seal between the first plug and the first port. A third gasket is applied to the second plug. In the second position of the second plug, the third gasket is applied between the second plug and the second port providing a fluid-impervious seal between the second plug and the second port.

BRIEF DESCRIPTION OF THE DRAWINGS

Referring to the drawings.

DETAILED DESCRIPTION

Figure 1A:
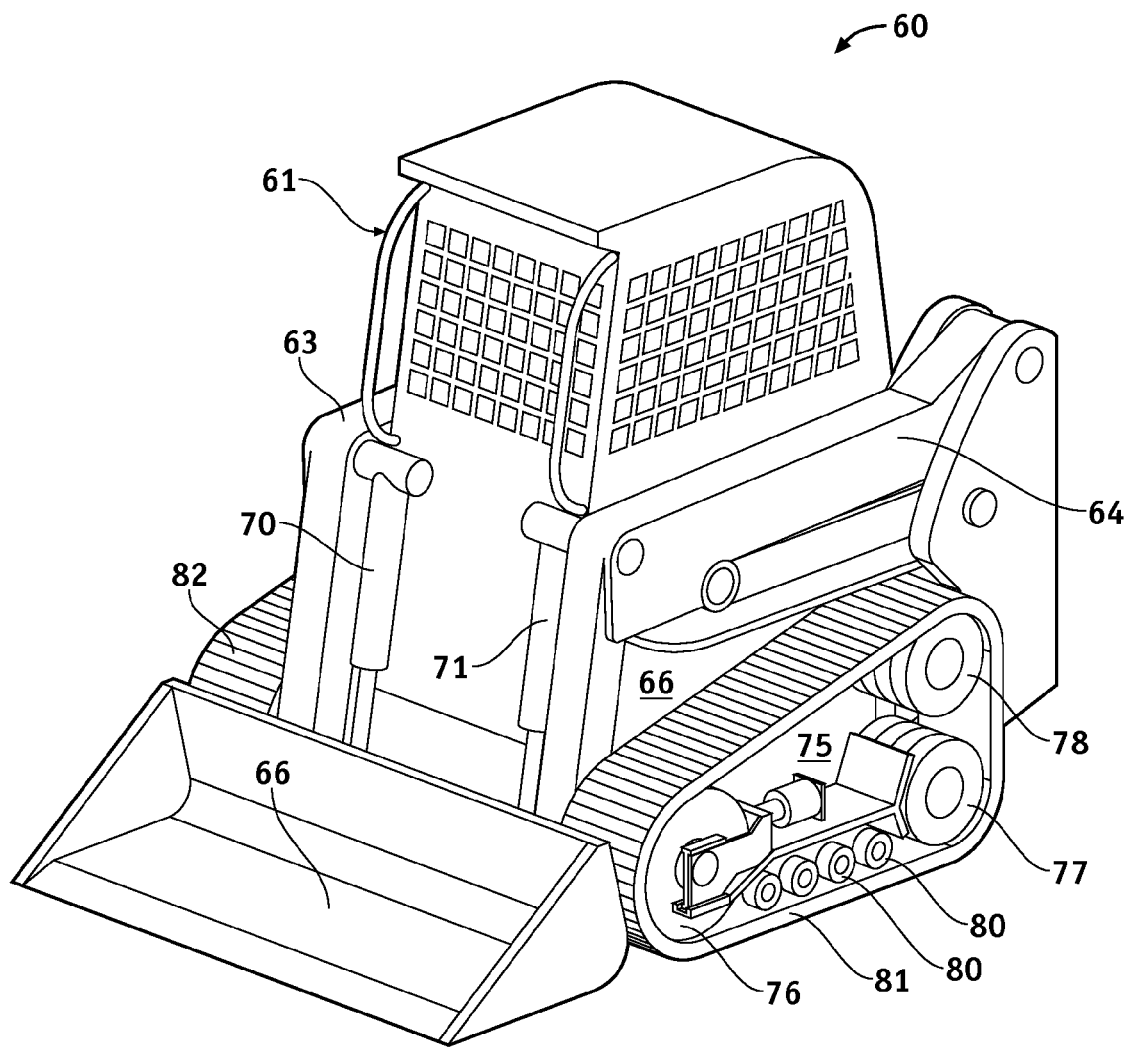
FIG. 1A is a highly generalized perspective view of a tracked vehicle.

Turning now to the drawings, in which like reference characters indicate corresponding elements throughout the several views, attention is first directed to FIG. 1A illustrating a tracked vehicle 60 is exemplary of a compact loader and which includes an operator cab 61 supported by a chassis 62. A pair of arms 63 and 64 is connected to chassis 62 and is designed to lift and lower a bucket 66 as known in the art. A pair of hydraulic actuators 70 and 71 is mounted to chassis 62 and is operative to tilt bucket 66 when desired as also known in the art. An undercarriage 75 is secured to chassis 62 in a known manner and includes a front idler roller 76, a rear idler roller 77, a drive roller 78, and track rollers 80 as is generally known in the art. An endless track 81 is entrained around idler rollers 76 and 77, drive roller 78, and track rollers 80. As known in the art, drive roller 78 is connected to the engine (not shown) of vehicle 60 and engages endless track 81 to cause translation of endless track 80 when drive roller 78 is rotated by the engine. Drive roller 78 may have teeth that engage within recesses in track 81. Alternatively, track 81 may have teeth that are engaged within recesses in drive roller 78. In either configuration, drive roller 78 can be rotated in either a clockwise or a counterclockwise direction to move vehicle 60 in either a forward or reverse direction. One skilled in the art will appreciate that undercarriage 75 supports another set of rollers on the opposite side of vehicle 60 and that another endless track 82 is entrained thereabout. In this regard, vehicle 60 is driven by endless tracks 81 and 82 to advance vehicle 10. The specific construction of vehicle 60 is not relevant to the present invention, and the present invention may be used with any type of vehicle that is propelled using a track driven by a roller system.

Figure 1B:
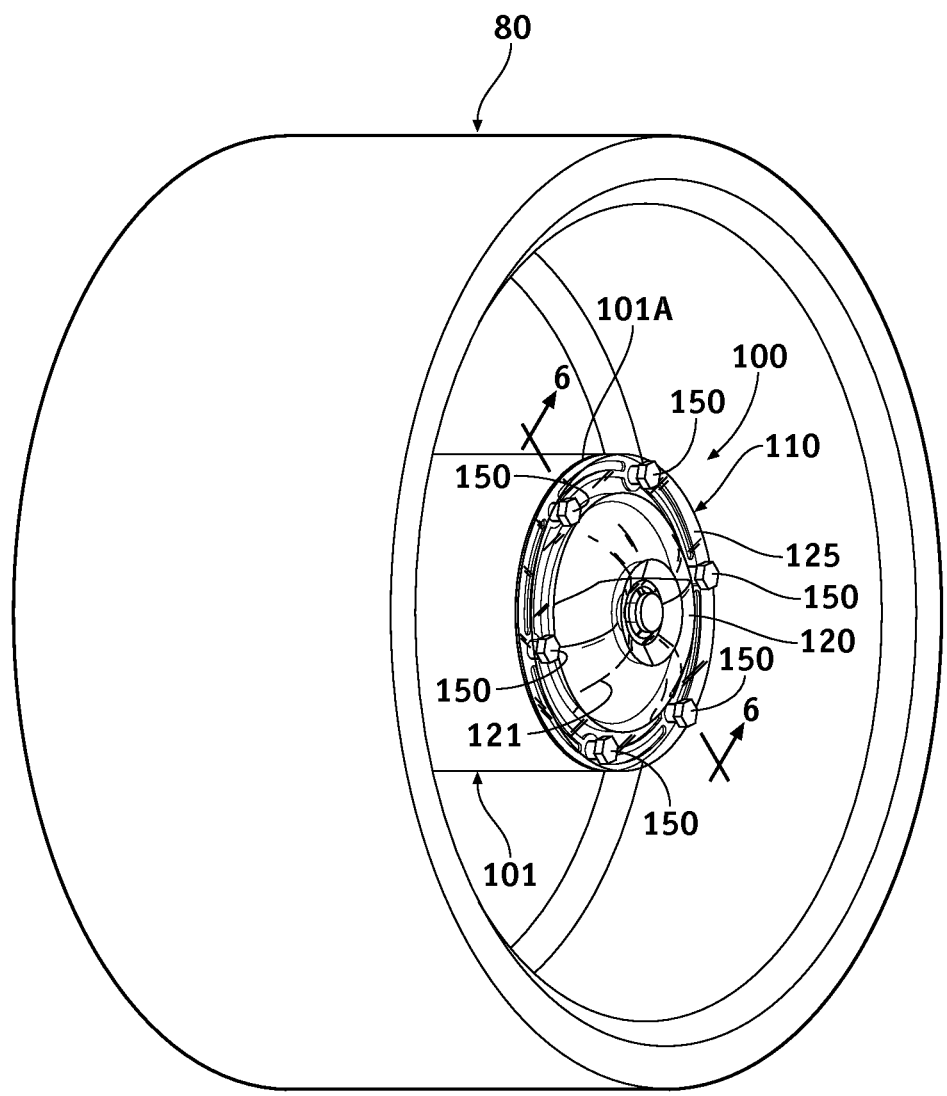
FIG. 1B is a perspective view of an oil monitoring and maintenance cap assembly shown as it would appear installed capping a lubricating oil reservoir of a roller of the tracked vehicle of FIG. 1A.

Referring now to FIG. 1B, an oil monitoring and maintenance cap assembly 100 constructed and arranged in accordance with the principle of the invention is illustrated applied to and enclosing lubricating oil reservoir 101 of roller 80 of vehicle 60 illustrated in FIG. 1A. As is known in the art, reservoir 101 maintains a volume of a lubricating oil, which provides lubrication to roller 80 to reduce roller friction and draw and dissipate heat away from roller 80. Cap assembly 100 is removably secured to open end 101A of reservoir 101 closing open end 101A of reservoir 101 enclosing and sealing the volume of lubricating oil in reservoir 101, and provides visual access into reservoir 101 for lubricating oil level and quality monitoring purposes as will be explained.

Figure 2:
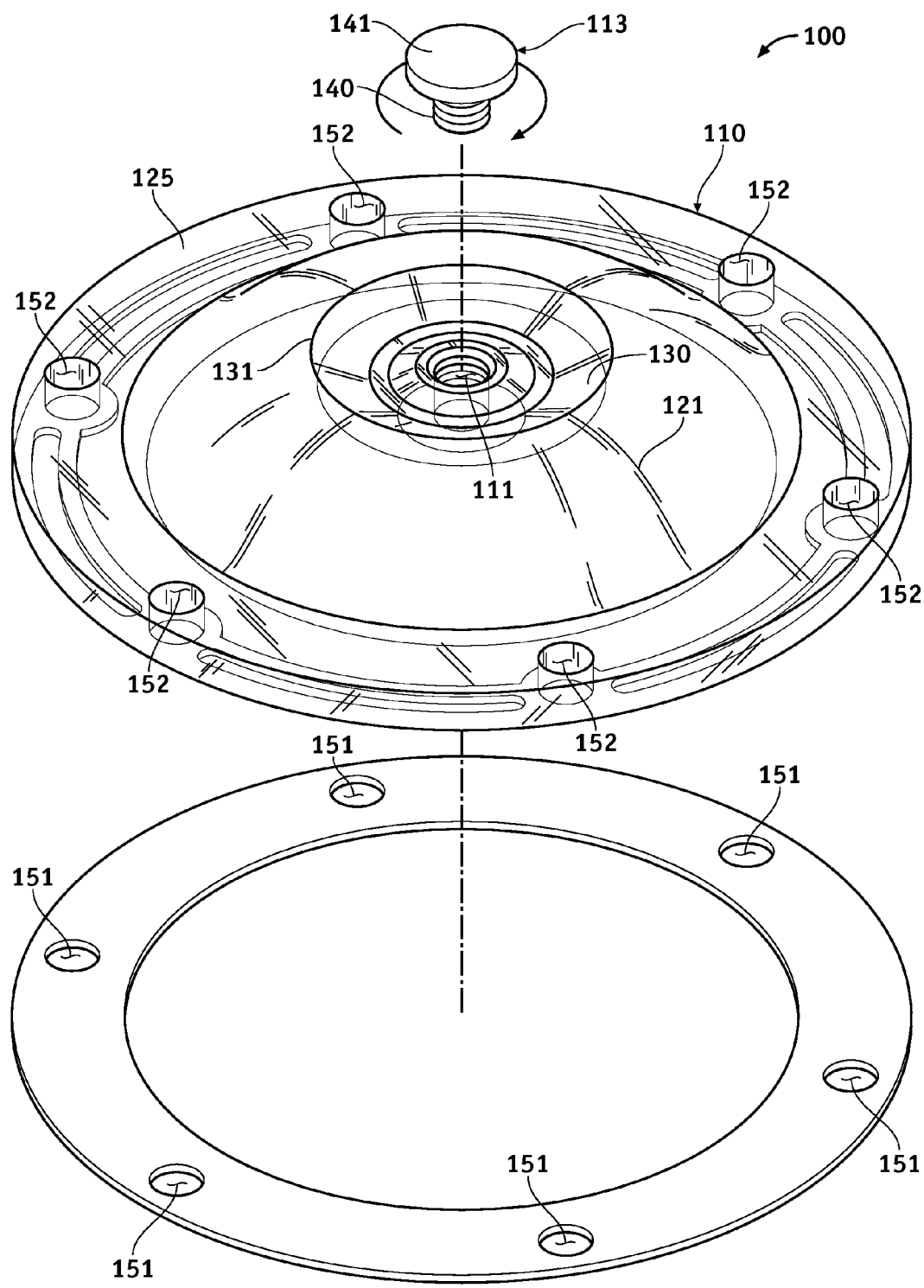
FIG. 2 is an exploded top perspective view of the oil monitoring and maintenance cap assembly of FIG. 1B including an oil monitoring and maintenance cap formed with a lubricating oil maintenance port, a gasket, and a plug used to open and close the port formed in the oil monitoring and maintenance cap.
Figure 3:
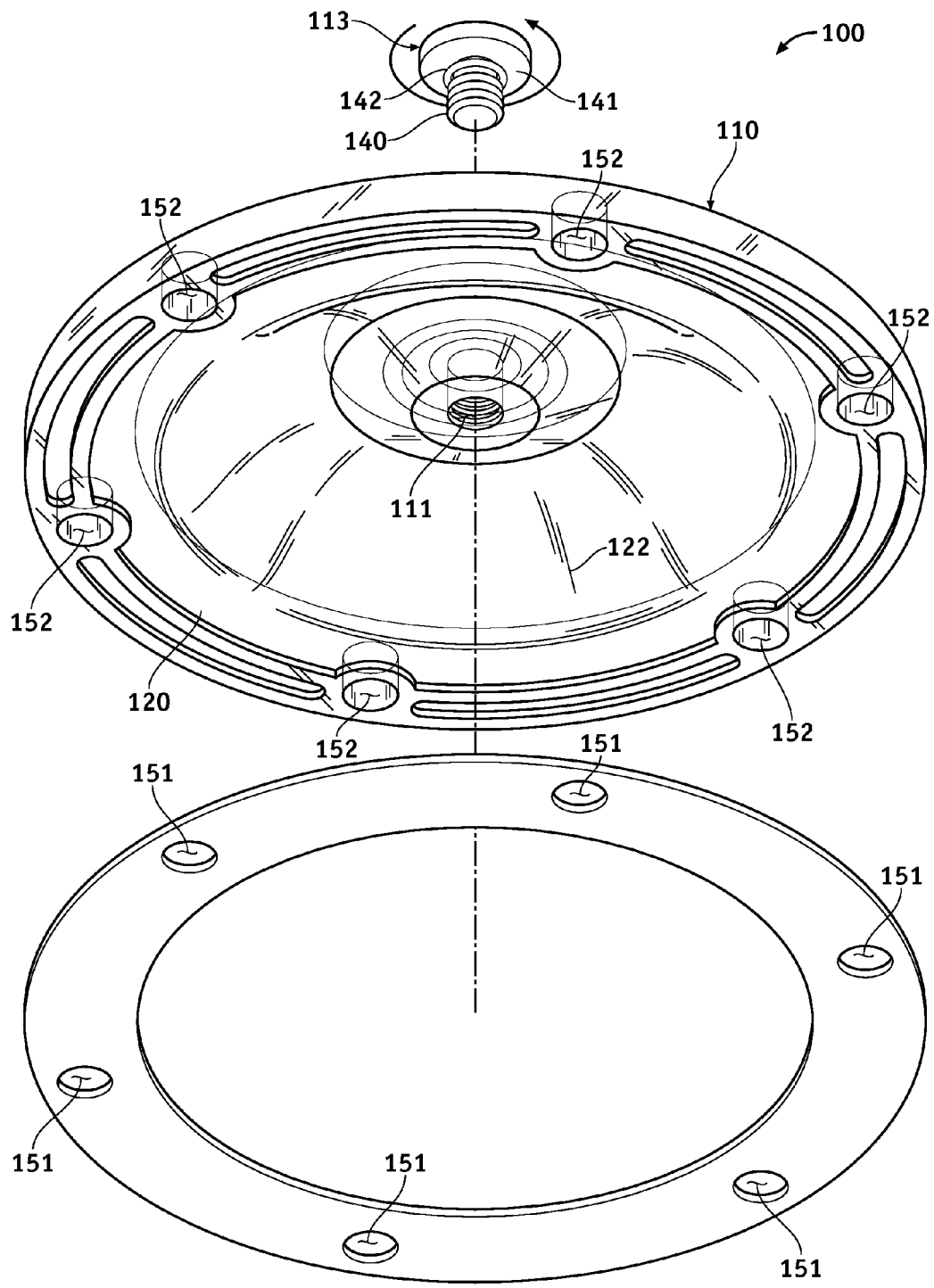
FIG. 3 is an exploded bottom perspective view of the embodiment of FIG. 2.
Figure 4:
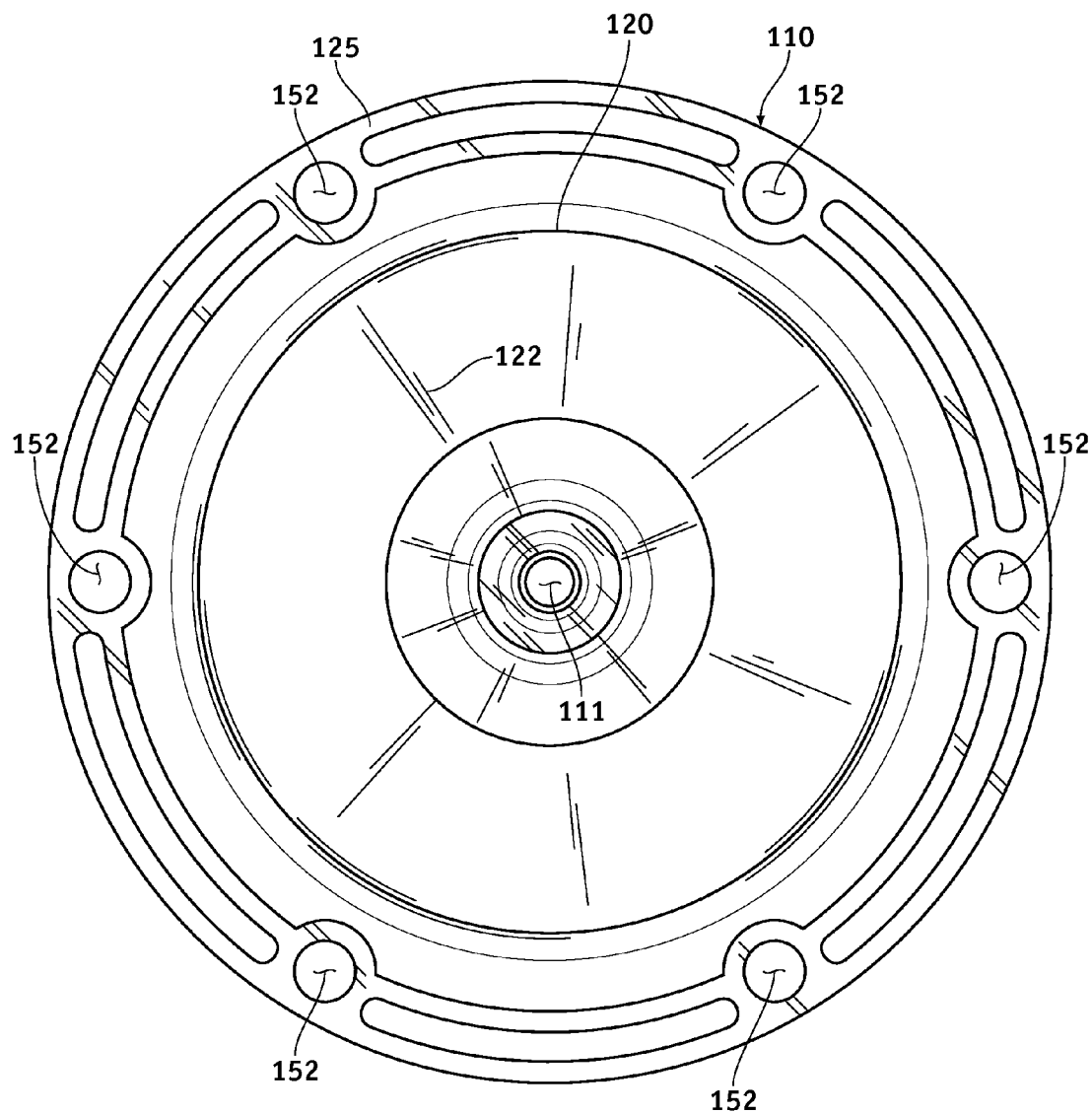
FIG. 4 is a bottom plan view of the oil monitoring and maintenance cap of FIG. 2.
Figure 5:
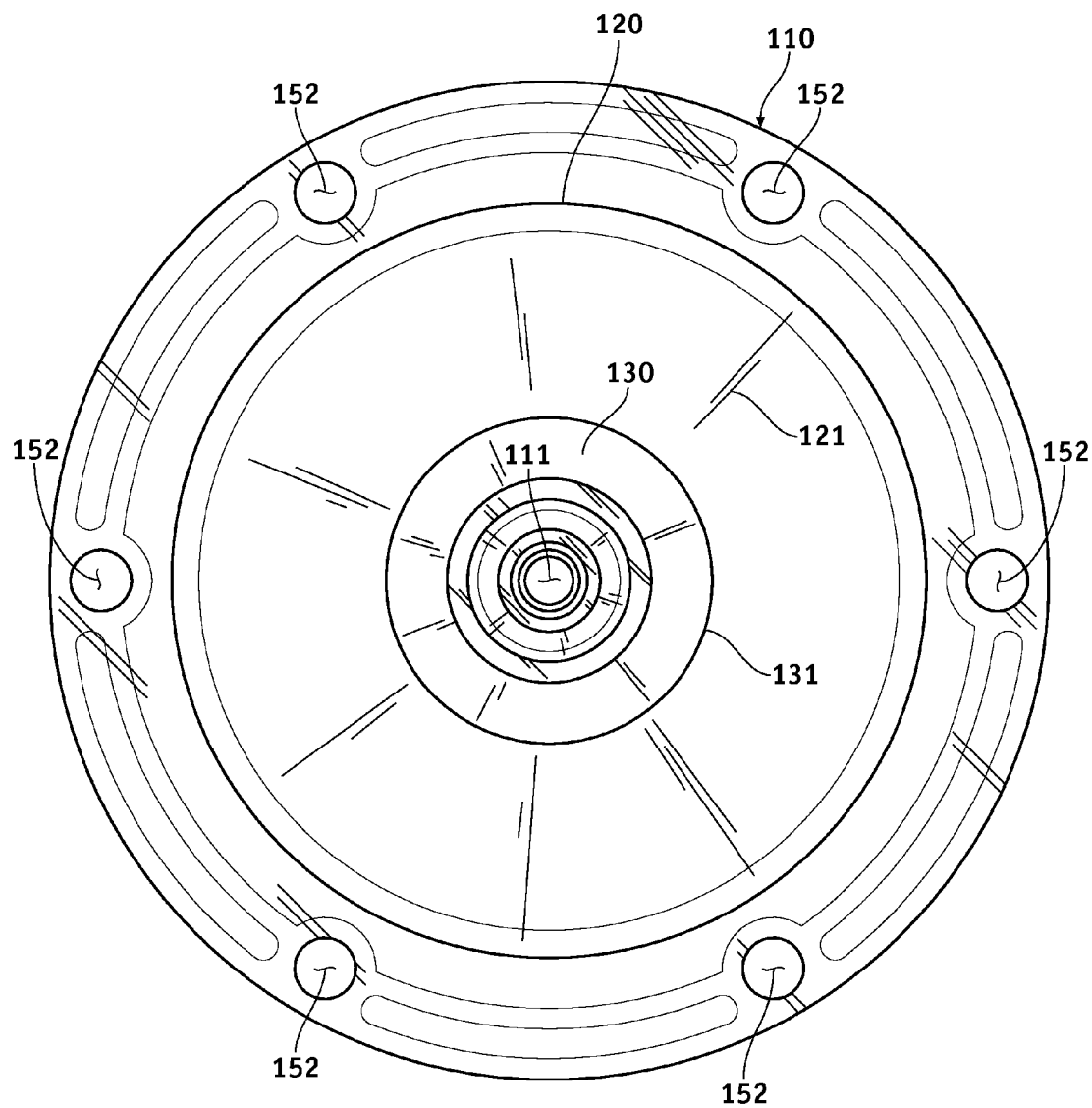
FIG. 5 is a top plan view of the oil monitoring and maintenance cap of FIG. 2.
Figure 7:
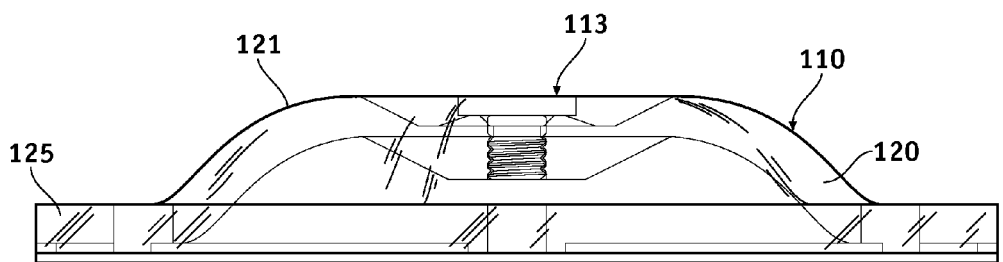
FIG. 7 is a right side elevation view of the oil monitoring and maintenance cap of FIG. 2, the opposite left side elevation view being the same thereof.
Figure 8:
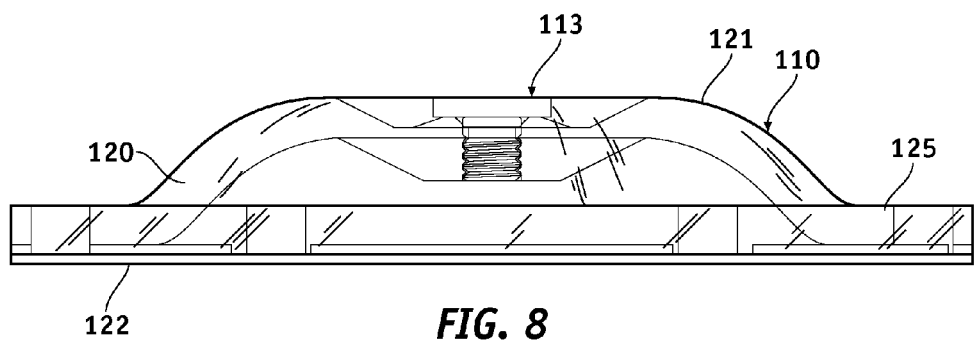
FIG. 8 is a front elevation view of the oil monitoring and maintenance cap of FIG. 2, the opposite rear elevation view being the same thereof.

FIG. 2 is an exploded top perspective view of oil monitoring and maintenance cap assembly 100 of FIG. 1B including an oil monitoring and maintenance cap 110 formed with a lubricating oil maintenance port 111, a gasket 112, and a plug 113 used to open and close port 111 formed in cap 110. FIG. 3 is an exploded bottom perspective view of the embodiment of FIG. 2, FIG. 4 is a bottom plan view of cap 110, FIG. 5 is a top plan view of cap 110, FIG. 6 is a section view taken along line 6-6 of FIG. 1B illustrating cap assembly 100 applied to reservoir 101, FIG. 7 is a right side elevation view of cap 110, the opposite left side elevation view being the same thereof, and FIG. 8 is a front elevation view of cap 110, the opposite rear elevation view being the same thereof.

Referencing FIGS. 2-8 in relevant part, which demonstrate the structure and design attributes of cap 110, cap is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 110 is preferably formed integrally, such as by molding, or machining from a billet or other stock work-piece. Cap 110 consists of a sealing body 120 including an outer face 121 and an opposed inner face 122 that meet at an outer perimeter extremity, which, in the present embodiment, is characterized by a circular perimeter or parametric flange 125. Sealing body 120 has a substantially uniform thickness extending between outer and inner faces 121 and 122. In the present embodiment, sealing body 120 has a thickness extending between outer and inner faces 121 and 122 in a range of approximately 7-9 millimeters.

Figure 6:
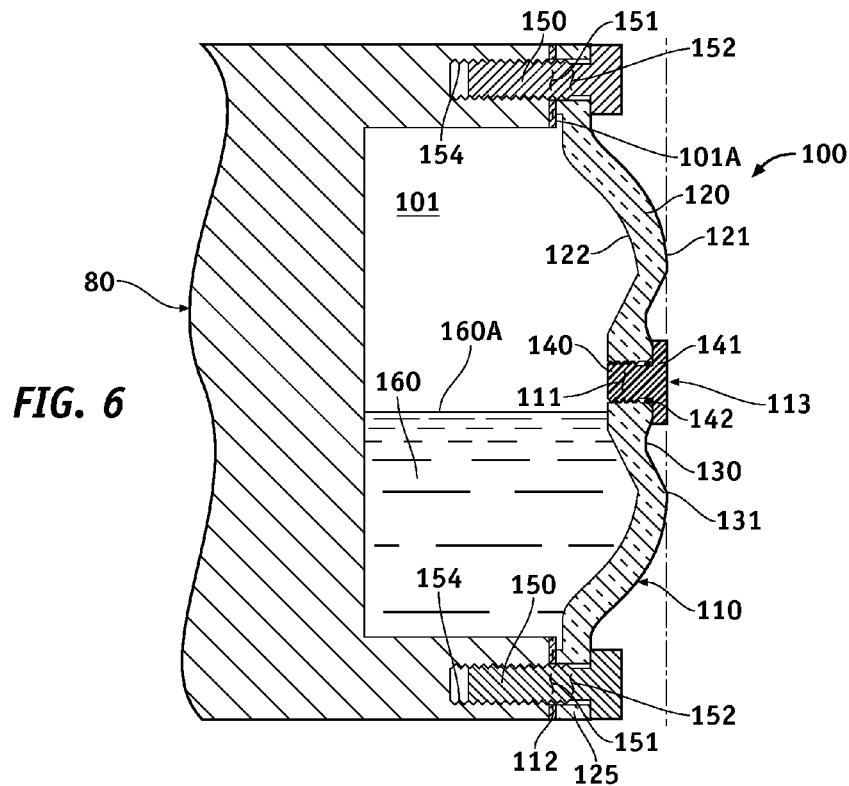
FIG. 6 is a section view taken along line 6-6 of FIG. 1B.

As best seen in FIG. 6, sealing body 120 bulges outwardly from parametric flange 125, characterized in that outer and inner faces 121 and 122 are convex and concave, respectively, extending from parametric flange 125 to a geometric center of sealing body 120 formed by a depression 130 with a raised rim 131 formed in outer face 121 of sealing body. Depression 130 is formed in outer face 121 of sealing body 120 at the geometric center of sealing body 120, and is encircled by raised rim 131. Port 111 is formed in sealing body 120 at the geometric center of sealing body 120, and is formed at depression 130. Port 111 extends through sealing body 120 at depression 130 from outer face 121 of sealing body 120 to inner face 122 of sealing body 120.

Port 111 is adapted to receive plug 113 to close and seal port 111. Looking to FIGS. 2, 3, and 6, plug 113 is formed of a strong, hard, impact resistant, temperature resistant, chemical resistant, and non-conductive material or combination of materials, such as plastic, and consists of a threaded post 140 formed with a broad, enlarged head 141. A gasket 142, shown in FIGS. 3 and 6, encircles post 140, and is located along the underside of head 141. Post 140 relates to port 111 and is used to open and close port 111, in which case plug 113 is movable between an open position detached from and opening port 111 as shown in FIGS. 2 and 3 to provide access therethrough to reservoir 101 depicted in FIG. 6 for lubricating oil replacement and replenishment purposes, and a closed position applied to and closing port 111 as shown in FIG. 6. Port 111 is inwardly threaded, and post 140 of plug 113 is correspondingly outwardly threaded. To apply and secure plug 113 to port 111, plug 113 is taken up, such as by hand, and applied into depression 130 in a direction toward outer face 121 and post 140 is applied to port 111 and is threaded into port 111 through rotation and is tightened securing in place tightening the underside of head 140 against outer face 121 at depression 130. In the closed position of plug 113 as shown in FIG. 6, gasket 142 is applied between head 141 of plug 113 and port 111 providing a fluid-impervious seal between plug 113 and port 111.

As seen in FIG. 6, rim 181 defines and extends along a plane or horizon H, and depression 130 extends into outer face 121 and is defined inwardly from horizon H. In the closed position of plug 113 applied to and closing port 111, plug 113 is positioned in depression 130 and extends outwardly from outer face 121 of sealing body 120 into depression 130 no further than horizon H of rim 131 thereby isolating plug 113 from shearing forces across outer face 121 of sealing body 120. In a further and more specific aspect, in the close position of plug 113 threaded in port 111 and tightened in place the underside of head 114 is tightened against outer face 121 of sealing body 120 at depression 130, and head 140 of plug 113 projects or otherwise extends outwardly from outer face 121 of sealing body 120 into depression 130 no further than horizon H of rim 131 thereby isolating head 140 of plug 113 from shearing forces across outer face 121 of sealing body 120. In the elevation views of FIGS. 7 and 8, plug 113 is shown installed with cap 110.

FIG. 6 is a highly generalized representation of reservoir 101 formed in roller 80 and which has an open end 101A, and this is a conventional and well-known arrangement in the art. Gasket 112 and flange 125 of cap 110 relate to open end 101A to reservoir 101. In the installation of assembly 100 to reservoir 101, gasket 112 is applied to open end 101A, and cap 110 is taken up and inner face 122 is directed toward open end 101A and cap 110 is then moved toward open end 101A so as to apply inner face 122 of flange 125 of sealing body 120 of cap 110 against gasket 112. Flange 125 is then secured in place to open end 101A closing open end 101A with cap 110, whereby sealing body 120 spans open end 101A of reservoir 101 and gasket 112 is applied between open end 101A of reservoir 101 and flange 125, which provides a fluid-impervious seal between sealing body 120 and open end 101A. With assembly 100 so installed, outer face 121 of sealing body 120 faces away from open end 101A and opposed inner face 122 faces open end 101A to reservoir 101. Cap 110 is preferably installed with plug 113 applied to and closing port 111. However, plug 113 may be applied to close port 111 after cap 110 is installed on open end 101A of reservoir 101.

Cap 110 is secured to open end 101A of reservoir with fasteners, which, in the present embodiment, are bolts 150. In this embodiment, gasket 112 is formed with spaced-apart bolt holes 151 and flange 125 is formed with spaced-apart bolt holes 152 that correspond with bolt holes 151 formed in gasket 112. Bolt holes 151 of gasket 112 and bolt holes 152 of flange 125 relate or otherwise correspond to bolt holes 154 formed in open end 101A of reservoir 101. As a matter of illustration and reference, FIG. 6 shows two such bolt holes 154 formed in open end 101A of reservoir 101. In the application of assembly 100 to open end 101A of reservoir 101, bolt holes 151 of gasket 112 are registered with the bolt holes 154 formed in open end 101A of reservoir 101 and bolt holes 152 of flange 125 are, in turn, registered with bolt holes 151 formed gasket 112 and thus bolt holes 154 formed in open end 101A of reservoir 101. Bolts 150 are applied to the aligned bolt holes 151 and 152 and are threaded into bolt holes 154 formed in open end 101A of reservoir 101 and are then tightened so as to secure assembly 100 in place as shown in FIG. 6. In the present embodiment there are six bolt holes 154 in open end 101A of reservoir 101, and there are six bolt holes 151 in gasket 112 and six bolt holes 152 in cap 110 that correspond with the six bolt holes 154 formed in open end 101A.

And so having secured assembly 100 in place to open end 101A of reservoir 101 closing open end 101A and with plug 113 installed in place in its closed position closing port 111, a volume of a lubricating 160 is then applied to reservoir 101 in the conventional manner, whereby roller 80 is then prepared and ready for use in the operation of vehicle 60 (FIG. 1A) in the normal manner. As cap 110 is transparent, sealing body 120 spanning open end 101A of reservoir 101 is transparent to provide visual access therethrough in the direction indicated by arrowed line A into reservoir 101 through open end 101A for lubricating oil level and quality monitoring purposes, in accordance with the principle of the invention.

In the normal and customary operational position of roller 80, reservoir 101 is horizontal and open end 101A is vertical, and this orientation is clearly depicted in FIG. 6. In this orientation of reservoir 101 and open end 101A, cap 101 is vertically disposed such that sealing body 120 extends vertically across open end 101A of reservoir 101. The volume of lubricating oil 160 applied to reservoir 101 thus extends upwardly into reservoir 101 along inner face 122 of sealing body 120 to level 160A just below port 111 closed and sealed by plug 113. Again, the transparent character of sealing body 120 provides visual access therethrough into lubricating oil reservoir 101 through open end 101A for lubricating oil 160 level 160A and quality monitoring purposes. As the volume of lubricating oil 160 is readily and easily visualized through sealing body 120, level 160A of lubricating oil 160 can easily be seen as can the quality of the volume of lubricating oil 160. Should level 160A of the volume of lubricating oil 160 be seen as too low, it may be replenished. Should the quality of the volume of lubricating oil 160 be seen as compromised, such as by dirt and debris, the volume of lubricating oil 160 may be withdrawn from reservoir 101 and replaced. Port 111 is useful for replenishing and replacing lubricating oil in reservoir 101. To replenish the volume of lubricating oil 160 should level 160A fall to an unacceptably low level, plug 113 is detached from port 111 and moved to its open position to open port 111, replenishing oil is applied to reservoir 101 through open port 111, and port 111 is reclosed by reinstalling plug 113 to port 111 placing plug 113 back to its closed position closing and sealing port 111. To replace volume of lubricating oil 160 with a fresh volume of a lubricating oil, plug 113 is detached from port 111 and moved to its open position to open port 111, volume of lubricating oil 160 is withdrawn from reservoir 101 through port 111, a fresh volume of a lubricating oil is applied to reservoir 101 through port 111, and port 111 is reclosed by reinstalling plug 113 to port 111 placing plug 113 back to its closed position closing and sealing port 111.

In the vertical positioning of cap 110 as shown in FIG. 6 such that sealing body 120 extends vertically across open end 101A of reservoir 101, it is again emphasized that in the closed position of plug 113 applied to and closing port 111, plug 113 is positioned in depression 130 and extends outwardly from outer face 121 of sealing body 120 into depression 130 no further than horizon H of rim 131 thereby isolating plug 113 from shearing forces across outer face 121 of sealing body 120 that could otherwise rip plug 113 from port 111 or otherwise damage plug 113. These shearing forces can be applied by plants or crops or bushes or the like that brush across outer face 121 of sealing body 120 in the normal operation of roller 80 in the normal operation of vehicle 60 shown in FIG. 1A. More particularly, in the close position of plug 113 threaded in port 111 and tightened in place the underside of head 114 is tightened against outer face 121 of sealing body 120 at depression 130, and head 140 of plug 113 projects or otherwise extends outwardly from outer face 121 of sealing body 120 into depression 130 no further than horizon H of rim 131 thereby isolating head 140 of plug 113 from shearing forces across outer face 121 of sealing body 120 that, again, could otherwise rip plug 113 from port 111 or otherwise damage plug 113.

Figure 9:
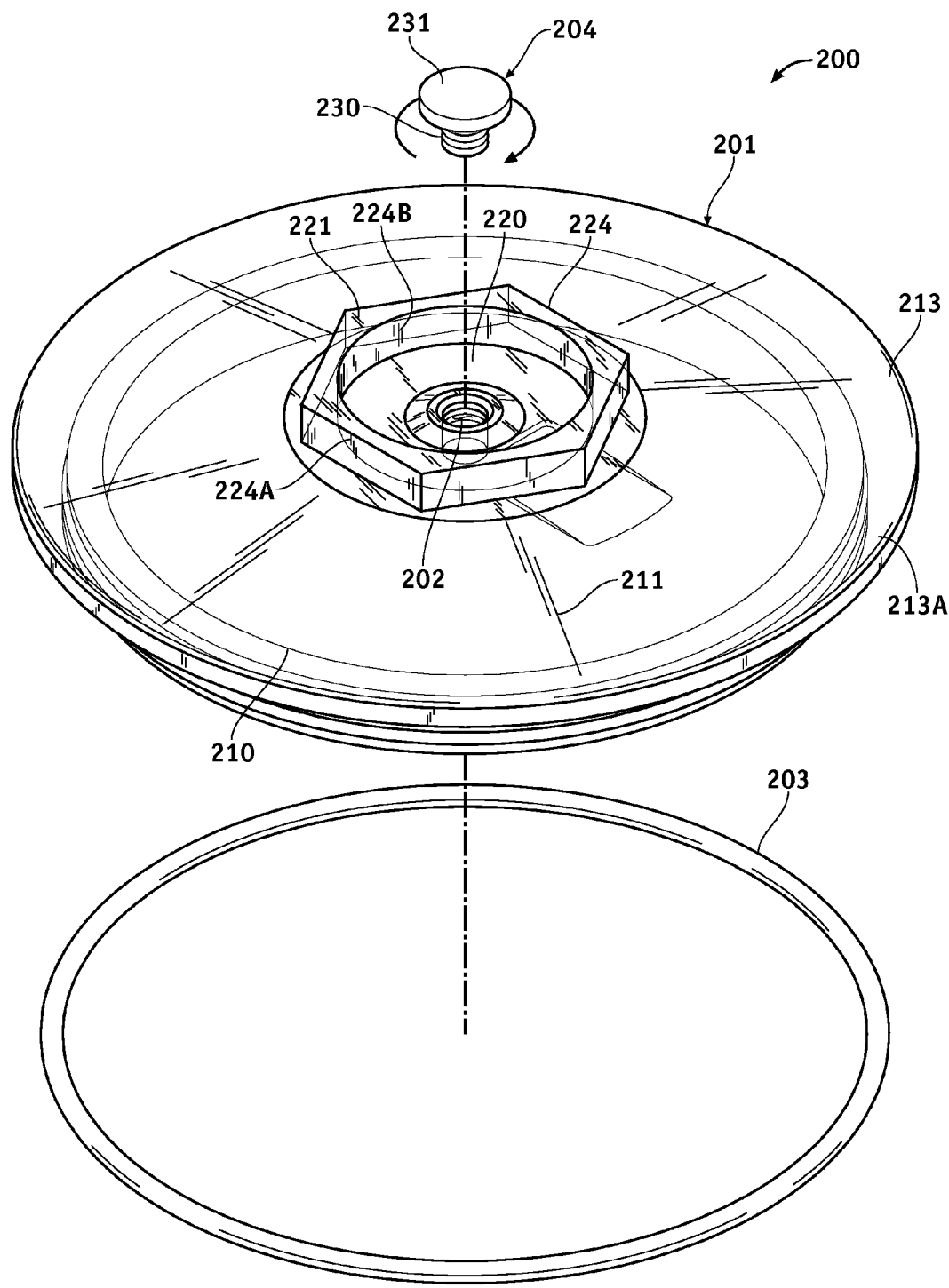
FIG. 9 is an exploded top perspective view of another embodiment of an oil monitoring and maintenance cap assembly including an oil monitoring and maintenance cap formed with a lubricating oil maintenance port, a gasket, and a plug used to open and close the port formed in the oil monitoring and maintenance cap.
Figure 10:
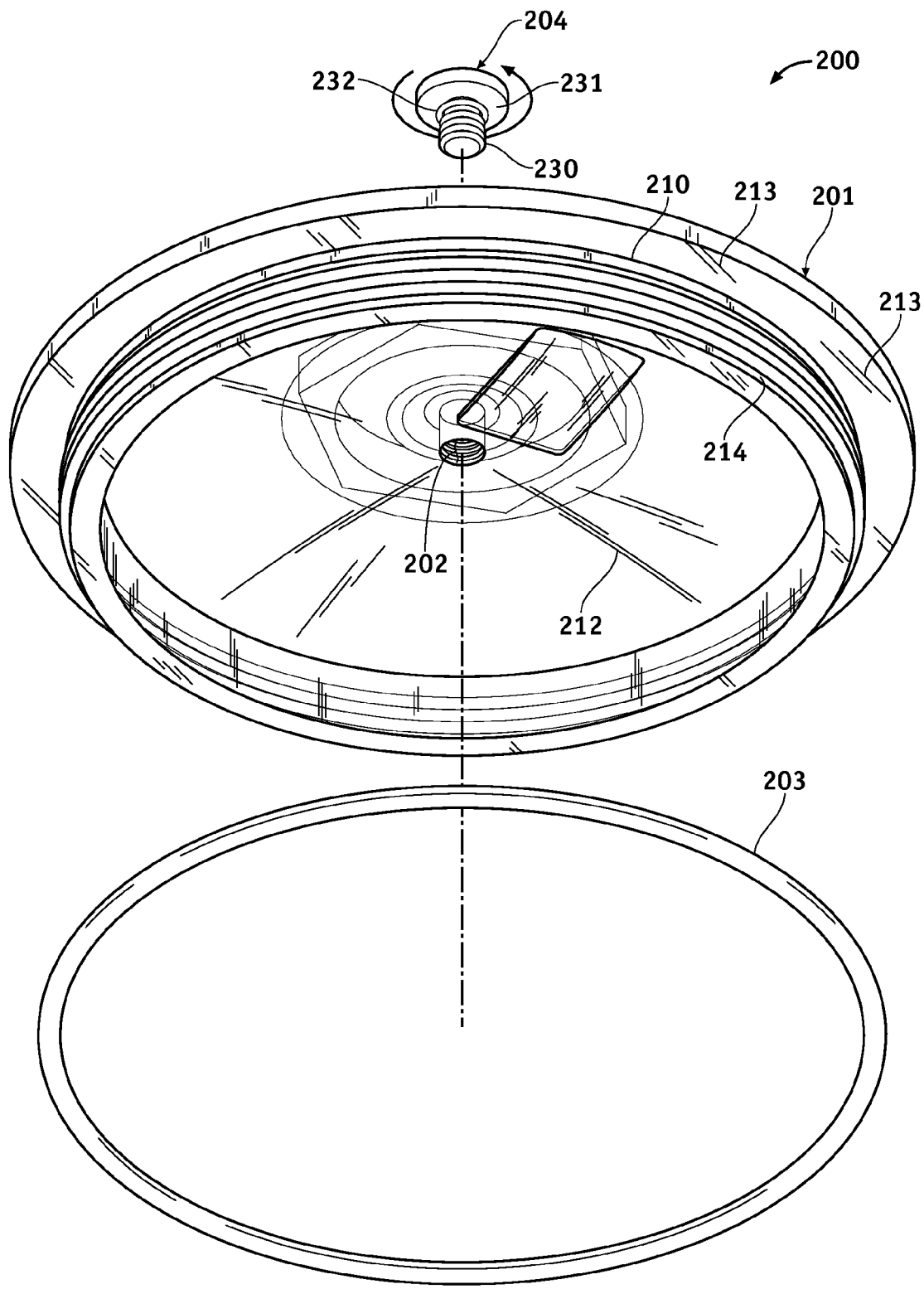
FIG. 10 is an exploded bottom perspective view of the embodiment of FIG. 9.
Figure 11:
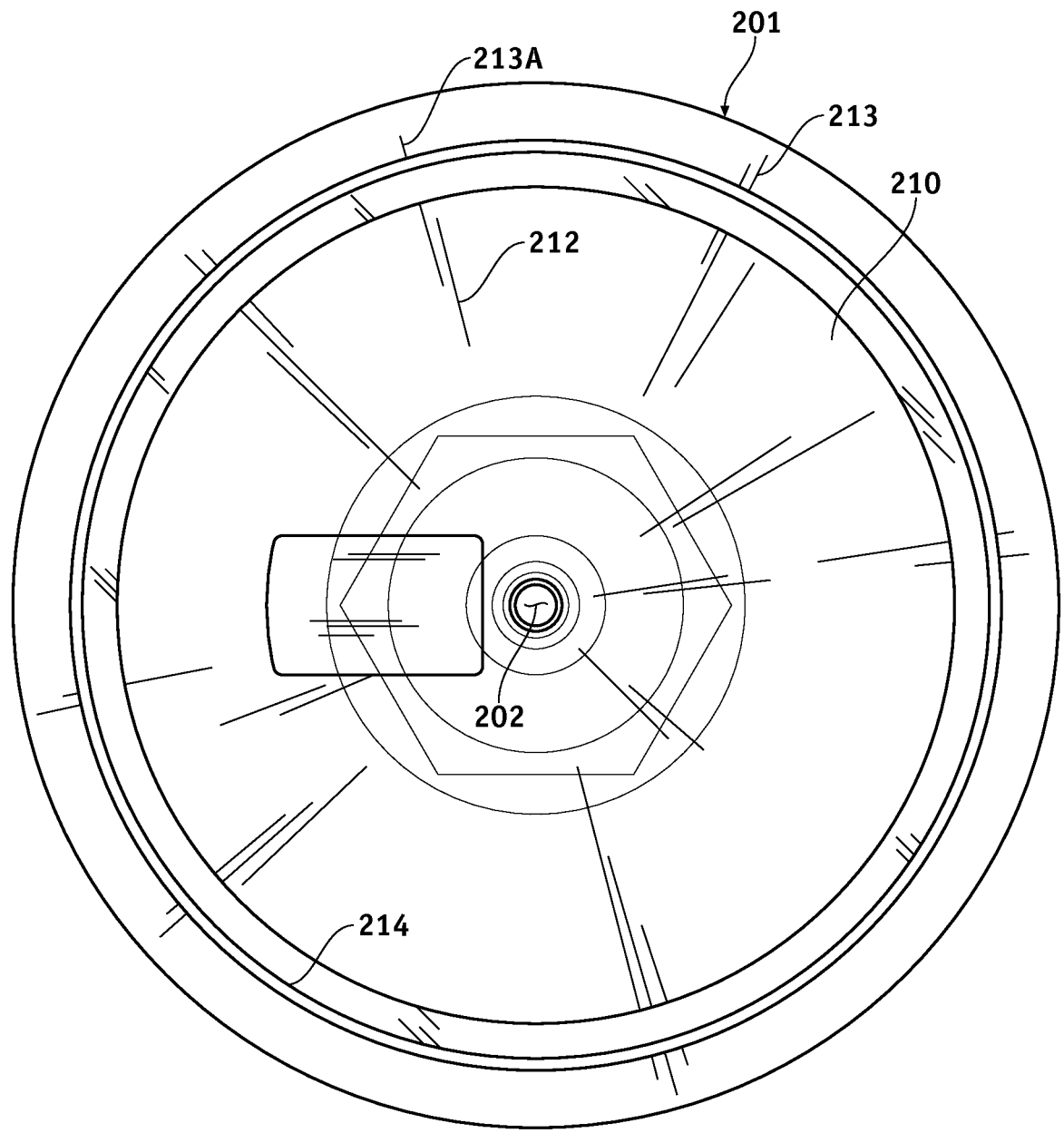
FIG. 11 is a bottom plan view of the oil monitoring and maintenance cap of FIG. 9.
Figure 12:
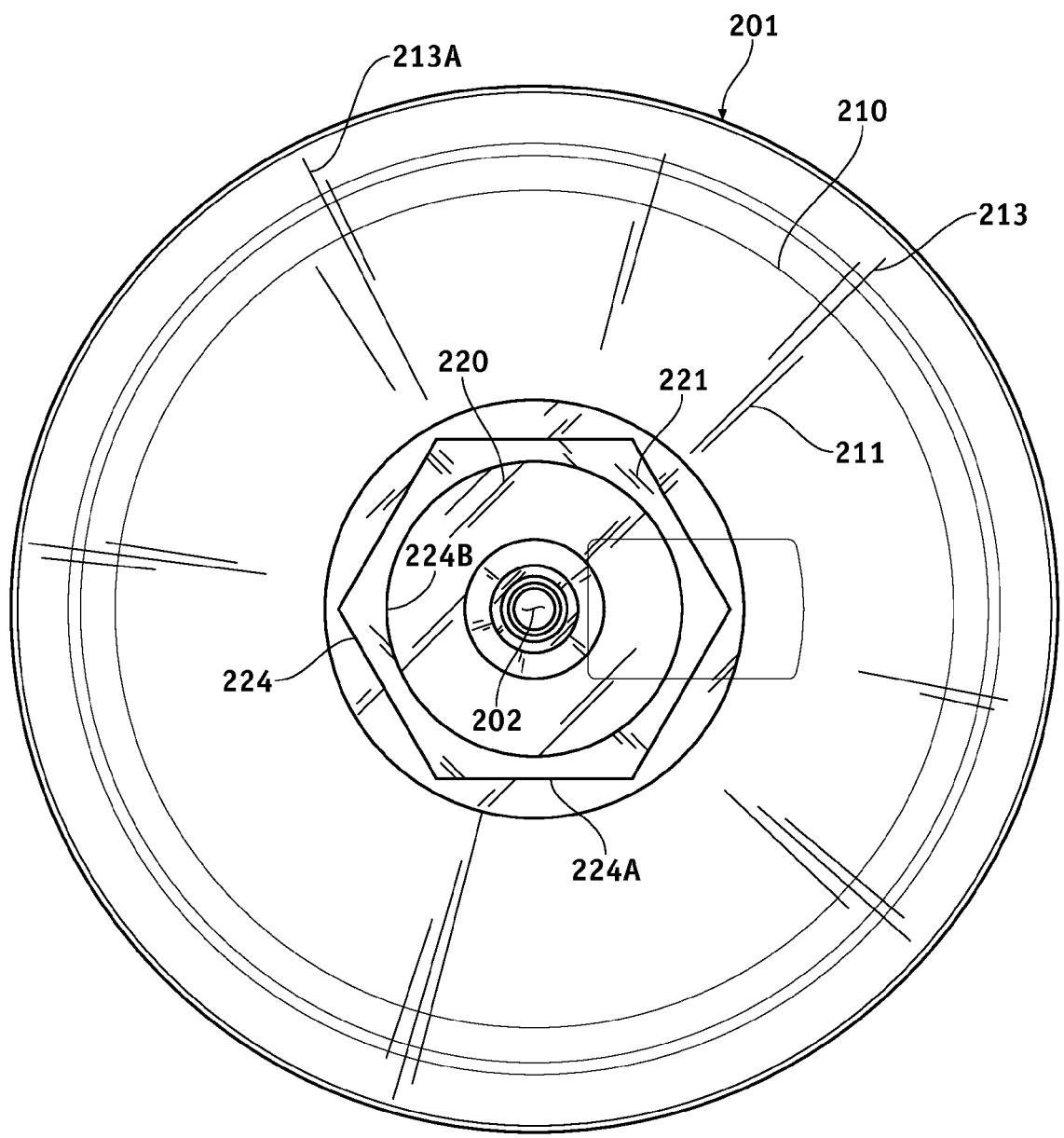
FIG. 12 is a top plan view of the oil monitoring and maintenance cap of FIG. 9.
Figure 13:
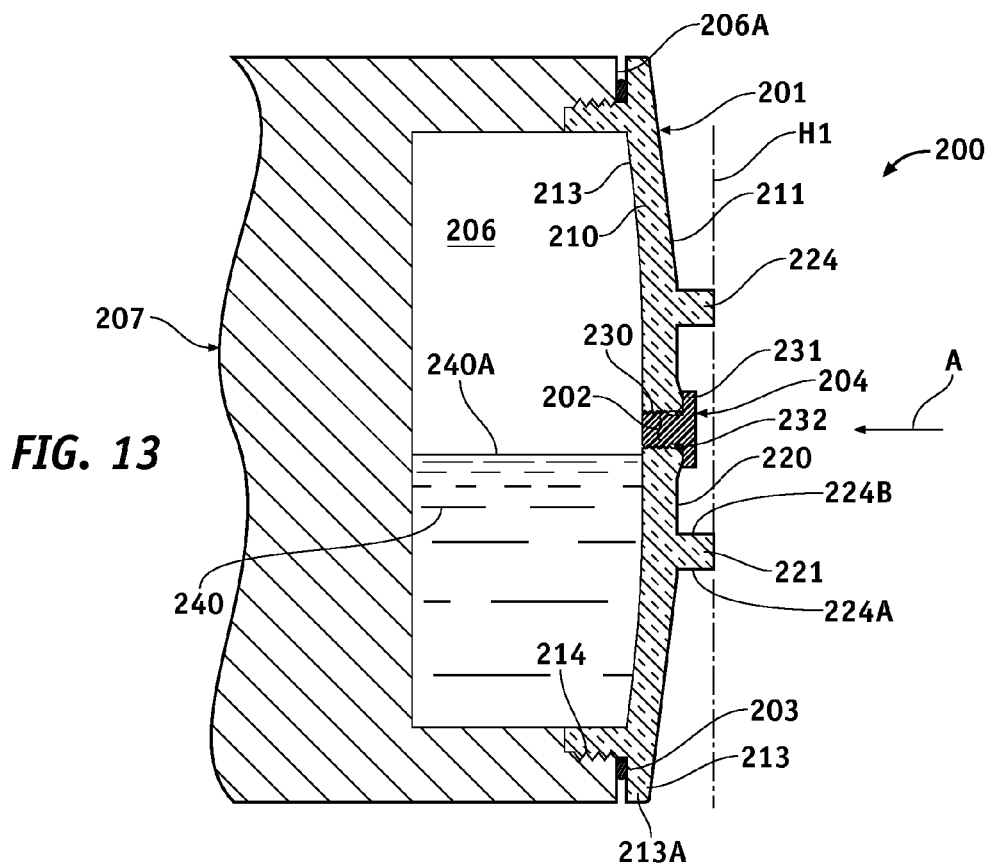
FIG. 13 is a section view of the embodiment of FIG. 9 shown installed capping a lubricating oil reservoir of a roller.
Figure 14:
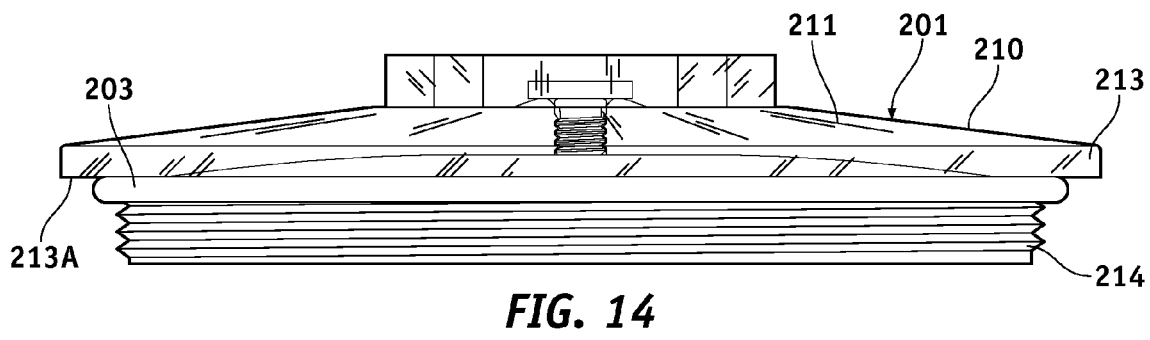
FIG. 14 is a right side elevation view of the oil monitoring and maintenance cap of FIG. 9, the opposite left side elevation view being the same thereof.
Figure 15:
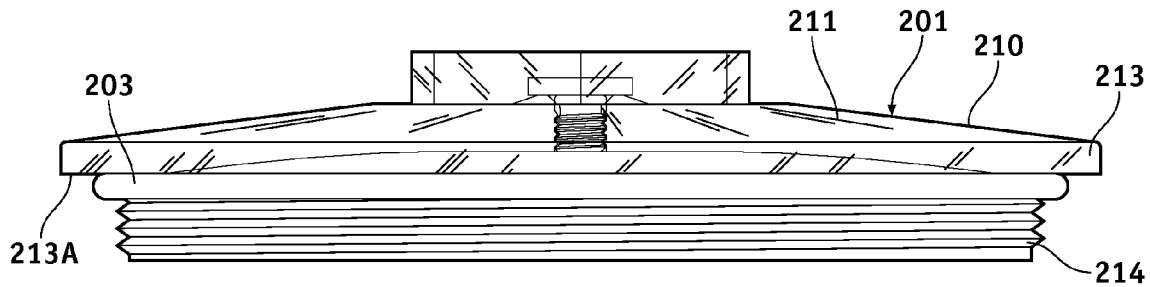
FIG. 15 is a front elevation view of the oil monitoring and maintenance cap of FIG. 9, the opposite rear elevation view being the same thereof.

Reference is now made to FIG. 9, which is an exploded top perspective view of another embodiment of an oil monitoring and maintenance cap assembly 200 including an oil monitoring and maintenance cap 201 formed with a lubricating oil maintenance port 202, a gasket 203, and a plug 204 used to open and close port 202 formed in cap 201. As matter of illustration and reference, FIG. 10 is an exploded bottom perspective view of the embodiment of FIG. 9, FIG. 11 is a bottom plan view of cap 201, FIG. 12 is a top plan view of cap 201, FIG. 13 is a section view of the embodiment of FIG. 9 shown installed capping a lubricating oil reservoir 206 of a roller 207, FIG. 14 is a right side elevation view of cap 201 with gasket 203 applied thereto, the opposite left side elevation view being the same thereof, and FIG. 15 is a front elevation view of cap 201 with gasket 203 applied thereto, the opposite rear elevation view being the same thereof. Roller 207 shown in FIG. 13 is generally representative of a track roller of a tracked vehicle, like roller 80 discussed above. As is known in the art, reservoir 206 maintains a volume of a lubricating oil, which provides lubrication to roller 207 to reduce roller friction and draw and dissipate heat away from roller 207. Cap assembly 200 is removably secured to open end 206A of reservoir 206 closing open end 206A of reservoir 206 enclosing and sealing the volume of lubricating oil in reservoir 206, and provides visual access into reservoir 206 for lubricating oil level and quality monitoring purposes as will be explained.

Referencing FIGS. 9-15 in relevant part, which demonstrate the structure and design attributes of cap 201, cap 201 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 201 is preferably formed integrally, such as by molding, or machining from a billet or other stock work-piece. Cap 201 consists of a sealing body 210 including an outer face 211 and an opposed inner face 212 that meet at an outer, circular, perimeter extremity 213. Sealing body 210 has a substantially uniform thickness extending between outer and inner faces 211 and 212. In the present embodiment, sealing body 210 has a thickness extending between outer and inner faces 211 and 212 in a range of approximately 7-9 millimeters.

Cap 201 is formed with a threaded and continuous perimeter skirt 214, which is located inboard of perimeter extremity 213 and which depends downwardly from inner face 212 of sealing body 210 and this forms in perimeter extremity 213 a flange 213A relative to skirt 214 projecting radially outward from skirt 214. Skirt 214 is outwardly threaded. Gasket 203 encircles skirt 214 and is located along the underside of sealing body 210 of cap 201, namely, along inner face 212 of sealing body 210 of cap 201.

Looking to FIGS. 9, 12, and 13, sealing body 210 is formed with a depression 220 having a raised rim 221. Depression 221, having raised rim 221, is formed in outer face 211 of sealing body 210. Depression 220 is formed in outer face 211 of sealing body 210 at the geometric center of sealing body 120, and is encircled by raised rim 221. Raised rim 221 forms part of a continuous sidewall 224, having a continuous outer surface 224A and an opposed continuous inner surface 224B, which is integral with outer face 211 and projects outwardly therefrom and terminates with rim 221. Continuous inner surface 224B of continuous sidewall 224 cooperates with outer face 211 to form depression 220. Port 202 is formed in sealing body 210 at the geometric center of sealing body 210, and is formed at depression 220. Port 202 extends through sealing body 210 at depression 220 from outer face 211 of sealing body 210 to inner face 212 of sealing body 210.

Port 202 is adapted to receive plug 204 to close and seal port 202. Looking to FIGS. 9, 10, and 15, plug 204 is formed of a strong, hard, impact resistant, temperature resistant, chemical resistant, and non-conductive material or combination of materials, such as plastic, and consists of a threaded post 230 formed with a broad, enlarged head 231. A gasket 232, shown in FIGS. 10 and 13, encircles post 230, and is located along the underside of head 231. Post 230 relates to port 202 and is used to open and close port 202, in which case plug 204 is movable between an open position detached from and opening port 202 as shown in FIGS. 9 and 10 to provide access therethrough to reservoir 206 depicted in FIG. 13 for lubricating oil replacement and replenishment purposes, and a closed position applied to and closing port 202 as shown in FIG. 13. Port 202 is inwardly threaded, and post 230 of plug 204 is correspondingly outwardly threaded. To apply and secure plug 204 to port 202, plug 204 is taken up, such as by hand, and applied into depression 220 in a direction toward outer face 211 and post 230 is applied to port 202 and is threaded into port 202 through rotation and is tightened securing in place tightening the underside of head 230 against outer face 211 at depression 220. In the closed position of plug 204 as shown in FIG. 13, gasket 232 is applied between head 231 of plug 204 and port 202 providing a fluid-impervious seal between plug 204 and port 202.

As seen in FIG. 13, rim 181 defines and extends along a plane or horizon H1, and depression 220 extends to outer face 211 and is defined inwardly from horizon H. In the closed position of plug 204 applied to and closing port 202, plug 204 is positioned in depression 220 and extends outwardly from outer face 211 of sealing body 210 into depression 220 no further than horizon H of rim 221 thereby isolating plug 204 from shearing forces across outer face 211 of sealing body 210. In a further and more specific aspect, in the close position of plug 204 threaded in port 202 and tightened in place the underside of head 114 is tightened against outer face 211 of sealing body 210 at depression 220, and head 230 of plug 204 projects or otherwise extends outwardly from outer face 211 of sealing body 210 into depression 220 no further than horizon H1 of rim 221 thereby isolating head 230 of plug 204 from shearing forces across outer face 211 of sealing body 210.

FIG. 13 is a highly generalized representation of reservoir 206 formed in roller 207 and which has an open end 206A that is inwardly threaded, and this is a conventional and well-known arrangement in the art. The inner diameter of inwardly threaded open end 206A of reservoir 206 relates to the outer diameter of outwardly threaded skirt 214. In the installation of assembly 200 to reservoir 206, cap 201 is taken up, inner face 212 is directed toward open end 206A, and outwardly threaded skirt is threaded onto inwardly threaded open end 206A through rotation of cap 201, and through rotation cap 201 is tightened threadably securing cap 201 to open end 206A of reservoir 206 closing open end 206A of reservoir 206 with cap 201, whereby sealing body 210 spans open end 206A of reservoir 206 and gasket 203 is applied between open end 206A of reservoir 206 and flange 213A formed in sealing body 210 of cap 201, which provides a fluid-impervious seal between sealing body 210 and open end 206A. With assembly 100 so installed, outer face 211 of sealing body 210 faces away from open end 206A and opposed inner face 212 faces open end 206A to reservoir 206. Cap 201 is preferably installed with plug 204 applied to and closing port 202. However, plug 204 may be applied to close port 202 after cap 201 is installed on open end 206A of reservoir 206.

And so having secured assembly 200 in place to open end 206A of reservoir 206 closing open end 206A and with plug 204 installed in place in its closed position closing port 202, a volume of a lubricating 240 is then applied to reservoir 206 in the conventional manner, whereby roller 207 is then prepared and ready for use in the operation of the tracked vehicle incorporating roller 207. As cap 201 is transparent, sealing body 210 spanning open end 206A of reservoir 206 is transparent to provide visual access therethrough in the direction indicated by arrowed line A in FIG. 13 into reservoir 206 through open end 206A for lubricating oil level and quality monitoring purposes, in accordance with the principle of the invention.

In the normal and customary operational position of roller 207, reservoir 206 is horizontal and open end 206A is vertical, and this orientation is clearly depicted in FIG. 13. In this orientation of reservoir 206 and open end 206A, cap 206 is vertically disposed such that sealing body 210 extends vertically across open end 206A of reservoir 206. The volume of lubricating oil 240 applied to reservoir 206 thus extends upwardly into 206 reservoir along inner face 212 of sealing body 210 to level 240A just below port 202 closed and sealed by plug 204. Again, the transparent character of sealing body 210 provides visual access therethrough into lubricating oil reservoir 206 through open end 206A for lubricating oil 240 level 240A and quality monitoring purposes. As the volume of lubricating oil 240 is readily and easily visualized through sealing body 210, level 240A of oil can easily be seen as can the quality of the volume of lubricating oil 240. Should level 240A of the volume of lubricating oil 240 be seen as too low, it may be replenished. Should the quality of the volume of lubricating oil 240 be seen as compromised, such as by dirt and debris, the volume of lubricating oil 240 may be withdrawn from reservoir 206 and replaced. Port 202 is useful for replenishing and replacing lubricating oil in reservoir 206. To replenish the volume of lubricating oil 240 should level 240A fall to an unacceptably low level, plug 204 is detached from port 202 and moved to its open position to open port 202, replenishing oil is applied to reservoir 206 through open port 202, and port 202 is reclosed by reinstalling plug 204 to port 202 placing plug 204 back to its closed position closing and sealing port 202. To replace volume of lubricating oil 240 with a fresh volume of a lubricating oil, plug 204 is detached from port 202 and moved to its open position to open port 202, volume of lubricating oil 240 is withdrawn from reservoir 206 through port 202, a fresh volume of a lubricating oil is applied to reservoir 206 through port 202, and port 202 is reclosed by reinstalling plug 204 to port 202 placing plug 204 back to its closed position closing and sealing port 202.

In the vertical positioning of cap 201 as shown in FIG. 13 such that sealing body 210 extends vertically across open end 206A of reservoir 206, it is again emphasized that in the closed position of plug 204 applied to and closing port 202, plug 204 is positioned in depression 220 and extends outwardly from outer face 211 of sealing body 210 into depression 220 no further than horizon H1 of rim 221 thereby isolating plug 204 from shearing forces across outer face 211 of sealing body 210 that could otherwise rip plug 204 from port 202 or otherwise damage plug 204. These shearing forces can be applied by plants or crops or bushes or the like that brush across outer face 211 of sealing body 210 in the normal operation of roller 207 in the normal operation of the vehicle incorporating roller 207. More particularly, in the close position of plug 204 threaded in port 202 and tightened in place the underside of head 114 is tightened against outer face 211 of sealing body 210 at depression 220, and head 230 of plug 204 projects or otherwise extends outwardly from outer face 211 of sealing body 210 into depression 220 no further than horizon H1 of rim 221 thereby isolating head 230 of plug 204 from shearing forces across outer face 211 of sealing body 210 that, again, could otherwise rip plug 204 from port 202 or otherwise damage plug 204.

Cap 201 is threaded onto open end 206A through rotation, whereby outwardly threaded skirt 214 threads onto inwardly threaded open end 206A of reservoir 206. To assist in tightening cap 201 in place, continuous outer surface 224A of continuous sidewall 224 is hexagonal in shape, which allows continuous outer surface 224A of continuous sidewall 224 to be gripped by a wrench or other gripping device for assisting a user in imparting rotation to cap 201 for not only tightening it places through rotation, but also removing it from open end 206A of reservoir 206 through rotation.

Figure 16:
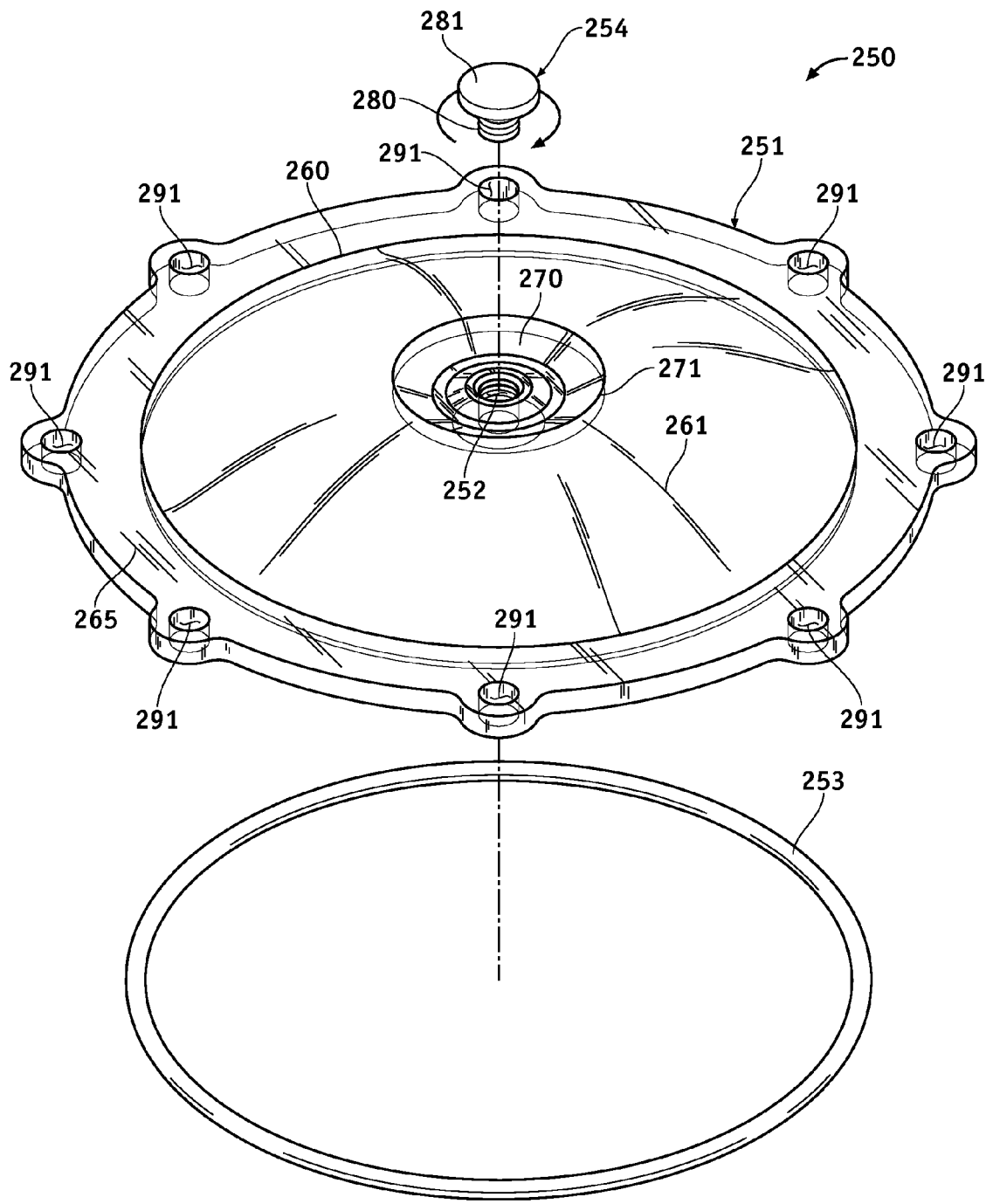
FIG. 16 is an exploded top perspective view of yet another embodiment of an oil monitoring and maintenance cap assembly including an oil monitoring and maintenance cap formed with a lubricating oil maintenance port, a gasket, and a plug used to open and close the port formed in the oil monitoring and maintenance cap.
Figure 17:
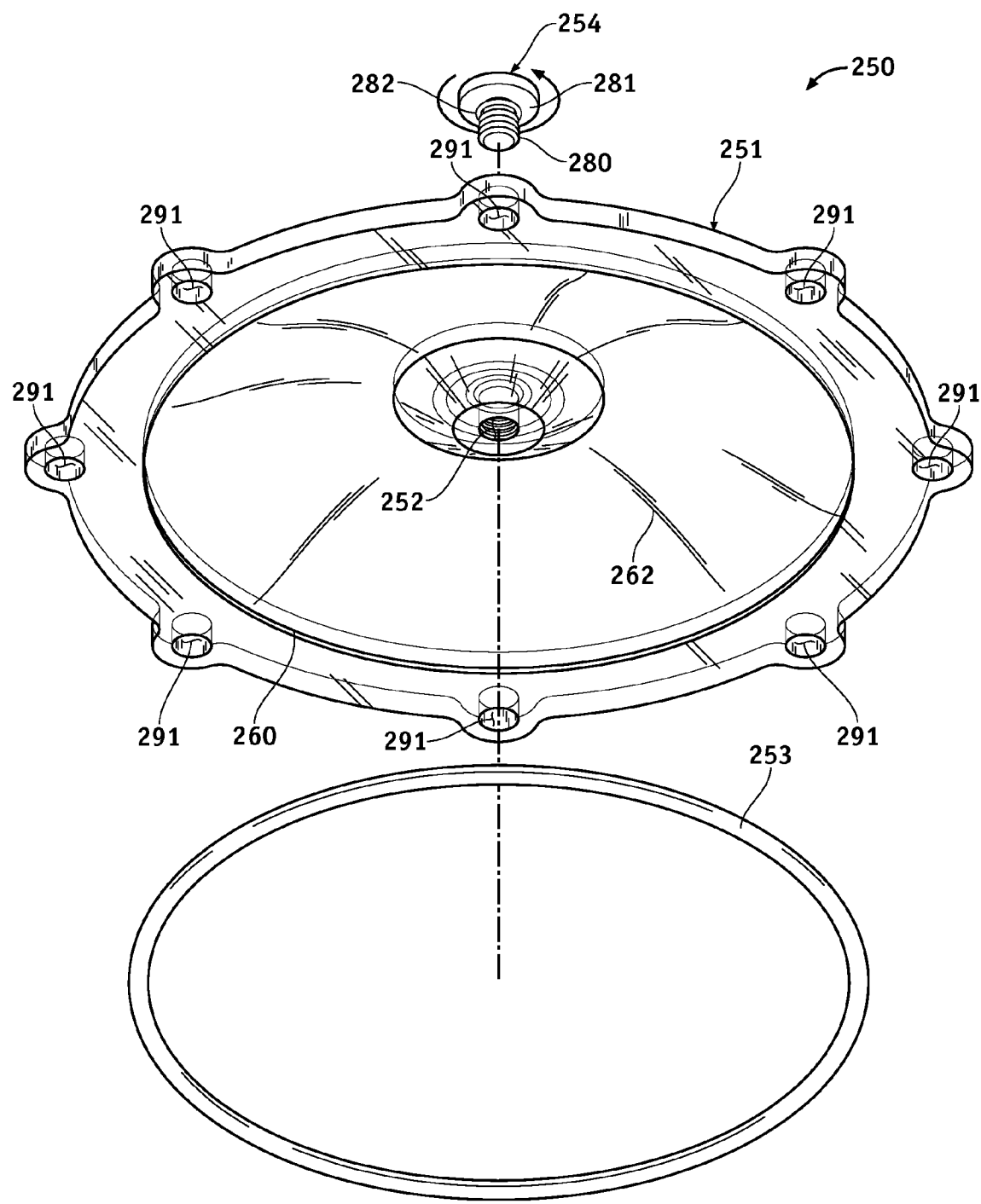
FIG. 17 is an exploded bottom perspective view of the embodiment of FIG. 16.
Figure 18:
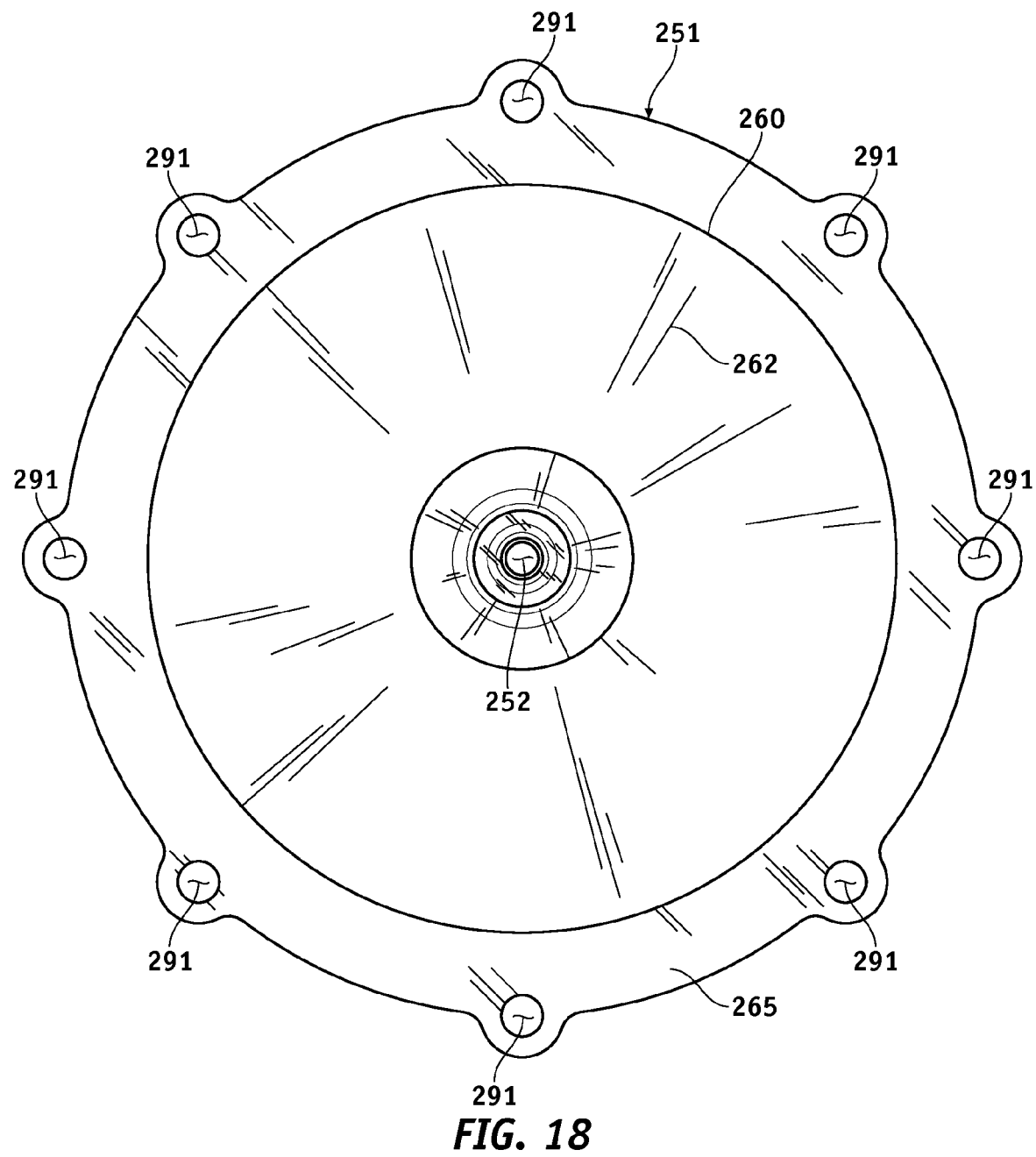
FIG. 18 is a bottom plan view of the oil monitoring and maintenance cap of FIG. 16.
Figure 19:
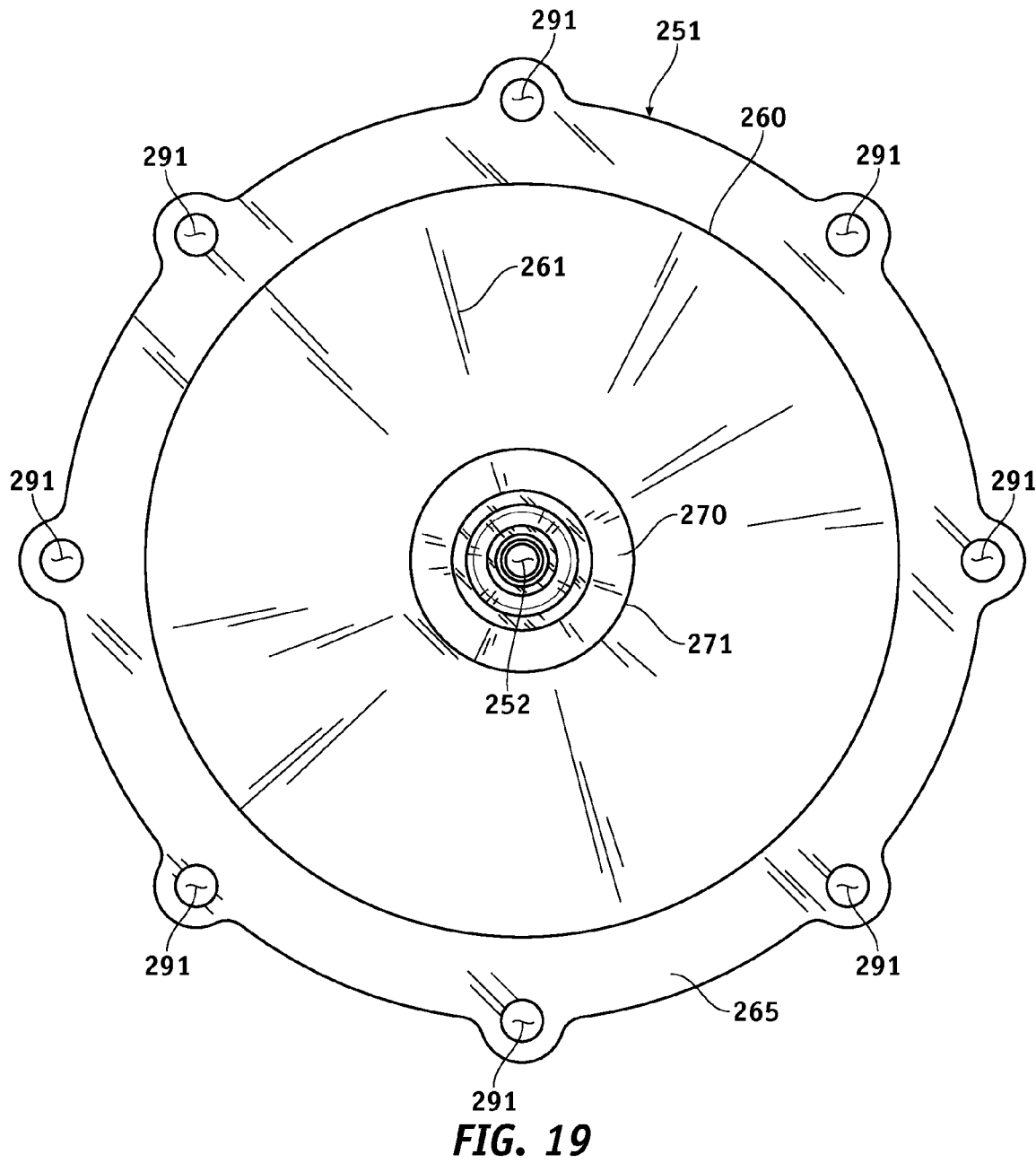
FIG. 19 is a top plan view of the oil monitoring and maintenance cap of FIG. 16.
Figure 20:
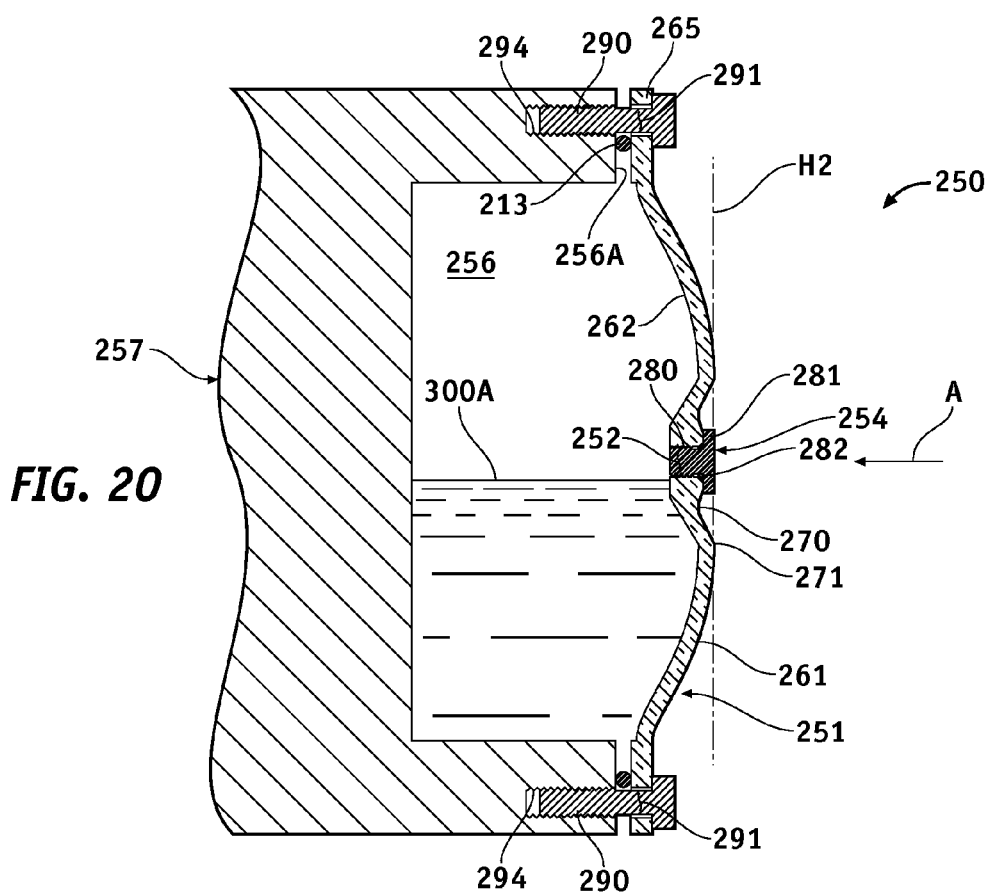
FIG. 20 is a section view of the embodiment of FIG. 16 shown installed capping a lubricating oil reservoir of a roller.
Figure 21:
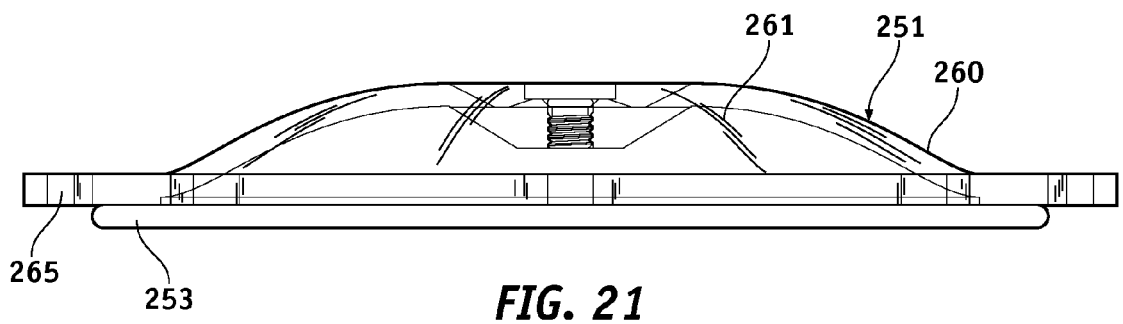
FIG. 21 is a right side elevation view of the oil monitoring and maintenance cap of FIG. 16, the opposite left side elevation view being the same thereof.
Figure 22:
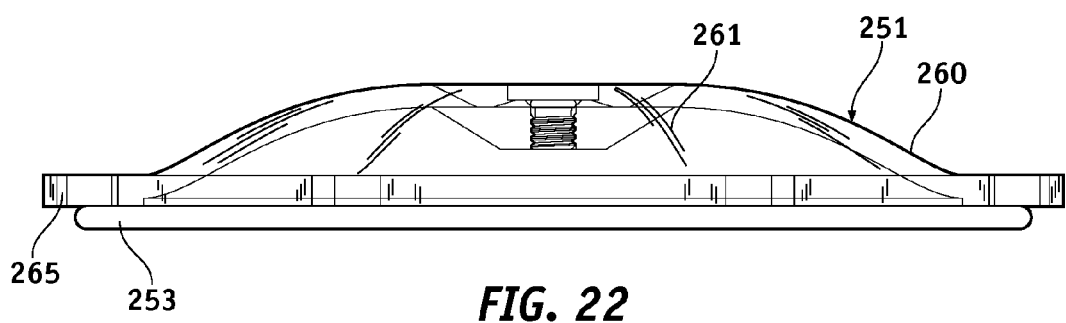
FIG. 22 is a front elevation view of the oil monitoring and maintenance cap of FIG. 16, the opposite rear elevation view being the same thereof.

FIG. 16 is an exploded top perspective view of yet another embodiment of an oil monitoring and maintenance cap assembly 250 including an oil monitoring and maintenance cap 251 formed with a lubricating oil maintenance port 252, a gasket 253, and a plug 254 used to open and close port 252 formed in cap 251. As matter of illustration and reference, FIG. 17 is an exploded bottom perspective view of the embodiment of FIG. 16, FIG. 18 is a bottom plan view of cap 251, FIG. 19 is a top plan view of cap 251, FIG. 20 is a section view of the embodiment of FIG. 16 shown installed capping a lubricating oil reservoir 256 of a roller 257, FIG. 21 is a right side elevation view of cap 251 with gasket 253 applied thereto, the opposite left side elevation view being the same thereof, and FIG. 22 is a front elevation view of cap 251 with gasket 253 applied thereto, the opposite rear elevation view being the same thereof. Roller 257 shown in FIG. 20 is generally representative of a track roller of a tracked vehicle, like roller 80 discussed above. As is known in the art, reservoir 256 maintains a volume of a lubricating oil, which provides lubrication to roller 257 to reduce roller friction and draw and dissipate heat away from roller 257. Cap assembly 250 is removably secured to open end 256A of reservoir 256 closing open end 256A of reservoir 256 enclosing and sealing the volume of lubricating oil in reservoir 256, and provides visual access into reservoir 256 for lubricating oil level and quality monitoring purposes as will be explained.

Referencing FIGS. 16-22 in relevant part, which demonstrate the structure and design attributes of cap 251, cap 251 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 251 is preferably formed integrally, such as by molding, or machining from a billet or other stock work-piece. Cap 251 consists of a sealing body 260 including an outer face 261 and an opposed inner face 262 that meet at an outer perimeter extremity, which, in the present embodiment, is characterized by a circular perimeter or parametric flange 265. Sealing body 260 has a substantially uniform thickness extending between outer and inner faces 261 and 262. In the present embodiment, sealing body 260 has a thickness extending between outer and inner faces 261 and 262 in a range of approximately 7-9 millimeters.

As best seen in FIG. 20, sealing body 260 bulges outwardly from parametric flange 265, characterized in that outer and inner faces 261 and 262 are convex and concave, respectively, extending from parametric flange 265 to a geometric center of sealing body 260 formed by a depression 270 with a raised rim 271 formed in outer face 261 of sealing body. Depression 270 is formed in outer face 261 of sealing body 260 at the geometric center of sealing body 260, and is encircled by raised rim 271. Port 252 is formed in sealing body 260 at the geometric center of sealing body 260, and is formed at depression 270. Port 252 extends through sealing body 260 at depression 270 from outer face 261 of sealing body 260 to inner face 262 of sealing body 260.

Port 252 is adapted to receive plug 254 to close and seal port 252. Looking to FIGS. 16, 17, and 20, plug 254 is formed of a strong, hard, impact resistant, temperature resistant, chemical resistant, and non-conductive material or combination of materials, such as plastic, and consists of a threaded post 280 formed with a broad, enlarged head 281. A gasket 282, shown in FIGS. 17 and 20, encircles post 280, and is located along the underside of head 281. Post 280 relates to port 252 and is used to open and close port 252, in which case plug 254 is movable between an open position detached from and opening port 252 as shown in FIGS. 16 and 17 to provide access therethrough to reservoir 256 depicted in FIG. 20 for lubricating oil replacement and replenishment purposes, and a closed position applied to and closing port 252 as shown in FIG. 20. Port 252 is inwardly threaded, and post 280 of plug 254 is correspondingly outwardly threaded. To apply and secure plug 254 to port 252, plug 254 is taken up, such as by hand, and applied into depression 270 in a direction toward outer face 261 and post 280 is applied to port 252 and is threaded into port 252 through rotation and is tightened securing in place tightening the underside of head 280 against outer face 261 at depression 270. In the closed position of plug 254 as shown in FIG. 20, gasket 282 is applied between head 281 of plug 254 and port 252 providing a fluid-impervious seal between plug 254 and port 252.

As seen in FIG. 20, rim 271 defines and extends along a plane or horizon H2, and depression 270 extends into outer face 261 and is defined inwardly from horizon H2. In the closed position of plug 254 applied to and closing port 252, plug 254 is positioned in depression 270 and extends outwardly from outer face 261 of sealing body 260 into depression 270 no further than horizon H2 of rim 271 thereby isolating plug 254 from shearing forces across outer face 261 of sealing body 260. In a further and more specific aspect, in the close position of plug 254 threaded in port 252 and tightened in place the underside of head 114 is tightened against outer face 261 of sealing body 260 at depression 270, and head 280 of plug 254 projects or otherwise extends outwardly from outer face 261 of sealing body 260 into depression 270 no further than horizon H2 of rim 271 thereby isolating head 280 of plug 254 from shearing forces across outer face 261 of sealing body 260. In the elevation views of FIGS. 21 and 22, plug 254 is shown installed with cap 251.

FIG. 20 is a highly generalized representation of reservoir 256 formed in roller 257 and which has an open end 256A, and this is a conventional and well-known arrangement in the art. Gasket 253 and flange 265 of cap 251 relate to open end 256A to reservoir 256. In the installation of assembly 250 to reservoir 256, gasket 253 is applied to open end 256A, and cap 251 is taken up and inner face 262 is directed toward open end 256A and cap is then moved toward open end 256A so as to apply inner face 262 of flange 265 of sealing body 260 of cap 251 against gasket 253. Flange 265 is then secured in place to open end 256A closing open end 256A with cap 251, whereby sealing body 260 spans open end 256A of reservoir 256 and gasket 253 is applied between open end 256A of reservoir 256 and flange 265, which provides a fluid-impervious seal between sealing body 260 and open end 256A. With assembly 250 so installed, outer face 261 of sealing body 260 faces away from open end 256A and opposed inner face 262 faces open end 256A to reservoir 256. Cap 251 is preferably installed with plug 254 applied to and closing port 252. However, plug 254 may be applied to close port 252 after cap 251 is installed on open end 256A of reservoir 256.

Cap 251 is secured to open end 256A of reservoir with fasteners, which, in the present embodiment, are bolts 290. In this embodiment, flange 265 is formed with spaced-apart bolt holes 291, which relate or otherwise correspond to bolt holes 294 formed in open end 256A of reservoir 256. As a matter of illustration and reference, FIG. 20 shows two such bolt holes 294 formed in open end 256A of reservoir 256. In the application of assembly 250 to open end 256A of reservoir, bolt holes 291 of flange 265 of cap 251 are registered with bolt holes 294 formed in open end 256A of reservoir 256. Bolts 290 are applied to the aligned bolt holes 291 and are threaded into bolt holes 294 formed in open end 256A of reservoir 256 and are then tightened so as to secure assembly 250 in place as shown in FIG. 20. In the present embodiment there are eight bolt holes 294 in open end 256A of reservoir 256, and there are eight bolt holes 291 in cap 251 that correspond with the eight bolt holes 294 formed in open end 256A.

And so having secured assembly 250 in place to open end 256A of reservoir 256 closing open end 256A and with plug 254 installed in place in its closed position closing port 252, a volume of a lubricating 300 is then applied to reservoir 256 in the conventional manner, whereby roller 257 is then prepared and ready for use in the operation of a vehicle incorporating roller 257 in the normal manner. As cap 251 is transparent, sealing body 260 spanning open end 256A of reservoir 256 is transparent to provide visual access therethrough in the direction indicated by arrowed line A into reservoir 256 through open end 256A for lubricating oil level and quality monitoring purposes, in accordance with the principle of the invention.

In the normal and customary operational position of roller 257, reservoir 256 is horizontal and open end 256A is vertical, and this orientation is clearly depicted in FIG. 20. In this orientation of reservoir 256 and open end 256A, cap 251 is vertically disposed such that sealing body 260 extends vertically across open end 256A of reservoir 256. The volume of lubricating oil 300 applied to reservoir 256 thus extends upwardly into reservoir 256 along inner face 262 of sealing body 260 to level 300A just below port 252 closed and sealed by plug 254. Again, the transparent character of sealing body 260 provides visual access therethrough into lubricating oil reservoir 256 through open end 256A for lubricating oil 300 level 300A and quality monitoring purposes. As the volume of lubricating oil 300 is readily and easily visualized through sealing body 260, level 300A of oil can easily be seen as can the quality of the volume of lubricating oil 300. Should level 300A of the volume of lubricating oil 300 be seen as too low, it may be replenished. Should the quality of the volume of lubricating oil 300 be seen as compromised, such as by dirt and debris, the volume of lubricating oil 300 may be withdrawn from reservoir 256 and replaced. Port 252 is useful for replenishing and replacing lubricating oil in reservoir 256. To replenish the volume of lubricating oil 300 should level 300A fall to an unacceptably low level, plug 254 is detached from port 252 and moved to its open position to open port 252, replenishing oil is applied to reservoir 256 through open port 252, and port 252 is reclosed by reinstalling plug 254 to port 252 placing plug 254 back to its closed position closing and sealing port 252. To replace volume of lubricating oil 300 with a fresh volume of a lubricating oil, plug 254 is detached from port 252 and moved to its open position to open port 252, volume of lubricating oil 300 is withdrawn from reservoir 256 through port 252, a fresh volume of a lubricating oil is applied to reservoir 256 through port 252, and port 252 is reclosed by reinstalling plug 254 to port 252 placing plug 254 back to its closed position closing and sealing port 252.

In the vertical positioning of cap 251 as shown in FIG. 20 such that sealing body 260 extends vertically across open end 256A of reservoir 256, it is again emphasized that in the closed position of plug 254 applied to and closing port 252, plug 254 is positioned in depression 270 and extends outwardly from outer face 261 of sealing body 260 into depression 270 no further than horizon H2 of rim 271 thereby isolating plug 254 from shearing forces across outer face 261 of sealing body 260 that could otherwise rip plug 254 from port 252 or otherwise damage plug 254. These shearing forces can be applied by plants or crops or bushes or the like that brush across outer face 261 of sealing body 260 in the normal operation of roller 257 in the normal operation of the vehicle incorporating roller 257. More particularly, in the close position of plug 254 threaded in port 252 and tightened in place the underside of head 114 is tightened against outer face 261 of sealing body 260 at depression 270, and head 280 of plug 254 projects or otherwise extends outwardly from outer face 261 of sealing body 260 into depression 270 no further than horizon H2 of rim 271 thereby isolating head 280 of plug 254 from shearing forces across outer face 261 of sealing body 260 that, again, could otherwise rip plug 254 from port 252 or otherwise damage plug 254.

Figure 23:
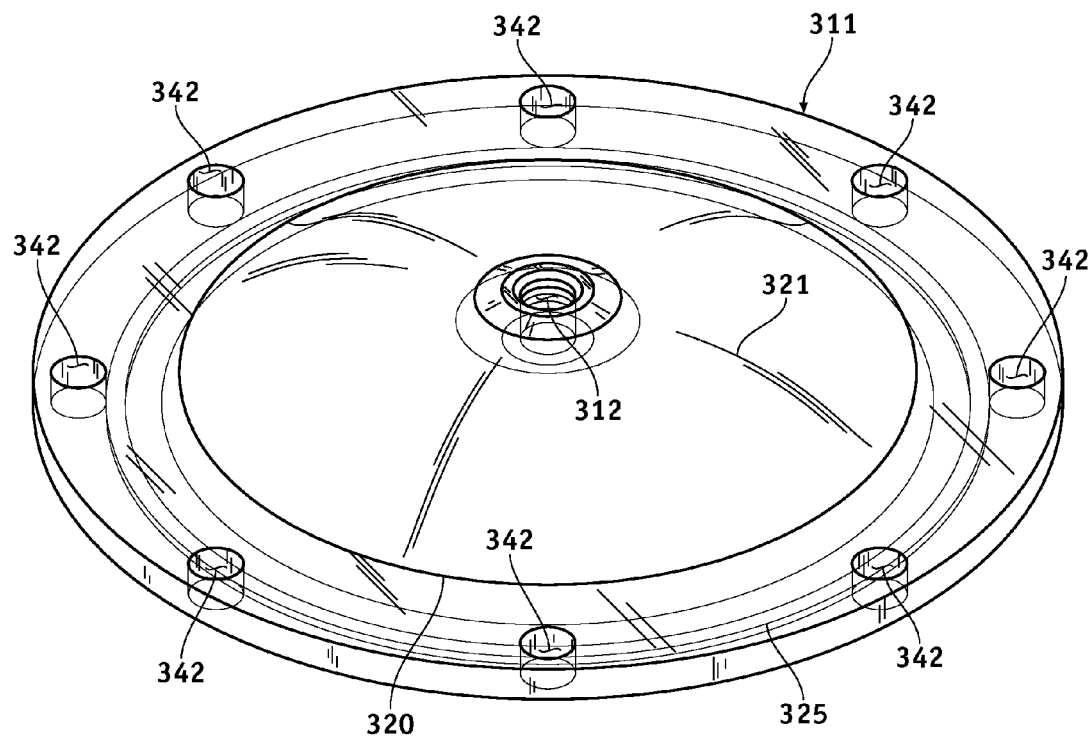
FIG. 23 is a top perspective view of a further embodiment of an oil monitoring and maintenance cap constructed and arranged in accordance with the principle of the invention.
Figure 24:
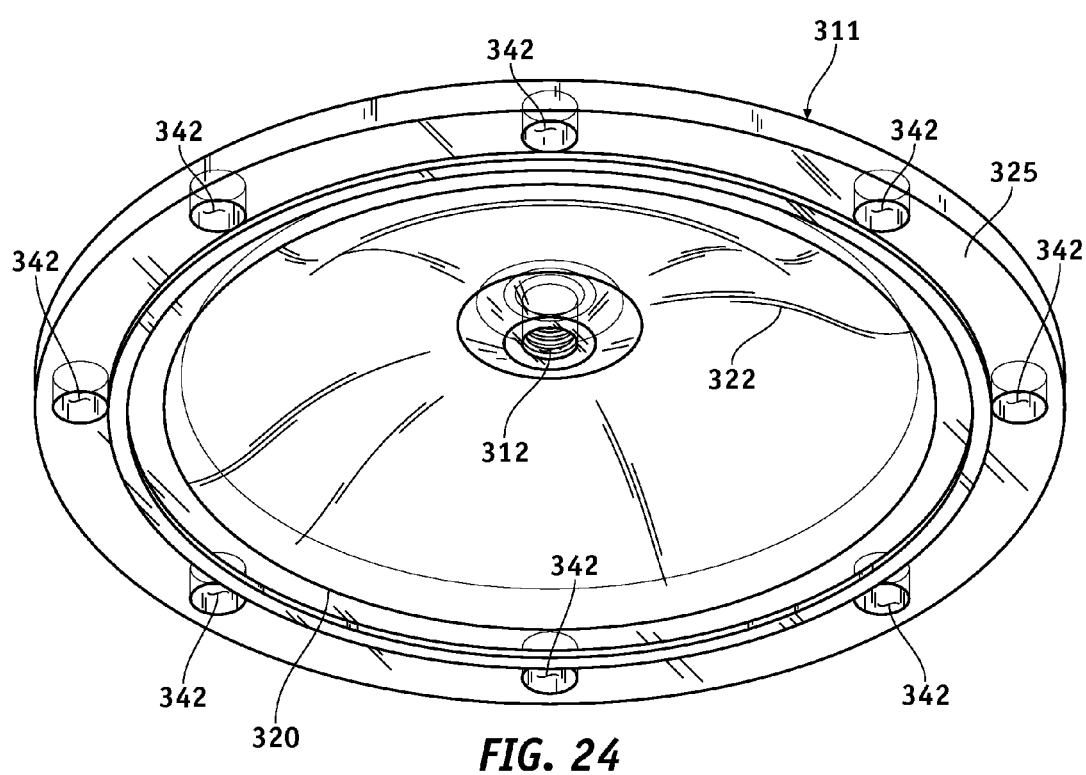
FIG. 24 is a bottom perspective view of the embodiment of FIG. 23.
Figure 25:
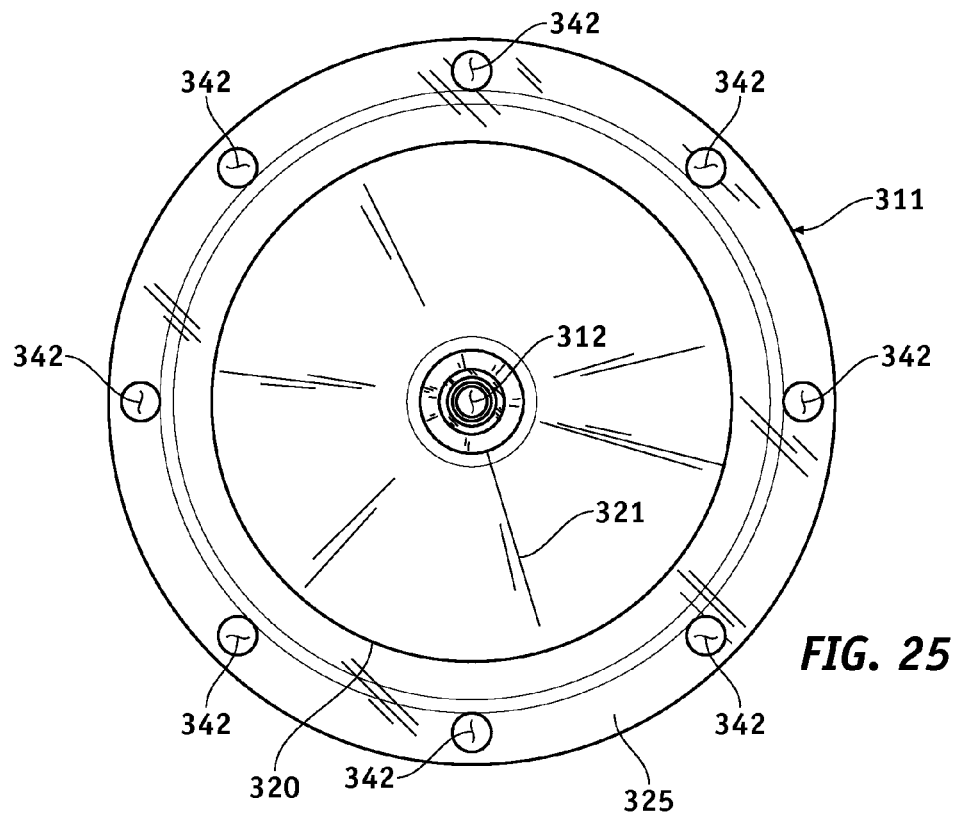
FIG. 25 is a top plan view of the embodiment of FIG. 23.
Figure 26:
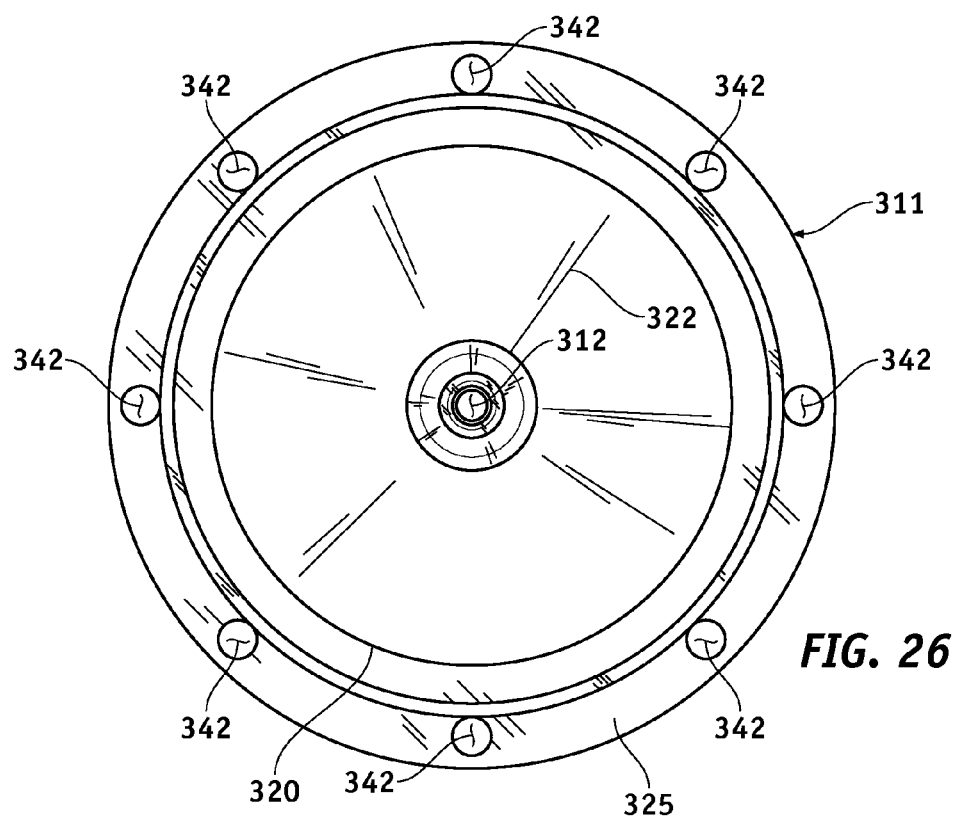
FIG. 26 is a bottom plan view of the embodiment of FIG. 23.
Figure 27:
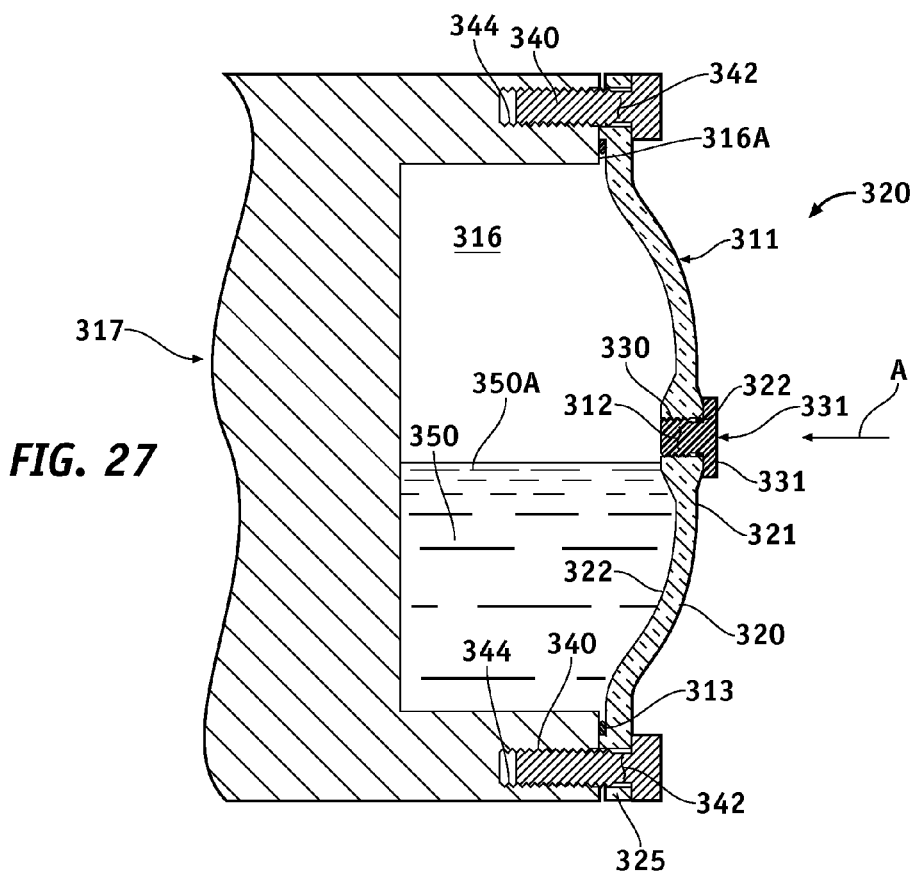
FIG. 27 is a section view of an oil monitoring and maintenance cap assembly, incorporating the oil monitoring and maintenance cap of FIG. 23, shown installed capping a lubricating oil reservoir of a roller.
Figure 28:
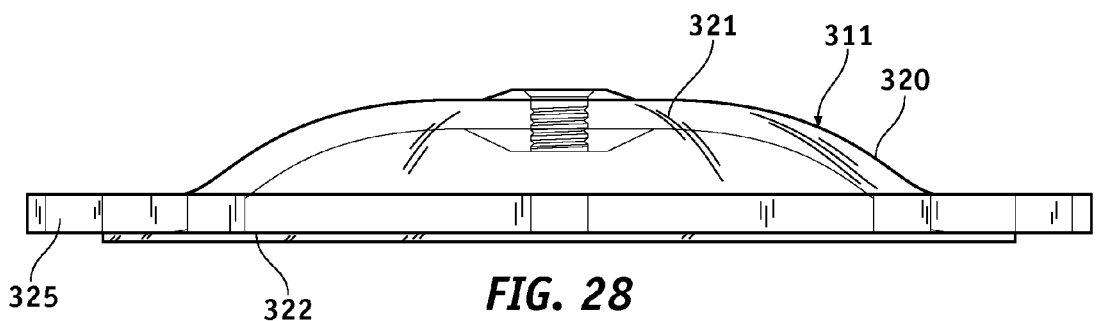
FIG. 28 is a right side elevation view of the oil monitoring and maintenance cap of FIG. 23, the opposite left side elevation view being the same thereof.
Figure 29:
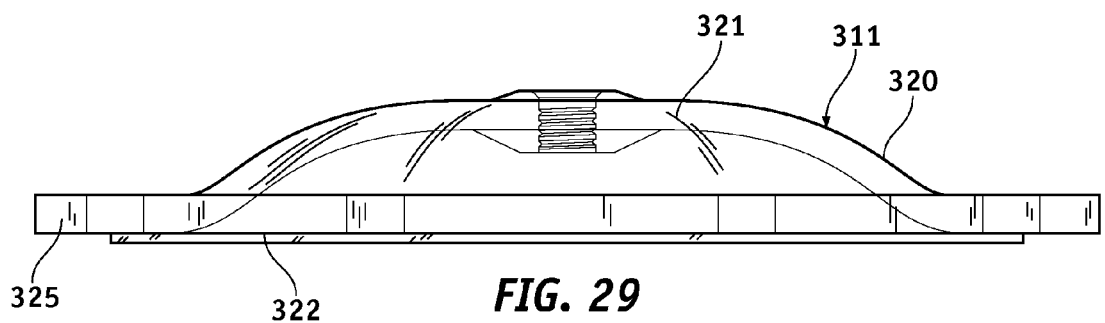
FIG. 29 is a front elevation view of the oil monitoring and maintenance cap of FIG. 23, the opposite rear elevation view being the same thereof.

FIG. 23 is a top perspective view of a further embodiment of an oil monitoring and maintenance cap 311 constructed and arranged in accordance with the principle of the invention. FIG. 24 is a bottom perspective view of the embodiment of FIG. 23, FIG. 25 is a top plan view of cap 311, FIG. 26 is a bottom plan view of cap 311, and FIG. 27 is a section view of an oil monitoring and maintenance cap assembly 310, incorporating cap 311, shown installed capping a lubricating oil reservoir 316 of a roller 317. FIG. 28 is a right side elevation view of cap 311, the opposite left side elevation view being the same thereof, and FIG. 29 is a front elevation view of cap 311, the opposite rear elevation view being the same thereof. Roller 317 shown in FIG. 27 is generally representative of a track roller of a tracked vehicle, like roller 80 discussed above. As is known in the art, reservoir 316 maintains a volume of a lubricating oil, which provides lubrication to roller 317 to reduce roller friction and draw and dissipate heat away from roller 317. Cap assembly 310 is removably secured to open end 316A of reservoir 316 closing open end 316A of reservoir 316 enclosing and sealing the volume of lubricating oil in reservoir 316, and provides visual access into reservoir 316 for lubricating oil level and quality monitoring purposes as will be explained.

Referencing FIGS. 23-29 in relevant part, which demonstrate the structure and design attributes of cap 311, cap 311 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 311 is preferably formed integrally, such as by molding, or machining from a billet or other stock work-piece. Cap 311 consists of a sealing body 320 including an outer face 321 and an opposed inner face 322 that meet at an outer perimeter extremity, which, in the present embodiment, is characterized by a circular perimeter or parametric flange 325. Sealing body 320 has a substantially uniform thickness extending between outer and inner faces 321 and 322. In the present embodiment, sealing body 320 has a thickness extending between outer and inner faces 321 and 322 in a range of approximately 7-9 millimeters.

As best seen in FIG. 27, sealing body 320 bulges outwardly from parametric flange 325, characterized in that outer and inner faces 321 and 322 are convex and concave, respectively, extending from parametric flange 325 to a geometric center of sealing body 320 formed with port 312. Port 312 is formed in sealing body 320 at the geometric center of sealing body 320. Port 312 extends through sealing body 320 at depression 270 from outer face 321 of sealing body 320 to inner face 322 of sealing body 320.

Port 312 is adapted to receive plug 314 to close and seal port 312 as shown in FIG. 27. Plug 314 is formed of a strong, hard, impact resistant, temperature resistant, chemical resistant, and non-conductive material or combination of materials, such as plastic, and consists of a threaded post 330 formed with a broad, enlarged head 331. A gasket 332 encircles post 330, and is located along the underside of head 331. As in the prior embodiments, post 330 relates to port 312 and is used to open and close port 312, in which case plug 314 is movable between an open position detached from and opening port 312 to provide access therethrough to reservoir 316 depicted in FIG. 27 for lubricating oil replacement and replenishment purposes, and a closed position applied to and closing port 312. Port 312 is inwardly threaded, and post 330 of plug 314 is correspondingly outwardly threaded. To apply and secure plug 314 to port 312, plug 314 is taken up, such as by hand, and applied into depression 270 in a direction toward outer face 321 and post 330 is applied to port 312 and is threaded into port 312 through rotation and is tightened securing in place tightening the underside of head 330 against outer face 321 at depression 270. In the closed position of plug 314 as shown in FIG. 27, gasket 332 is applied between head 331 of plug 314 and port 312 providing a fluid-impervious seal between plug 314 and port 312.

FIG. 27 is a highly generalized representation of reservoir 316 formed in roller 317 and which has an open end 316A, and this is a conventional and well-known arrangement in the art. A gasket 313, and flange 325 of cap 311 relate to open end 316A to reservoir 316. In the installation of assembly 310 to reservoir 316, gasket 313 is applied to open end 316A, and cap 311 is taken up and inner face 322 is directed toward open end 316A and cap is then moved toward open end 316A so as to apply inner face 322 of flange 325 of sealing body 320 of cap 311 against gasket 313. Flange 325 is then secured in place to open end 316A closing open end 316A with cap 311, whereby sealing body 320 spans open end 316A of reservoir 316 and gasket 313 is applied between open end 316A of reservoir 316 and flange 325, which provides a fluid-impervious seal between sealing body 320 and open end 316A. With assembly 310 so installed, outer face 321 of sealing body 320 faces away from open end 316A and opposed inner face 322 faces open end 316A to reservoir 316. Cap 311 is preferably installed with plug 314 applied to and closing port 312. However, plug 314 may be applied to close port 312 after cap 311 is installed on open end 316A of reservoir 316. Cap 311 is secured to open end 316A of reservoir with fasteners, which, in the present embodiment, are bolts 340. In this embodiment, flange 325 is formed with spaced-apart bolt holes 342 that relate or otherwise correspond to bolt holes 344 formed in open end 316A of reservoir 316. As a matter of illustration and reference, FIG. 27 shows two such bolt holes 344 formed in open end 316A of reservoir 316. In the application of assembly 310 to open end 316A of reservoir 316, gasket 313 is positioned between flange 325 and open end 316A and bolt holes 342 of flange 325 of cap 311 are registered with bolt holes 344 formed in open end 316A of reservoir 316. Bolts 340 are applied to bolt holes 342 and are threaded into bolt holes 344 formed in open end 316A of reservoir 316 and are then tightened so as to secure assembly 310 in place as shown in FIG. 27. In the present embodiment there are eight bolt holes 344 in open end 316A of reservoir 316, and there are eight bolt holes 342 in cap 311 that correspond with the eight bolt holes 344 formed in open end 316A.

And so having secured assembly 310 in place to open end 316A of reservoir 316 closing open end 316A and with plug 314 installed in place in its closed position closing port 312, a volume of a lubricating 350 is then applied to reservoir 316 in the conventional manner, whereby roller 317 is then prepared and ready for use in the operation of a vehicle incorporating roller 317 in the normal manner. As cap 311 is transparent, sealing body 320 spanning open end 316A of reservoir 316 is transparent to provide visual access therethrough in the direction indicated by arrowed line A into reservoir 316 through open end 316A for lubricating oil level and quality monitoring purposes, in accordance with the principle of the invention.

In the normal and customary operational position of roller 317, reservoir 316 is horizontal and open end 316A is vertical, and this orientation is clearly depicted in FIG. 27. In this orientation of reservoir 316 and open end 316A, cap 311 is vertically disposed such that sealing body 320 extends vertically across open end 316A of reservoir 316. The volume of lubricating oil 350 applied to reservoir 316 thus extends upwardly into reservoir 316 along inner face 322 of sealing body 320 to level 350A just below port 312 closed and sealed by plug 314. Again, the transparent character of sealing body 320 provides visual access therethrough into lubricating oil reservoir 316 through open end 316A for lubricating oil 350 level 350A and quality monitoring purposes. As the volume of lubricating oil 350 is readily and easily visualized through sealing body 320, level 350A of oil can easily be seen as can the quality of the volume of lubricating oil 350. Should level 350A of the volume of lubricating oil 350 be seen as too low, it may be replenished. Should the quality of the volume of lubricating oil 350 be seen as compromised, such as by dirt and debris, the volume of lubricating oil 350 may be withdrawn from reservoir 316 and replaced. Port 312 is useful for replenishing and replacing lubricating oil in reservoir 316. To replenish the volume of lubricating oil 350 should level 350A fall to an unacceptably low level, plug 314 is detached from port 312 and moved to its open position to open port 312, replenishing oil is applied to reservoir 316 through open port 312, and port 312 is reclosed by reinstalling plug 314 to port 312 placing plug 314 back to its closed position closing and sealing port 312. To replace volume of lubricating oil 350 with a fresh volume of a lubricating oil, plug 314 is detached from port 312 and moved to its open position to open port 312, volume of lubricating oil 350 is withdrawn from reservoir 316 through port 312, a fresh volume of a lubricating oil is applied to reservoir 316 through port 312, and port 312 is reclosed by reinstalling plug 314 to port 312 placing plug 314 back to its closed position closing and sealing port 312.

Figure 30:
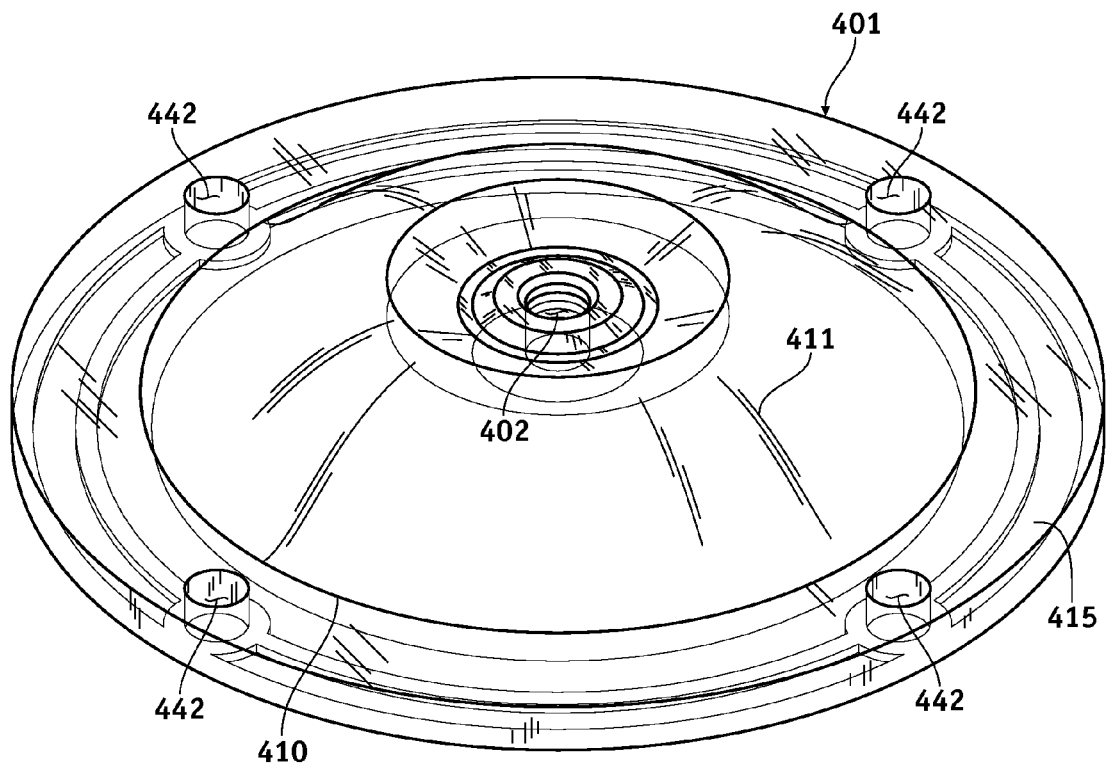
FIG. 30 is a top perspective view of yet a further embodiment of an oil monitoring and maintenance cap constructed and arranged in accordance with the principle of the invention.
Figure 31:
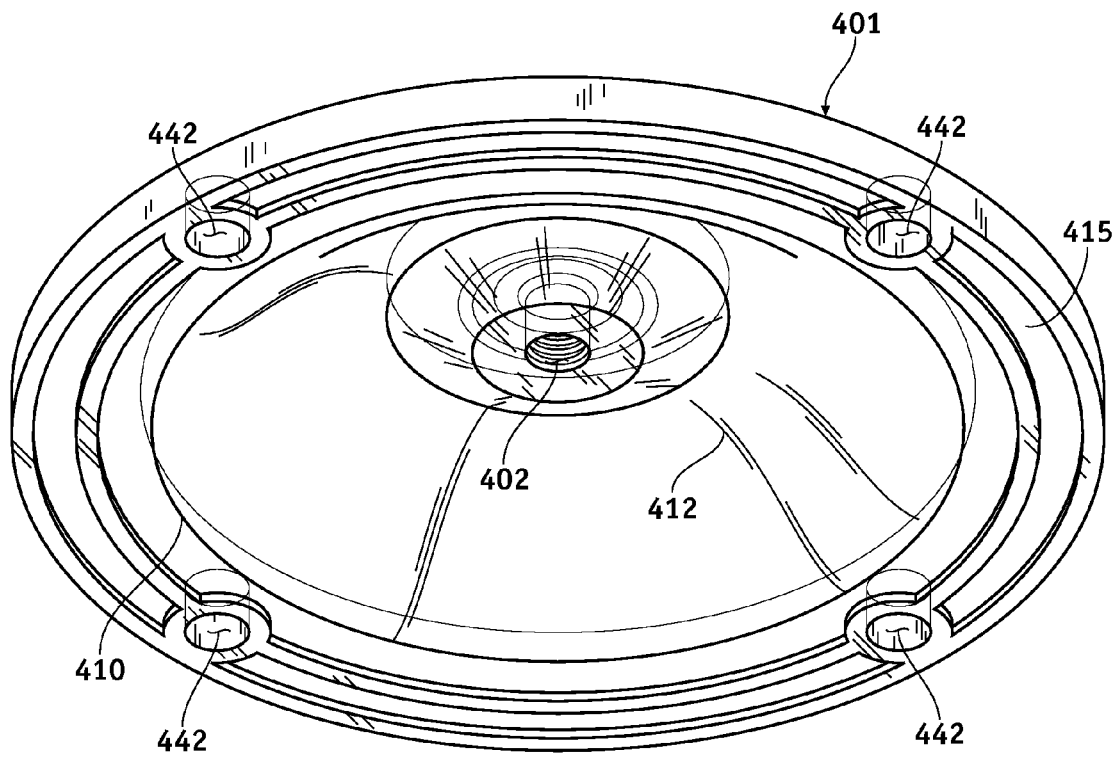
FIG. 31 is a bottom perspective view of the embodiment of FIG. 30.
Figure 32:
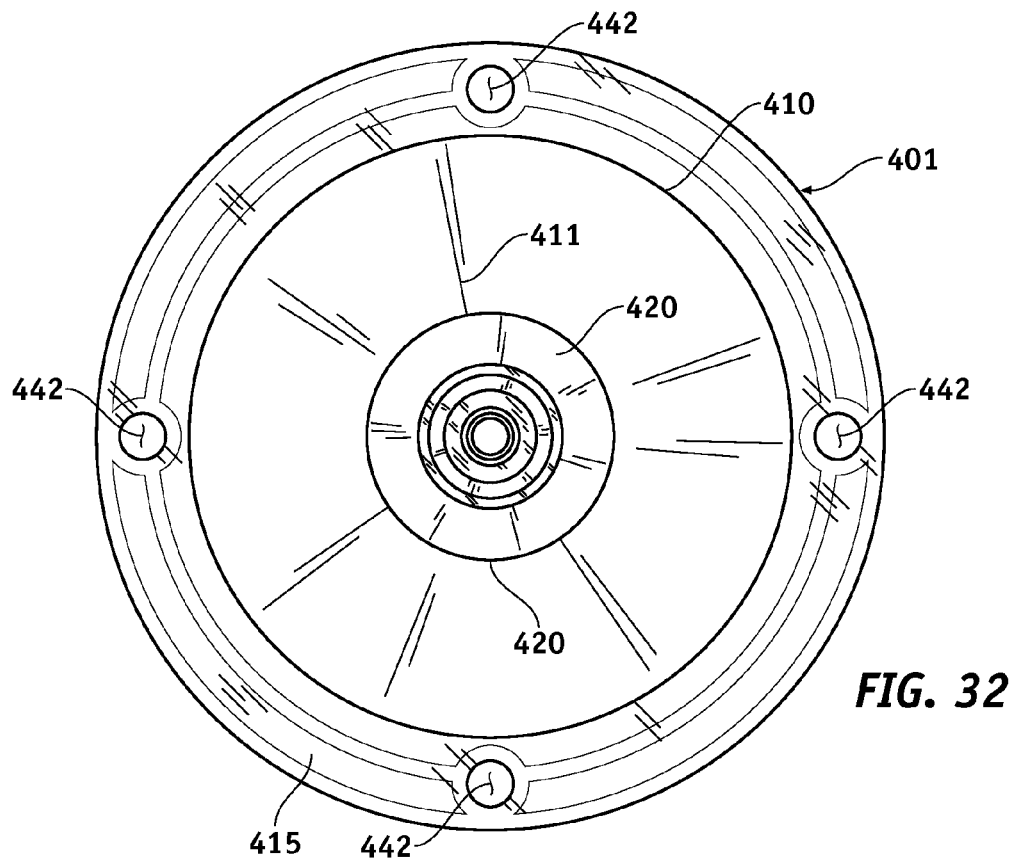
FIG. 32 is a top plan view of the embodiment of FIG. 30.
Figure 33:
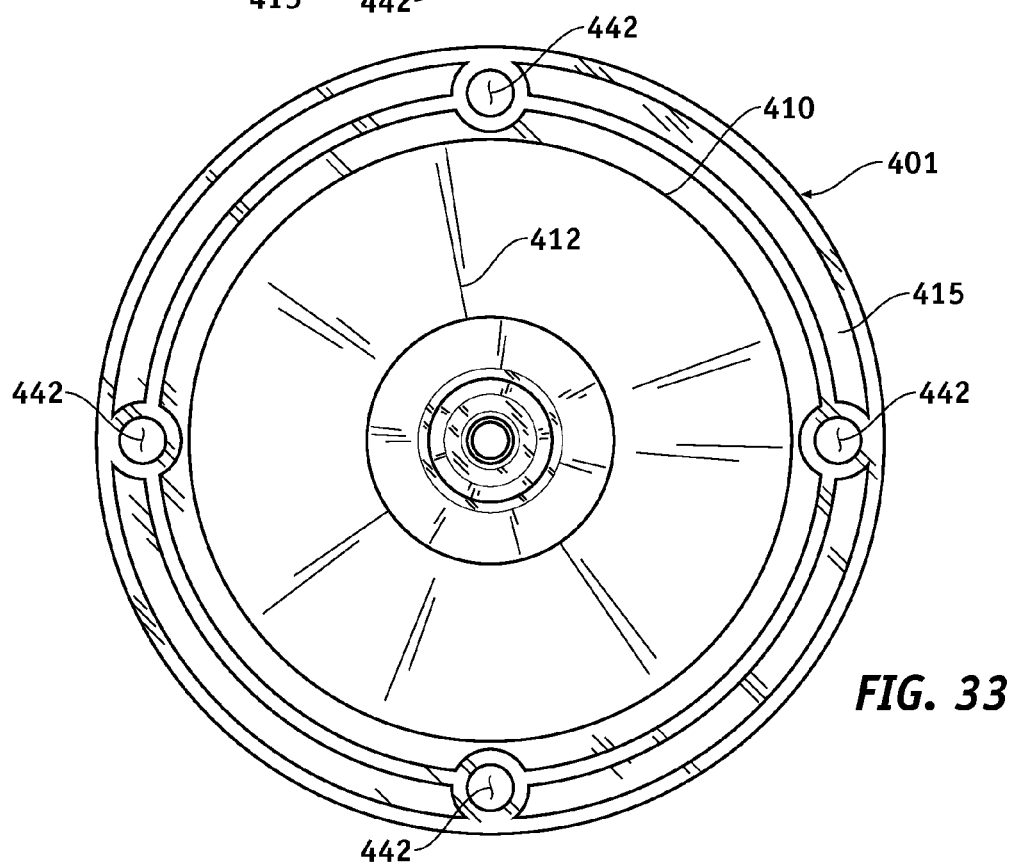
FIG. 33 is a bottom plan view of the embodiment of FIG. 30.
Figure 34:
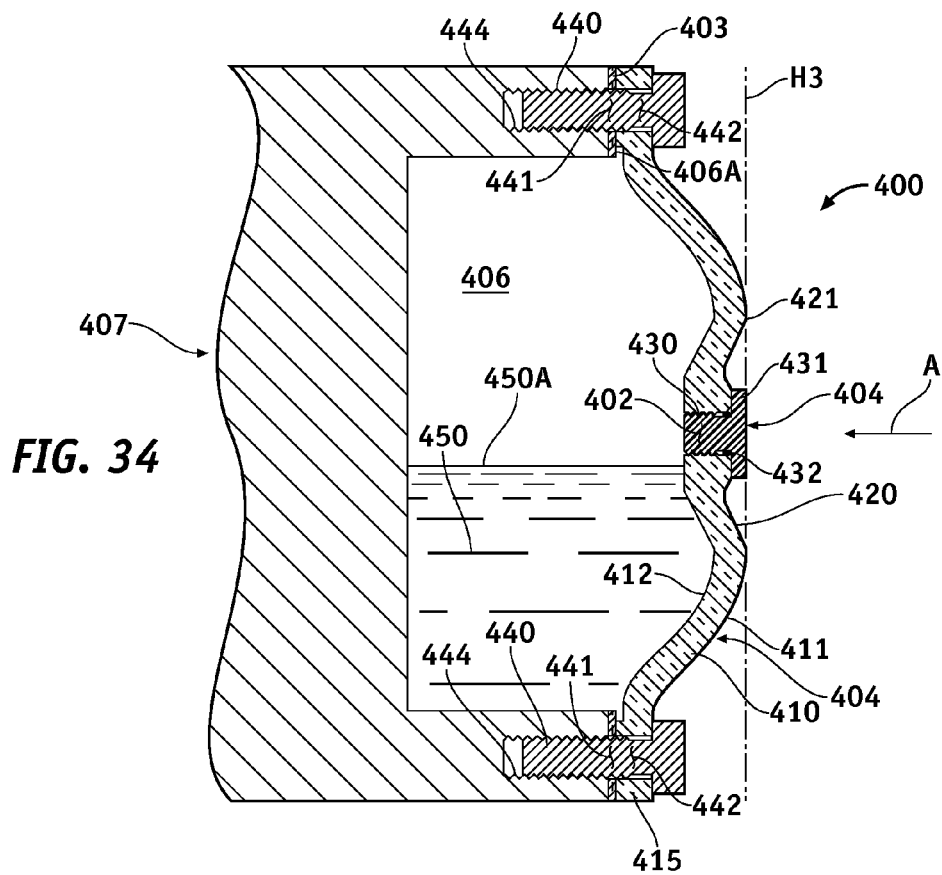
FIG. 34 is a section view of an oil monitoring and maintenance cap assembly, incorporating the oil monitoring and maintenance cap of FIG. 30, shown installed capping a lubricating oil reservoir of a roller.
Figure 35:
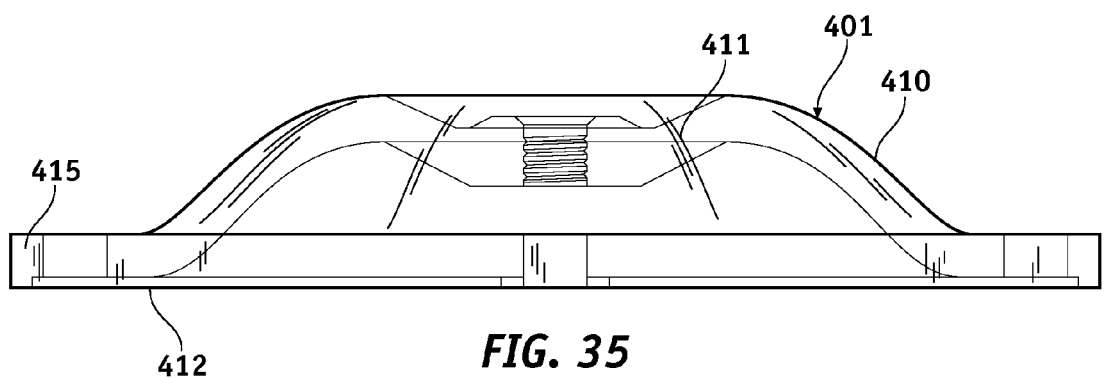
FIG. 35 is a right side elevation view of the oil monitoring and maintenance cap of FIG. 30, the opposite left side elevation view being the same thereof.
Figure 36:
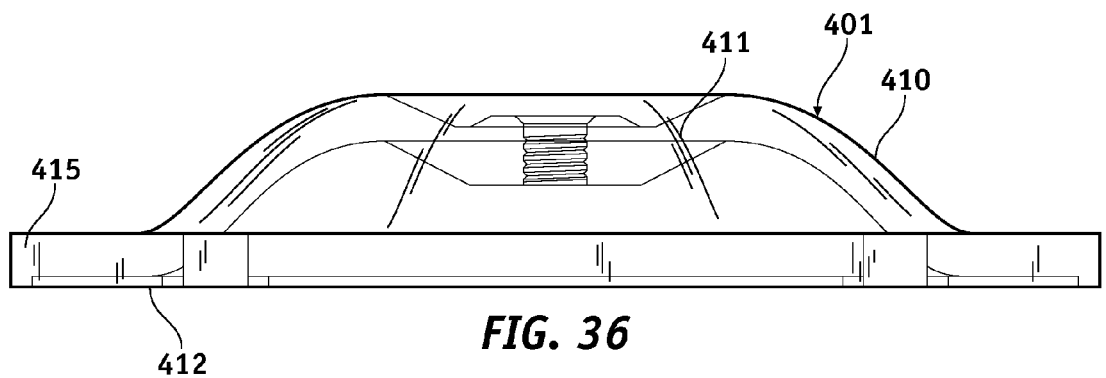
FIG. 36 is a front elevation view of the oil monitoring and maintenance cap of FIG. 30, the opposite rear elevation view being the same thereof.

FIG. 30 is a top perspective view of a still a further embodiment of an oil monitoring and maintenance cap 401 constructed and arranged in accordance with the principle of the invention. FIG. 31 is a bottom perspective view of the embodiment of FIG. 30, FIG. 32 is a top plan view of cap 401, FIG. 33 is a bottom plan view of cap 401, and FIG. 34 is a section view of an oil monitoring and maintenance cap assembly 400, incorporating cap 401, shown installed capping a lubricating oil reservoir 406 of a roller 407. FIG. 35 is a right side elevation view of cap 401, the opposite left side elevation view being the same thereof, and FIG. 36 is a front elevation view of cap 401, the opposite rear elevation view being the same thereof. Roller 407 shown in FIG. 34 is generally representative of a track roller of a tracked vehicle, like roller 80 discussed above. As is known in the art, reservoir 406 maintains a volume of a lubricating oil, which provides lubrication to roller 407 to reduce roller friction and draw and dissipate heat away from roller 407. Cap assembly 400 is removably secured to open end 406A of reservoir 406 closing open end 406A of reservoir 406 enclosing and sealing the volume of lubricating oil in reservoir 406, and provides visual access into reservoir 406 for lubricating oil level and quality monitoring purposes as will be explained.

Referencing FIGS. 30-36 in relevant part, which demonstrate the structure and design attributes of cap 401, cap 401 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 401 is preferably formed integrally, such as by molding, or machining from a billet or other stock work-piece. Cap 401 consists of a sealing body 410 including an outer face 411 and an opposed inner face 412 that meet at an outer perimeter extremity, which, in the present embodiment, is characterized by a circular perimeter or parametric flange 415. Sealing body 410 has a substantially uniform thickness extending between outer and inner faces 411 and 412. In the present embodiment, sealing body 410 has a thickness extending between outer and inner faces 411 and 412 in a range of approximately 7-9 millimeters.

As best seen in FIG. 34, sealing body 410 bulges outwardly from parametric flange 415, characterized in that outer and inner faces 411 and 412 are convex and concave, respectively, extending from parametric flange 415 to a geometric center of sealing body 410 formed by a depression 420 with a raised rim 421 formed in outer face 411 of sealing body. Depression 420 is formed in outer face 411 of sealing body 410 at the geometric center of sealing body 410, and is encircled by raised rim 421. Port 402 is formed in sealing body 410 at the geometric center of sealing body 410, and is formed at depression 420. Port 402 extends through sealing body 410 at depression 420 from outer face 411 of sealing body 410 to inner face 412 of sealing body 410.

Port 402 is adapted to receive plug 404 to close and seal port 402. Looking to FIG. 34, plug 404 is formed of a strong, hard, impact resistant, temperature resistant, chemical resistant, and non-conductive material or combination of materials, such as plastic, and consists of a threaded post 430 formed with a broad, enlarged head 431. A gasket 432 encircles post 430, and is located along the underside of head 431. Post 430 relates to port 402 and is used to open and close port 402, in which case plug 404 is movable between an open position detached from and opening port 402 to provide access therethrough to reservoir 406 depicted in FIG. 34 for lubricating oil replacement and replenishment purposes, and a closed position applied to and closing port 402 as shown in FIG. 34. Port 402 is inwardly threaded, and post 430 of plug 404 is correspondingly outwardly threaded. To apply and secure plug 404 to port 402, plug 404 is taken up, such as by hand, and applied into depression 420 in a direction toward outer face 411 and post 430 is applied to port 402 and is threaded into port 402 through rotation and is tightened securing in place tightening the underside of head 430 against outer face 411 at depression 420. In the closed position of plug 404 as shown in FIG. 34, gasket 432 is applied between head 431 of plug 404 and port 402 providing a fluid-impervious seal between plug 404 and port 402.

As seen in FIG. 34, rim 421 defines and extends along a plane or horizon H3, and depression 420 extends into outer face 411 and is defined inwardly from horizon H3. In the closed position of plug 404 applied to and closing port 402, plug 404 is positioned in depression 420 and extends outwardly from outer face 411 of sealing body 410 into depression 420 no further than horizon H3 of rim 421 thereby isolating plug 404 from shearing forces across outer face 411 of sealing body 410. In a further and more specific aspect, in the close position of plug 404 threaded in port 402 and tightened in place the underside of head 114 is tightened against outer face 411 of sealing body 410 at depression 420, and head 430 of plug 404 projects or otherwise extends outwardly from outer face 411 of sealing body 410 into depression 420 no further than horizon H3 of rim 421 thereby isolating head 430 of plug 404 from shearing forces across outer face 411 of sealing body 410.

FIG. 34 is a highly generalized representation of reservoir 406 formed in roller 407 and which has an open end 406A, and this is a conventional and well-known arrangement in the art. Gasket 403, which is shaped and formed like gasket 112 previously discussed in connection with assembly 100, and flange 415 of cap 401 relate to open end 406A to reservoir 406. In the installation of assembly 250 to reservoir 406, gasket 403 is applied to open end 406A, and cap 401 is taken up and inner face 412 is directed toward open end 406A and cap is then moved toward open end 406A so as to apply inner face 412 of flange 415 of sealing body 410 of cap 401 against gasket 403. Flange 415 is then secured in place to open end 406A closing open end 406A with cap 401, whereby sealing body 410 spans open end 406A of reservoir 406 and gasket 403 is applied between open end 406A of reservoir 406 and flange 415, which provides a fluid-impervious seal between sealing body 410 and open end 406A. With assembly 250 so installed, outer face 411 of sealing body 410 faces away from open end 406A and opposed inner face 412 faces open end 406A to reservoir 406. Cap 401 is preferably installed with plug 404 applied to and closing port 402. However, plug 404 may be applied to close port 402 after cap 401 is installed on open end 406A of reservoir 406.

Cap 401 is secured to open end 406A of reservoir with fasteners, which, in the present embodiment, are bolts 440. In this embodiment, gasket 403 is formed with spaced-apart bolt holes 441 and flange 415 is formed with spaced-apart bolt holes 442 that correspond with bolt holes 441 formed in gasket 403. Bolt holes 441 of gasket 403 and bolt holes 442 of flange 415 relate or otherwise correspond to bolt holes 444 formed in open end 406A of reservoir 406. As a matter of illustration and reference, FIG. 34 shows two such bolt holes 444 formed in open end 406A of reservoir 406. In the application of assembly 400 to open end 406A of reservoir 406, bolt holes 441 of gasket 403 are registered with the bolt holes 444 formed in open end 406A of reservoir 406 and bolt holes 442 of flange 415 are, in turn, registered with bolt holes 441 formed gasket 403 and thus bolt holes 444 formed in open end 406A of reservoir 406. Bolts 440 are applied to the aligned bolt holes 441 and 442 and are threaded into bolt holes 444 formed in open end 406A of reservoir 406 and are then tightened so as to secure assembly 100 in place as shown in FIG. 34. In the present embodiment there are four bolt holes 444 in open end 406A of reservoir 406, and there are four bolt holes 441 in gasket 403 (only two shown in FIG. 34) and four bolt holes 442 in cap 401 that correspond with the four bolt holes 444 formed in open end 406A. The overall design of cap 401 is generally similar to cap 110 previously discussed and is a variation of cap 110.

And so having secured assembly 250 in place to open end 406A of reservoir 406 closing open end 406A and with plug 404 installed in place in its closed position closing port 402, a volume of a lubricating oil 450 is then applied to reservoir 406 in the conventional manner, whereby roller 407 is then prepared and ready for use in the operation of a vehicle incorporating roller 407 in the normal manner. As cap 401 is transparent, sealing body 410 spanning open end 406A of reservoir 406 is transparent to provide visual access therethrough in the direction indicated by arrowed line A into reservoir 406 through open end 406A for lubricating oil level and quality monitoring purposes, in accordance with the principle of the invention.

In the normal and customary operational position of roller 407, reservoir 406 is horizontal and open end 406A is vertical, and this orientation is clearly depicted in FIG. 34. In this orientation of reservoir 406 and open end 406A, cap 401 is vertically disposed such that sealing body 410 extends vertically across open end 406A of reservoir 406. The volume of lubricating oil 450 applied to reservoir 406 thus extends upwardly into reservoir 406 along inner face 412 of sealing body 410 to level 450A just below port 402 closed and sealed by plug 404. Again, the transparent character of sealing body 410 provides visual access therethrough into lubricating oil reservoir 406 through open end 406A for lubricating oil 450 level 450A and quality monitoring purposes. As the volume of lubricating oil 450 is readily and easily visualized through sealing body 410, level 450A of oil can easily be seen as can the quality of the volume of lubricating oil 450. Should level 450A of the volume of lubricating oil 450 be seen as too low, it may be replenished. Should the quality of the volume of lubricating oil 450 be seen as compromised, such as by dirt and debris, the volume of lubricating oil 450 may be withdrawn from reservoir 406 and replaced. Port 402 is useful for replenishing and replacing lubricating oil in reservoir 406. To replenish the volume of lubricating oil 450 should level 450A fall to an unacceptably low level, plug 404 is detached from port 402 and moved to its open position to open port 402, replenishing oil is applied to reservoir 406 through open port 402, and port 402 is reclosed by reinstalling plug 404 to port 402 placing plug 404 back to its closed position closing and sealing port 402. To replace volume of lubricating oil 450 with a fresh volume of a lubricating oil, plug 404 is detached from port 402 and moved to its open position to open port 402, volume of lubricating oil 450 is withdrawn from reservoir 406 through port 402, a fresh volume of a lubricating oil is applied to reservoir 406 through port 402, and port 402 is reclosed by reinstalling plug 404 to port 402 placing plug 404 back to its closed position closing and sealing port 402.

In the vertical positioning of cap 401 as shown in FIG. 34 such that sealing body 410 extends vertically across open end 406A of reservoir 406, it is again emphasized that in the closed position of plug 404 applied to and closing port 402, plug 404 is positioned in depression 420 and extends outwardly from outer face 411 of sealing body 410 into depression 420 no further than horizon H3 of rim 421 thereby isolating plug 404 from shearing forces across outer face 411 of sealing body 410 that could otherwise rip plug 404 from port 402 or otherwise damage plug 404. These shearing forces can be applied by plants or crops or bushes or the like that brush across outer face 411 of sealing body 410 in the normal operation of roller 407 in the normal operation of the vehicle incorporating roller 407. More particularly, in the close position of plug 404 threaded in port 402 and tightened in place the underside of head 114 is tightened against outer face 411 of sealing body 410 at depression 420, and head 430 of plug 404 projects or otherwise extends outwardly from outer face 411 of sealing body 410 into depression 420 no further than horizon H3 of rim 421 thereby isolating head 430 of plug 404 from shearing forces across outer face 411 of sealing body 410 that, again, could otherwise rip plug 404 from port 402 or otherwise damage plug 404.

Figure 37:
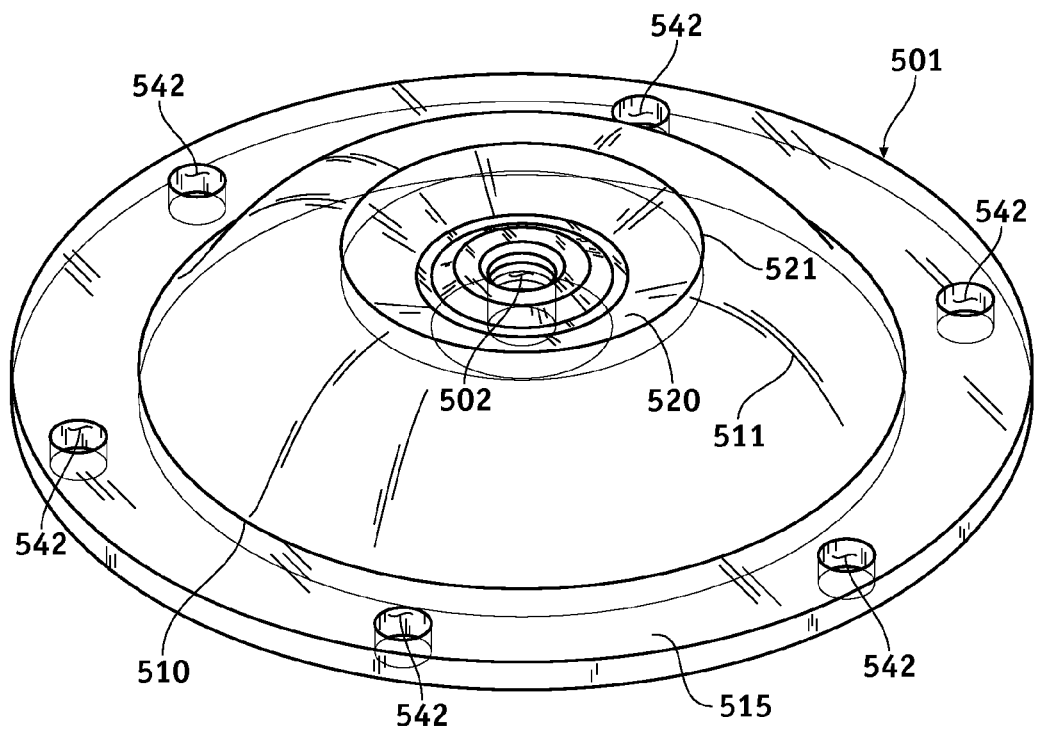
FIG. 37 is a top perspective view of yet still a further embodiment of an oil monitoring and maintenance cap constructed and arranged in accordance with the principle of the invention.
Figure 38:
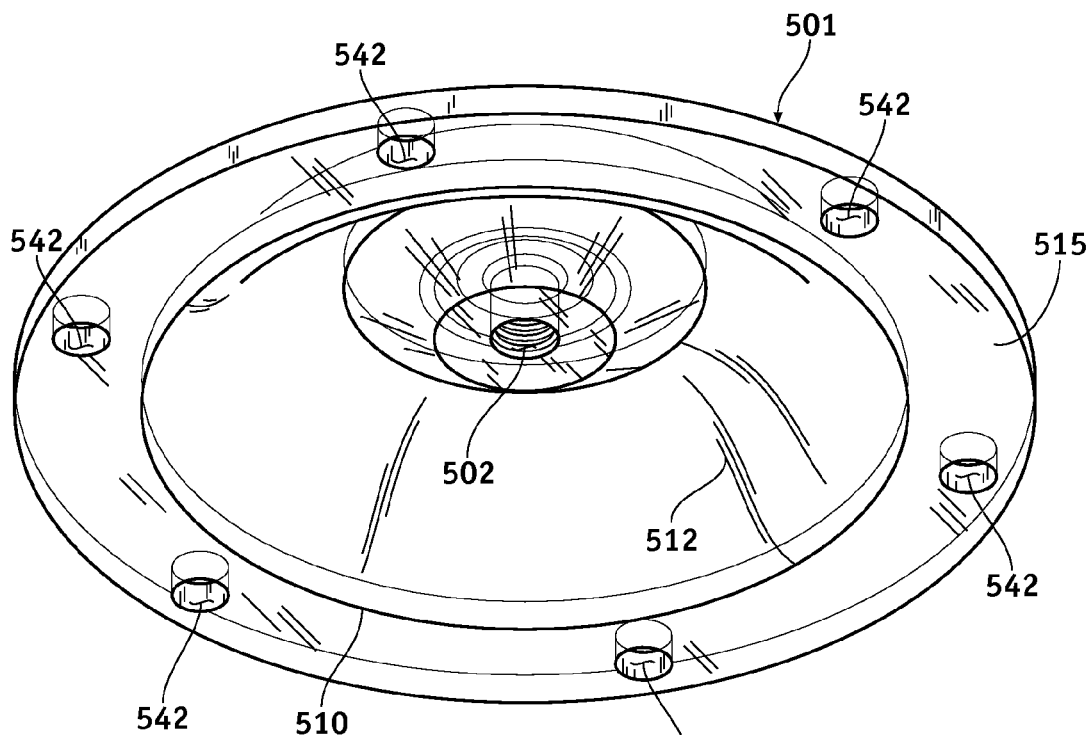
FIG. 38 is a bottom perspective view of the embodiment of FIG. 37.
Figure 39:
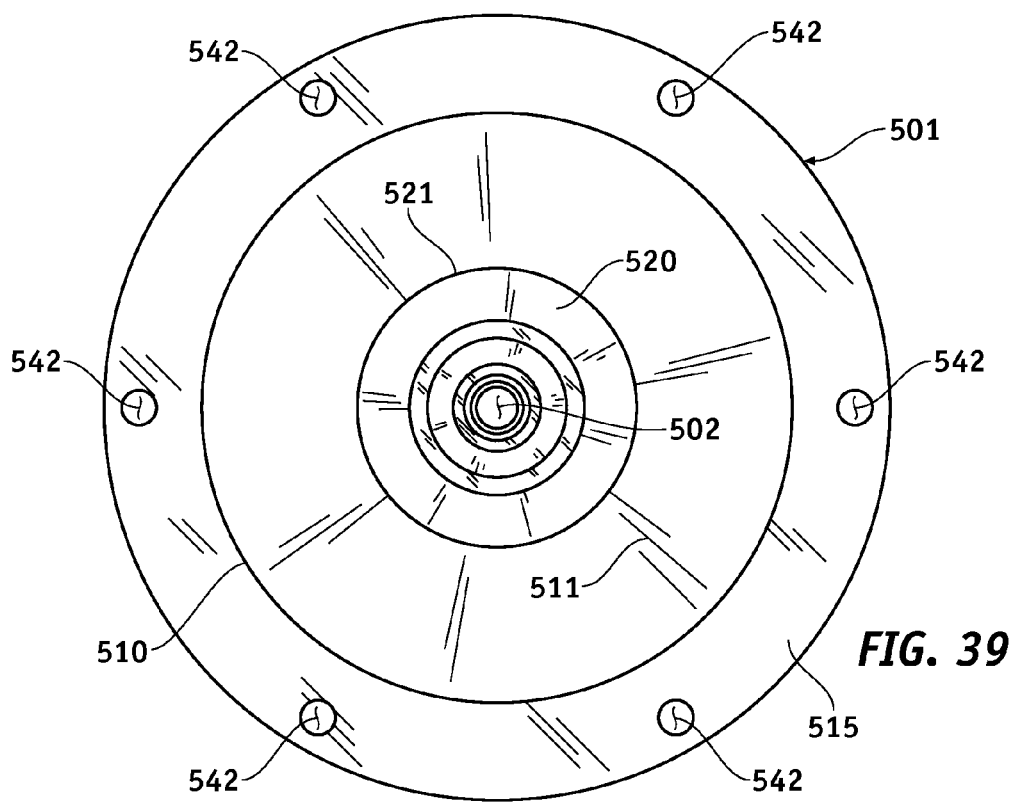
FIG. 39 is a top plan view of the embodiment of FIG. 37.
Figure 40:
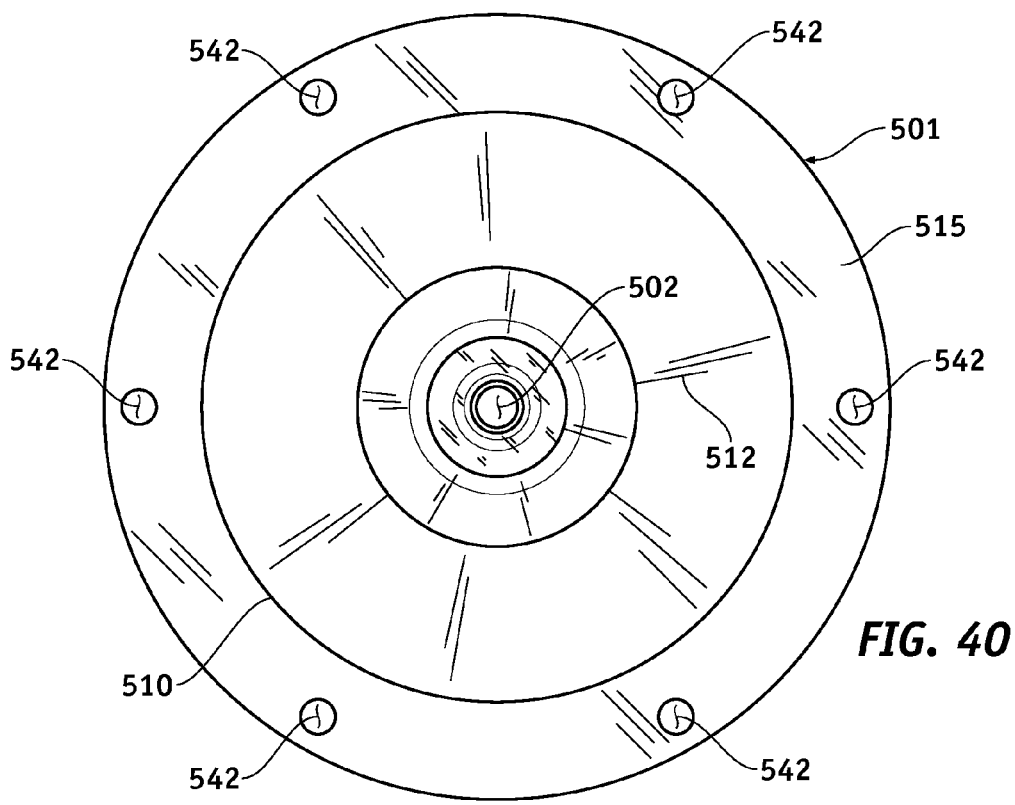
FIG. 40 is a bottom plan view of the embodiment of FIG. 37.
Figure 41:
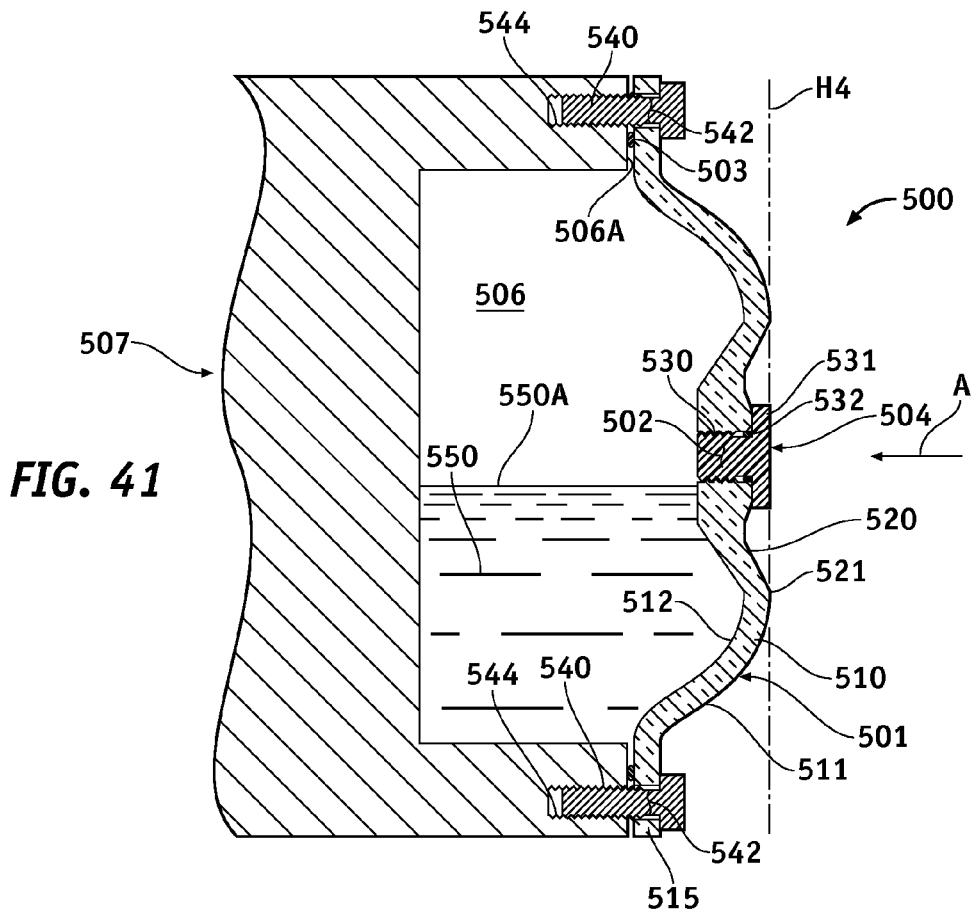
FIG. 41 is a section view of an oil monitoring and maintenance cap assembly, incorporating the oil monitoring and maintenance cap of FIG. 37, shown installed capping a lubricating oil reservoir of a roller.
Figure 42:
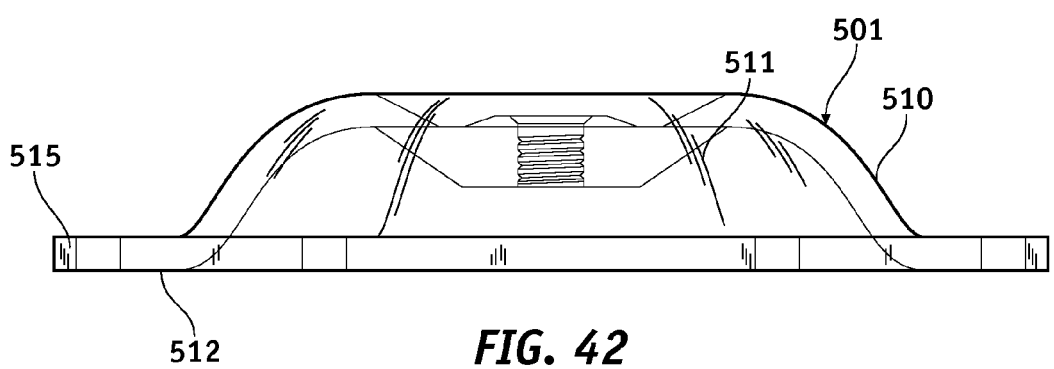
FIG. 42 is a right side elevation view of the oil monitoring and maintenance cap of FIG. 37, the opposite left side elevation view being the same thereof.
Figure 43:
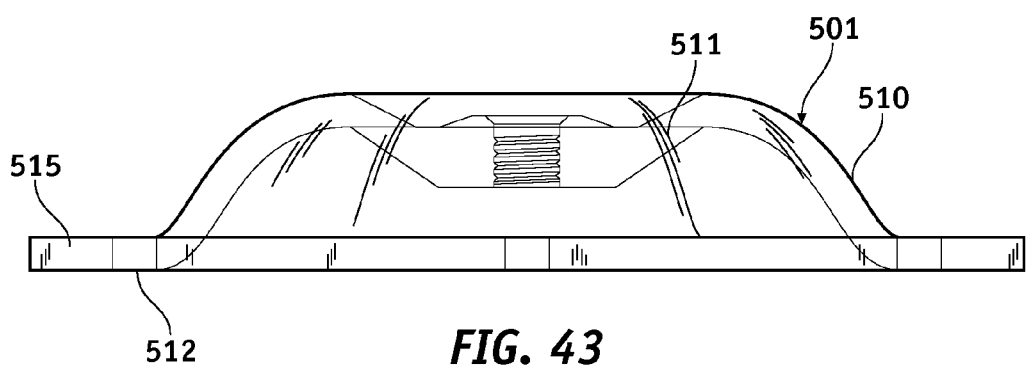
FIG. 43 is a front elevation view of the oil monitoring and maintenance cap of FIG. 37, the opposite rear elevation view being the same thereof.

FIG. 37 is a top perspective view of a yet still a further embodiment of an oil monitoring and maintenance cap 501 constructed and arranged in accordance with the principle of the invention. FIG. 38 is a bottom perspective view of the embodiment of FIG. 37, FIG. 39 is a top plan view of cap 501, FIG. 40 is a bottom plan view of cap 501, and FIG. 41 is a section view of an oil monitoring and maintenance cap assembly 500, incorporating cap 501, shown installed capping a lubricating oil reservoir 506 of a roller 507. FIG. 42 is a right side elevation view of cap 501, the opposite left side elevation view being the same thereof, and FIG. 43 is a front elevation view of cap 501, the opposite rear elevation view being the same thereof. Roller 507 shown in FIG. 41 is generally representative of a track roller of a tracked vehicle, like roller 80 discussed above. As is known in the art, reservoir 506 maintains a volume of a lubricating oil, which provides lubrication to roller 507 to reduce roller friction and draw and dissipate heat away from roller 507. Cap assembly 500 is removably secured to open end 506A of reservoir 506 closing open end 506A of reservoir 506 enclosing and sealing the volume of lubricating oil in reservoir 506, and provides visual access into reservoir 506 for lubricating oil level and quality monitoring purposes as will be explained.

Referencing FIGS. 37-43 in relevant part, which demonstrate the structure and design attributes of cap 501, cap 501 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 501 is preferably formed integrally, such as by molding, or machining from a billet or other stock work-piece. Cap 501 consists of a sealing body 510 including an outer face 511 and an opposed inner face 512 that meet at an outer perimeter extremity, which, in the present embodiment, is characterized by a circular perimeter or parametric flange 515. Sealing body 510 has a substantially uniform thickness extending between outer and inner faces 511 and 512. In the present embodiment, sealing body 510 has a thickness extending between outer and inner faces 511 and 512 in a range of approximately 7-9 millimeters.

As best seen in FIG. 41, sealing body 510 bulges outwardly from parametric flange 515, characterized in that outer and inner faces 511 and 512 are convex and concave, respectively, extending from parametric flange 515 to a geometric center of sealing body 510 formed by a depression 520 with a raised rim 521 formed in outer face 511 of sealing body. Depression 520 is formed in outer face 511 of sealing body 510 at the geometric center of sealing body 510, and is encircled by raised rim 521. Port 502 is formed in sealing body 510 at the geometric center of sealing body 510, and is formed at depression 520. Port 502 extends through sealing body 510 at depression 520 from outer face 511 of sealing body 510 to inner face 512 of sealing body 510.

Port 502 is adapted to receive plug 504 to close and seal port 502. Looking to FIG. 41, plug 504 is formed of a strong, hard, impact resistant, temperature resistant, chemical resistant, and non-conductive material or combination of materials, such as plastic, and consists of a threaded post 530 formed with a broad, enlarged head 531. A gasket 532 encircles post 530, and is located along the underside of head 531. Post 530 relates to port 502 and is used to open and close port 502, in which case plug 504 is movable between an open position detached from and opening port 502 to provide access therethrough to reservoir 506 depicted in FIG. 41 for lubricating oil replacement and replenishment purposes, and a closed position applied to and closing port 502 as shown in FIG. 41. Port 502 is inwardly threaded, and post 530 of plug 504 is correspondingly outwardly threaded. To apply and secure plug 504 to port 502, plug 504 is taken up, such as by hand, and applied into depression 520 in a direction toward outer face 511 and post 530 is applied to port 502 and is threaded into port 502 through rotation and is tightened securing in place tightening the underside of head 530 against outer face 511 at depression 520. In the closed position of plug 504 as shown in FIG. 41, gasket 532 is applied between head 531 of plug 504 and port 502 providing a fluid-impervious seal between plug 504 and port 502.

As seen in FIG. 41, rim 521 defines and extends along a plane or horizon H4, and depression 520 extends into outer face 511 and is defined inwardly from horizon H4. In the closed position of plug 504 applied to and closing port 502, plug 504 is positioned in depression 520 and extends outwardly from outer face 511 of sealing body 510 into depression 520 no further than horizon H4 of rim 521 thereby isolating plug 504 from shearing forces across outer face 511 of sealing body 510. In a further and more specific aspect, in the close position of plug 504 threaded in port 502 and tightened in place the underside of head 114 is tightened against outer face 511 of sealing body 510 at depression 520, and head 530 of plug 504 projects or otherwise extends outwardly from outer face 511 of sealing body 510 into depression 520 no further than horizon H4 of rim 521 thereby isolating head 530 of plug 504 from shearing forces across outer face 511 of sealing body 510.

FIG. 41 is a highly generalized representation of reservoir 506 formed in roller 507 and which has an open end 506A, and this is a conventional and well-known arrangement in the art. Gasket 503 and flange 515 of cap 501 relate to open end 506A to reservoir 506. In the installation of assembly 250 to reservoir 506, gasket 503 is applied to open end 506A, and cap 501 is taken up and inner face 512 is directed toward open end 506A and cap is then moved toward open end 506A so as to apply inner face 512 of flange 515 of sealing body 510 of cap 501 against gasket 503. Flange 515 is then secured in place to open end 506A closing open end 506A with cap 501, whereby sealing body 510 spans open end 506A of reservoir 506 and gasket 503 is applied between open end 506A of reservoir 506 and flange 515, which provides a fluid-impervious seal between sealing body 510 and open end 506A. With assembly 250 so installed, outer face 511 of sealing body 510 faces away from open end 506A and opposed inner face 512 faces open end 506A to reservoir 506. Cap 501 is preferably installed with plug 504 applied to and closing port 502. However, plug 504 may be applied to close port 502 after cap 501 is installed on open end 506A of reservoir 506.

Cap 501 is secured to open end 506A of reservoir with fasteners, which, in the present embodiment, are bolts 540. In this embodiment, flange 515 is formed with spaced-apart bolt holes 542 that relate or otherwise correspond to bolt holes 544 formed in open end 506A of reservoir 506. As a matter of illustration and reference, FIG. 41 shows two such bolt holes 544 formed in open end 506A of reservoir 506. In the application of assembly 500 to open end 506A of reservoir 506, gasket 503 is positioned between flange 515 and open end 506A of reservoir 506, and bolt holes 542 of flange 515 are registered with bolt holes 544 formed in open end 506A of reservoir 506. Bolts 540 are applied to bolt holes 542 and are threaded into bolt holes 544 formed in open end 506A of reservoir 506 and are then tightened so as to secure assembly 100 in place as shown in FIG. 41. In the present embodiment there are six bolt holes 544 in open end 506A (only two shown) of reservoir 506, and there are six bolt holes 542 in cap 501 that correspond with the four bolt holes 544 formed in open end 506A. The overall design of cap 501 is somewhat similar to caps 110 and 401 previously discussed and is a variation of cap 110 and cap 401.

And so having secured assembly 250 in place to open end 506A of reservoir 506 closing open end 506A and with plug 504 installed in place in its closed position closing port 502, a volume of a lubricating oil 550 is then applied to reservoir 506 in the conventional manner, whereby roller 507 is then prepared and ready for use in the operation of a vehicle incorporating roller 507 in the normal manner. As cap 501 is transparent, sealing body 510 spanning open end 506A of reservoir 506 is transparent to provide visual access therethrough in the direction indicated by arrowed line A into reservoir 506 through open end 506A for lubricating oil level and quality monitoring purposes, in accordance with the principle of the invention.

In the normal and customary operational position of roller 507, reservoir 506 is horizontal and open end 506A is vertical, and this orientation is clearly depicted in FIG. 41. In this orientation of reservoir 506 and open end 506A, cap 501 is vertically disposed such that sealing body 510 extends vertically across open end 506A of reservoir 506. The volume of lubricating oil 550 applied to reservoir 506 thus extends upwardly into reservoir 506 along inner face 512 of sealing body 510 to level 550A just below port 502 closed and sealed by plug 504. Again, the transparent character of sealing body 510 provides visual access therethrough into lubricating oil reservoir 506 through open end 506A for lubricating oil 550 level 550A and quality monitoring purposes. As the volume of lubricating oil 550 is readily and easily visualized through sealing body 510, level 550A of oil can easily be seen as can the quality of the volume of lubricating oil 550. Should level 550A of the volume of lubricating oil 550 be seen as too low, it may be replenished. Should the quality of the volume of lubricating oil 550 be seen as compromised, such as by dirt and debris, the volume of lubricating oil 550 may be withdrawn from reservoir 506 and replaced. Port 502 is useful for replenishing and replacing lubricating oil in reservoir 506. To replenish the volume of lubricating oil 550 should level 550A fall to an unacceptably low level, plug 504 is detached from port 502 and moved to its open position to open port 502, replenishing oil is applied to reservoir 506 through open port 502, and port 502 is reclosed by reinstalling plug 504 to port 502 placing plug 504 back to its closed position closing and sealing port 502. To replace volume of lubricating oil 550 with a fresh volume of a lubricating oil, plug 504 is detached from port 502 and moved to its open position to open port 502, volume of lubricating oil 550 is withdrawn from reservoir 506 through port 502, a fresh volume of a lubricating oil is applied to reservoir 506 through port 502, and port 502 is reclosed by reinstalling plug 504 to port 502 placing plug 504 back to its closed position closing and sealing port 502.

In the vertical positioning of cap 501 as shown in FIG. 41 such that sealing body 510 extends vertically across open end 506A of reservoir 506, it is again emphasized that in the closed position of plug 504 applied to and closing port 502, plug 504 is positioned in depression 520 and extends outwardly from outer face 511 of sealing body 510 into depression 520 no further than horizon H4 of rim 521 thereby isolating plug 504 from shearing forces across outer face 511 of sealing body 510 that could otherwise rip plug 504 from port 502 or otherwise damage plug 504. These shearing forces can be applied by plants or crops or bushes or the like that brush across outer face 511 of sealing body 510 in the normal operation of roller 507 in the normal operation of the vehicle incorporating roller 507. More particularly, in the close position of plug 504 threaded in port 502 and tightened in place the underside of head 114 is tightened against outer face 511 of sealing body 510 at depression 520, and head 530 of plug 504 projects or otherwise extends outwardly from outer face 511 of sealing body 510 into depression 520 no further than horizon H4 of rim 521 thereby isolating head 530 of plug 504 from shearing forces across outer face 511 of sealing body 510 that, again, could otherwise rip plug 504 from port 502 or otherwise damage plug 504.

Figure 44:
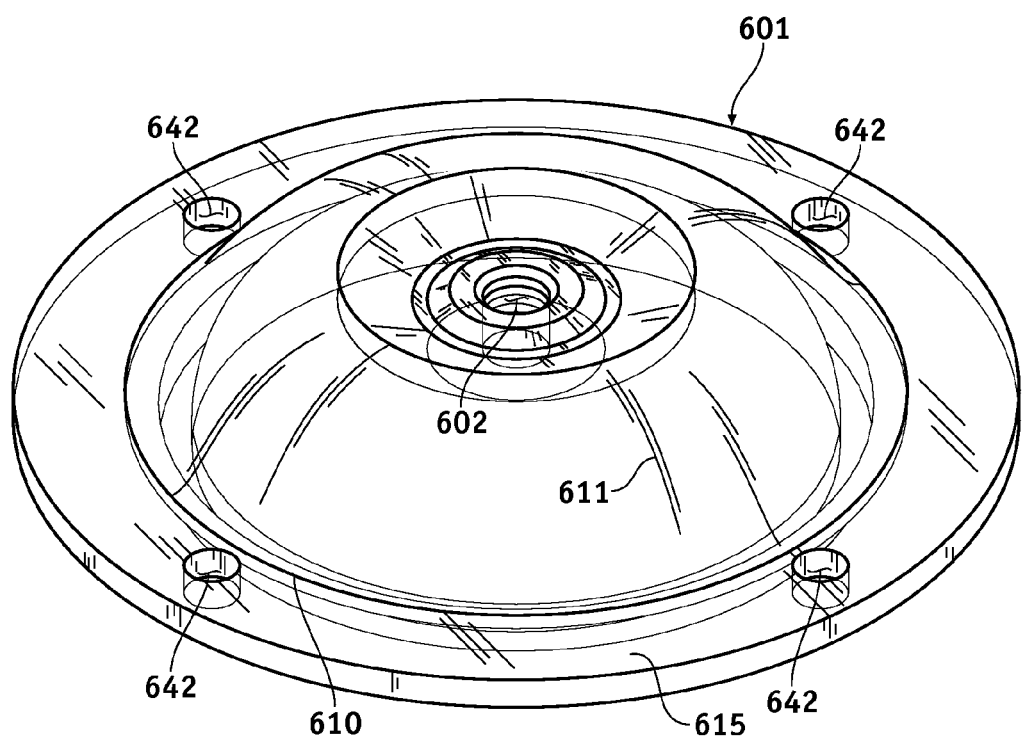
FIG. 44 is a top perspective view of still a further embodiment of an oil monitoring and maintenance cap constructed and arranged in accordance with the principle of the invention.
Figure 45:
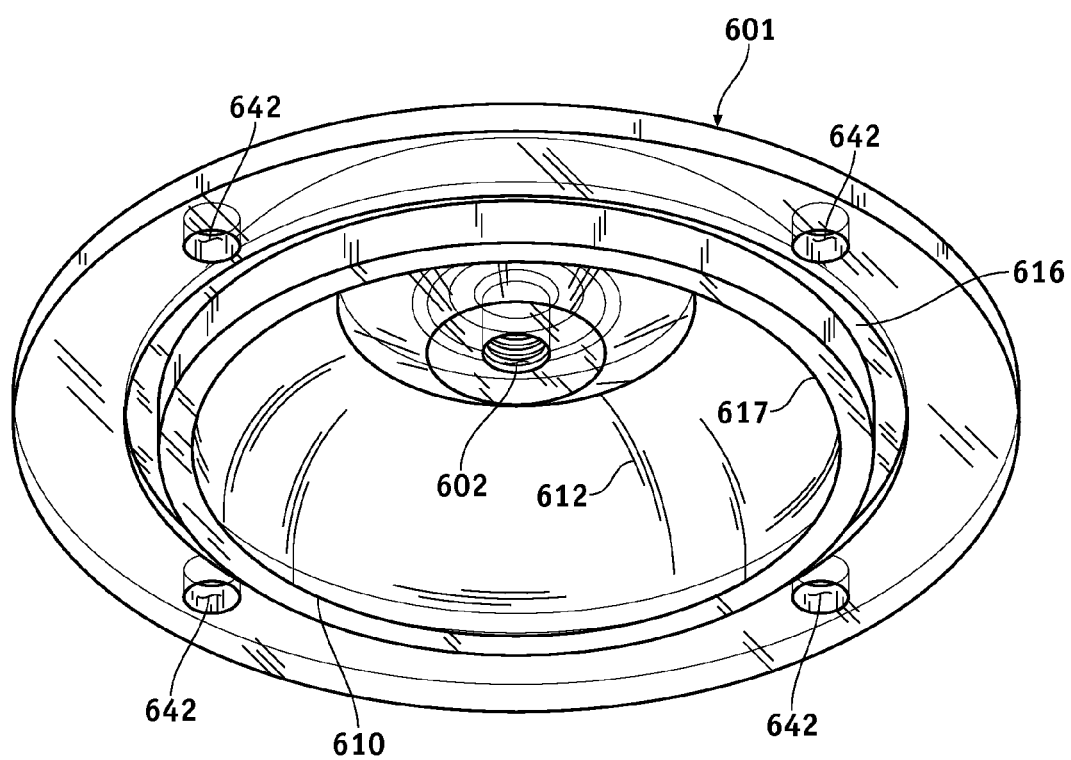
FIG. 45 is a bottom perspective view of the embodiment of FIG. 44.
Figure 46:
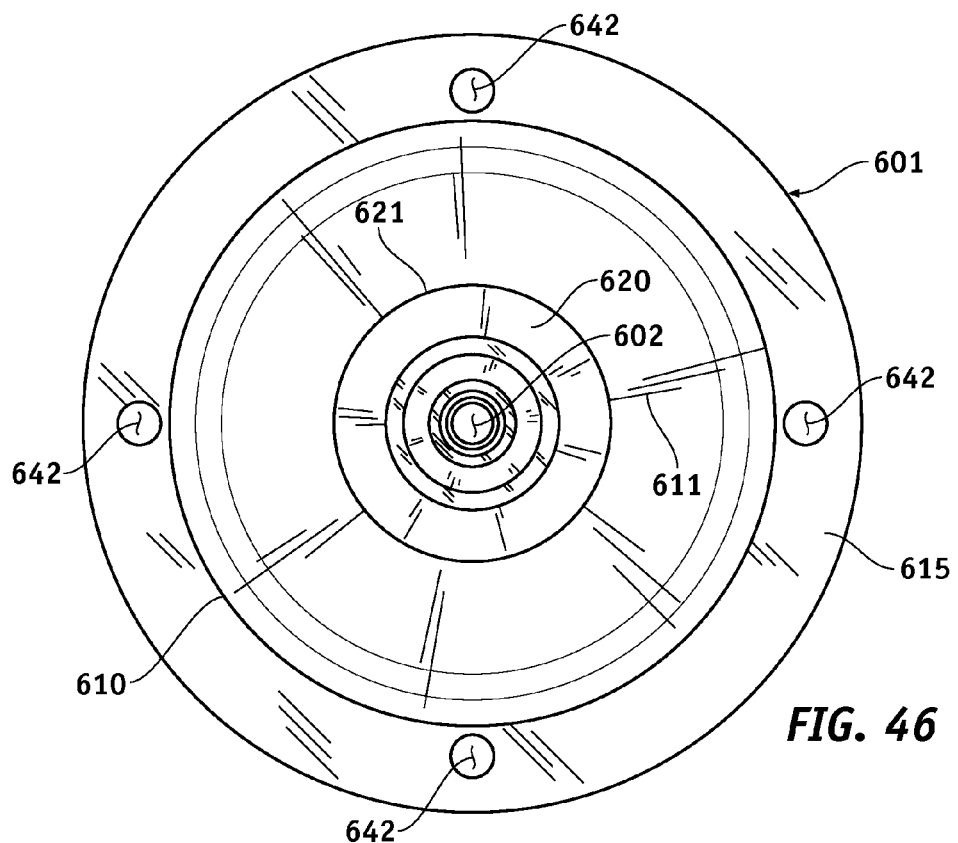
FIG. 46 is a top plan view of the embodiment of FIG. 44.
Figure 47:
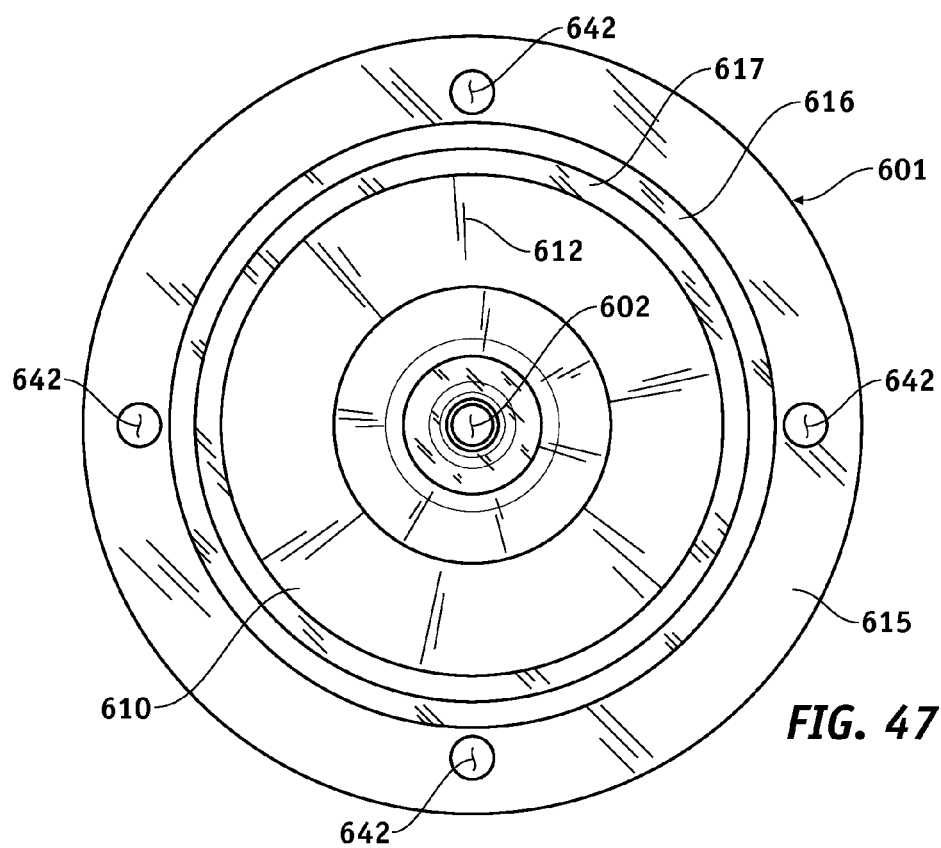
FIG. 47 is a bottom plan view of the embodiment of FIG. 44.
Figure 48:
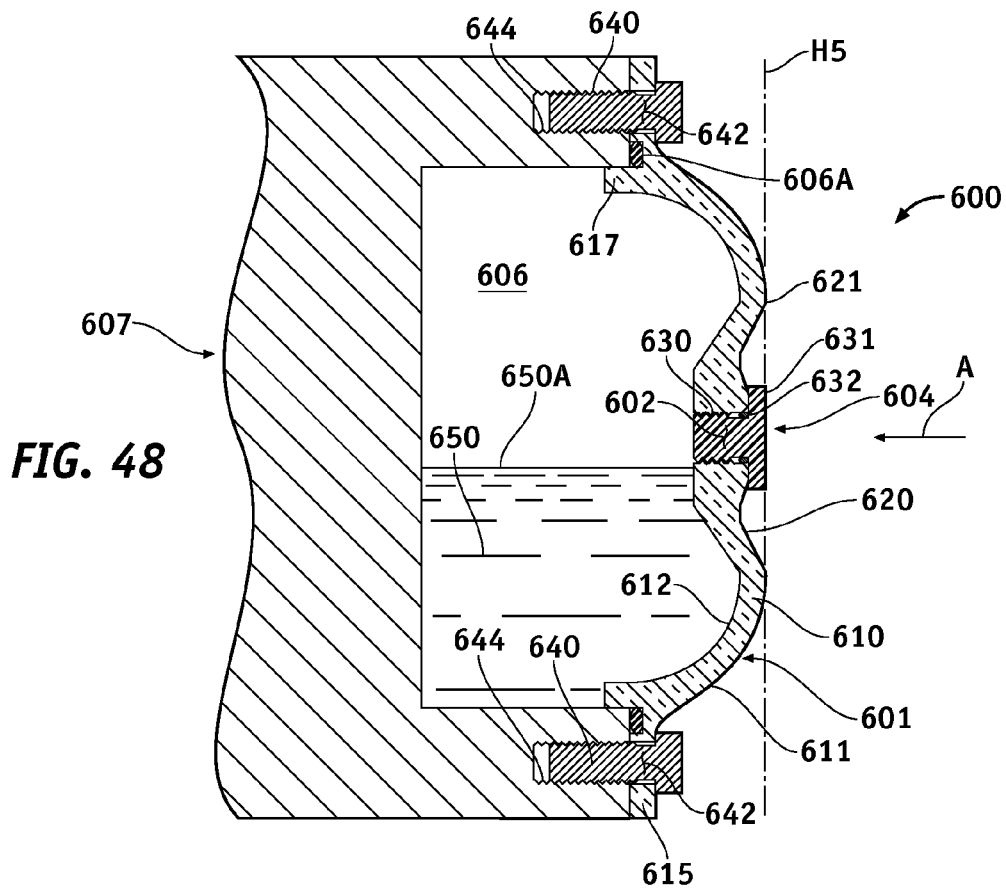
FIG. 48 is a section view of an oil monitoring and maintenance cap assembly, incorporating the oil monitoring and maintenance cap of FIG. 44, shown installed capping a lubricating oil reservoir of a roller.
Figure 49:
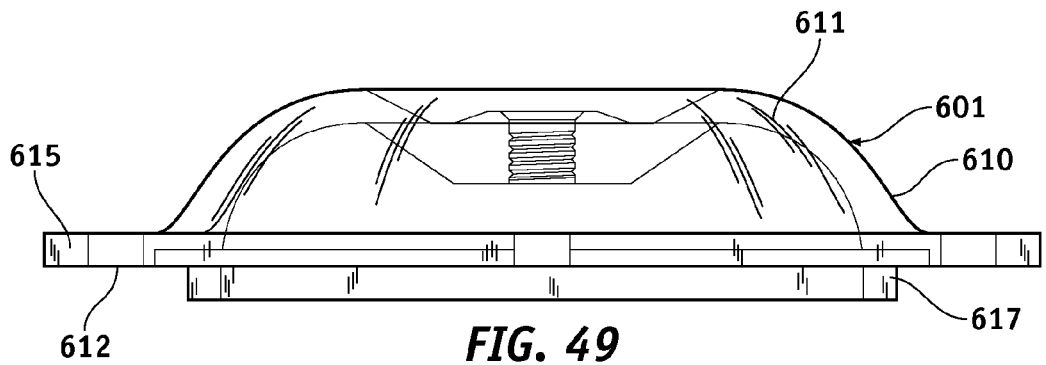
FIG. 49 is a right side elevation view of the oil monitoring and maintenance cap of FIG. 44, the opposite left side elevation view being the same thereof.
Figure 50:
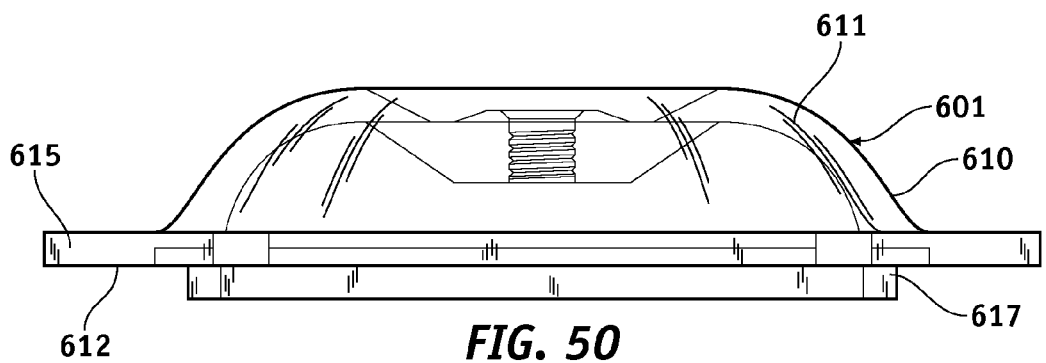
FIG. 50 is a front elevation view of the oil monitoring and maintenance cap of FIG. 44, the opposite rear elevation view being the same thereof.

FIG. 44 is a top perspective view of another embodiment of an oil monitoring and maintenance cap 601 constructed and arranged in accordance with the principle of the invention. FIG. 45 is a bottom perspective view of the embodiment of FIG. 44, FIG. 46 is a top plan view of cap 601, FIG. 47 is a bottom plan view of cap 601, and FIG. 48 is a section view of an oil monitoring and maintenance cap assembly 600, incorporating cap 601, shown installed capping a lubricating oil reservoir 606 of a roller 607. FIG. 49 is a right side elevation view of cap 601, the opposite left side elevation view being the same thereof, and FIG. 50 is a front elevation view of cap 601, the opposite rear elevation view being the same thereof. Roller 607 shown in FIG. 48 is generally representative of a track roller of a tracked vehicle, like roller 80 discussed above. As is known in the art, reservoir 606 maintains a volume of a lubricating oil, which provides lubrication to roller 607 to reduce roller friction and draw and dissipate heat away from roller 607. Cap assembly 600 is removably secured to open end 606A of reservoir 606 closing open end 606A of reservoir 606 enclosing and sealing the volume of lubricating oil in reservoir 606, and provides visual access into reservoir 606 for lubricating oil level and quality monitoring purposes as will be explained.

Referencing FIGS. 44-50 in relevant part, which demonstrate the structure and design attributes of cap 601, cap 601 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 601 is preferably formed integrally, such as by molding, or machining from a billet or other stock work-piece. Cap 601 consists of a sealing body 610 including an outer face 611 and an opposed inner face 612 that meet at an outer perimeter extremity, which, in the present embodiment, is characterized by a circular perimeter or parametric flange 615. Sealing body 610 has a substantially uniform thickness extending between outer and inner faces 611 and 612. In the present embodiment, sealing body 610 has a thickness extending between outer and inner faces 611 and 612 in a range of approximately 7-9 millimeters.

As best seen in FIG. 48, sealing body 610 bulges outwardly from parametric flange 615, characterized in that outer and inner faces 611 and 612 are convex and concave, respectively, extending from parametric flange 615 to a geometric center of sealing body 610 formed by a depression 620 with a raised rim 621 formed in outer face 611 of sealing body. Depression 620 is formed in outer face 611 of sealing body 610 at the geometric center of sealing body 610, and is encircled by raised rim 621. Port 602 is formed in sealing body 610 at the geometric center of sealing body 610, and is formed at depression 620. Port 602 extends through sealing body 610 at depression 620 from outer face 611 of sealing body 610 to inner face 612 of sealing body 610.

Port 602 is adapted to receive plug 604 to close and seal port 602. Looking to FIG. 48, plug 604 is formed of a strong, hard, impact resistant, temperature resistant, chemical resistant, and non-conductive material or combination of materials, such as plastic, and consists of a threaded post 630 formed with a broad, enlarged head 631. A gasket 632 encircles post 630, and is located along the underside of head 631. Post 630 relates to port 602 and is used to open and close port 602, in which case plug 604 is movable between an open position detached from and opening port 602 to provide access therethrough to reservoir 606 depicted in FIG. 48 for lubricating oil replacement and replenishment purposes, and a closed position applied to and closing port 602 as shown in FIG. 48. Port 602 is inwardly threaded, and post 630 of plug 604 is correspondingly outwardly threaded. To apply and secure plug 604 to port 602, plug 604 is taken up, such as by hand, and applied into depression 620 in a direction toward outer face 611 and post 630 is applied to port 602 and is threaded into port 602 through rotation and is tightened securing in place tightening the underside of head 630 against outer face 611 at depression 620. In the closed position of plug 604 as shown in FIG. 48, gasket 632 is applied between head 631 of plug 604 and port 602 providing a fluid-impervious seal between plug 604 and port 602.

As seen in FIG. 48, rim 621 defines and extends along a plane or horizon H5, and depression 620 extends into outer face 611 and is defined inwardly from horizon H5. In the closed position of plug 604 applied to and closing port 602, plug 604 is positioned in depression 620 and extends outwardly from outer face 611 of sealing body 610 into depression 620 no further than horizon H5 of rim 621 thereby isolating plug 604 from shearing forces across outer face 611 of sealing body 610. In a further and more specific aspect, in the close position of plug 604 threaded in port 602 and tightened in place the underside of head 114 is tightened against outer face 611 of sealing body 610 at depression 620, and head 630 of plug 604 projects or otherwise extends outwardly from outer face 611 of sealing body 610 into depression 620 no further than horizon H5 of rim 621 thereby isolating head 630 of plug 604 from shearing forces across outer face 611 of sealing body 610.

FIG. 48 is a highly generalized representation of reservoir 606 formed in roller 607 and which has an open end 606A, and this is a conventional and well-known arrangement in the art. Gasket 603 and flange 615 of cap 601 relate to open end 606A to reservoir 606. In the installation of assembly 250 to reservoir 606, gasket 603 is applied to open end 606A, and cap 601 is taken up and inner face 612 is directed toward open end 606A and cap is then moved toward open end 606A so as to apply inner face 612 of flange 615 of sealing body 610 of cap 601 against gasket 603. Flange 615 is then secured in place to open end 606A closing open end 606A with cap 601, whereby sealing body 610 spans open end 606A of reservoir 606 and gasket 603 is applied between open end 606A of reservoir 606 and flange 615, which provides a fluid-impervious seal between sealing body 610 and open end 606A. With assembly 250 so installed, outer face 611 of sealing body 610 faces away from open end 606A and opposed inner face 612 faces open end 606A to reservoir 606. Cap 601 is preferably installed with plug 604 applied to and closing port 602. However, plug 604 may be applied to close port 602 after cap 601 is installed on open end 606A of reservoir 606.

Cap 601 is secured to open end 606A of reservoir with fasteners, which, in the present embodiment, are bolts 640. In this embodiment, flange 615 is formed with spaced-apart bolt holes 642 that relate or otherwise correspond to bolt holes 644 formed in open end 606A of reservoir 606. As a matter of illustration and reference, FIG. 48 shows two such bolt holes 644 formed in open end 606A of reservoir 606. In the application of assembly 600 to open end 606A of reservoir 606, gasket 603 is positioned between flange 615 and open end 606A of reservoir 606, and bolt holes 642 of flange 615 are registered with bolt holes 644 formed in open end 606A of reservoir 606. Bolts 640 are applied to bolt holes 642 and are threaded into bolt holes 644 formed in open end 606A of reservoir 606 and are then tightened so as to secure assembly 100 in place as shown in FIG. 48. In the present embodiment there are four bolt holes 644 in open end 606A (only two shown) of reservoir 606, and there are four bolt holes 642 in cap 601 that correspond with the four bolt holes 644 formed in open end 606A. The overall design of cap 601 is generally similar to cap 501 previously discussed and is a variation of cap 501.

In the present embodiment, gasket 603 is located in and held by an annular recess 616 formed in inner face 612 of cap 601. Also, an annular flange 617 is formed in inner face 612 of cap 601 and projects outwardly from inner face 612 and is received against the inner side of open end 606A providing a firm competent application of cap 601 to open end 606A of reservoir 606.

And so having secured assembly 250 in place to open end 606A of reservoir 606 closing open end 606A and with plug 604 installed in place in its closed position closing port 602, a volume of a lubricating oil 650 is then applied to reservoir 606 in the conventional manner, whereby roller 607 is then prepared and ready for use in the operation of a vehicle incorporating roller 607 in the normal manner. As cap 601 is transparent, sealing body 610 spanning open end 606A of reservoir 606 is transparent to provide visual access therethrough in the direction indicated by arrowed line A into reservoir 606 through open end 606A for lubricating oil level and quality monitoring purposes, in accordance with the principle of the invention.

In the normal and customary operational position of roller 607, reservoir 606 is horizontal and open end 606A is vertical, and this orientation is clearly depicted in FIG. 48. In this orientation of reservoir 606 and open end 606A, cap 601 is vertically disposed such that sealing body 610 extends vertically across open end 606A of reservoir 606. The volume of lubricating oil 650 applied to reservoir 606 thus extends upwardly into reservoir 606 along inner face 612 of sealing body 610 to level 650A just below port 602 closed and sealed by plug 604. Again, the transparent character of sealing body 610 provides visual access therethrough into lubricating oil reservoir 606 through open end 606A for lubricating oil 650 level 650A and quality monitoring purposes. As the volume of lubricating oil 650 is readily and easily visualized through sealing body 610, level 650A of oil can easily be seen as can the quality of the volume of lubricating oil 650. Should level 650A of the volume of lubricating oil 650 be seen as too low, it may be replenished. Should the quality of the volume of lubricating oil 650 be seen as compromised, such as by dirt and debris, the volume of lubricating oil 650 may be withdrawn from reservoir 606 and replaced. Port 602 is useful for replenishing and replacing lubricating oil in reservoir 606. To replenish the volume of lubricating oil 650 should level 650A fall to an unacceptably low level, plug 604 is detached from port 602 and moved to its open position to open port 602, replenishing oil is applied to reservoir 606 through open port 602, and port 602 is reclosed by reinstalling plug 604 to port 602 placing plug 604 back to its closed position closing and sealing port 602. To replace volume of lubricating oil 650 with a fresh volume of a lubricating oil, plug 604 is detached from port 602 and moved to its open position to open port 602, volume of lubricating oil 650 is withdrawn from reservoir 606 through port 602, a fresh volume of a lubricating oil is applied to reservoir 606 through port 602, and port 602 is reclosed by reinstalling plug 604 to port 602 placing plug 604 back to its closed position closing and sealing port 602.

In the vertical positioning of cap 601 as shown in FIG. 48 such that sealing body 610 extends vertically across open end 606A of reservoir 606, it is again emphasized that in the closed position of plug 604 applied to and closing port 602, plug 604 is positioned in depression 620 and extends outwardly from outer face 611 of sealing body 610 into depression 620 no further than horizon H5 of rim 621 thereby isolating plug 604 from shearing forces across outer face 611 of sealing body 610 that could otherwise rip plug 604 from port 602 or otherwise damage plug 604. These shearing forces can be applied by plants or crops or bushes or the like that brush across outer face 611 of sealing body 610 in the normal operation of roller 607 in the normal operation of the vehicle incorporating roller 607. More particularly, in the close position of plug 604 threaded in port 602 and tightened in place the underside of head 114 is tightened against outer face 611 of sealing body 610 at depression 620, and head 630 of plug 604 projects or otherwise extends outwardly from outer face 611 of sealing body 610 into depression 620 no further than horizon H5 of rim 621 thereby isolating head 630 of plug 604 from shearing forces across outer face 611 of sealing body 610 that, again, could otherwise rip plug 604 from port 602 or otherwise damage plug 604.

Figure 51:
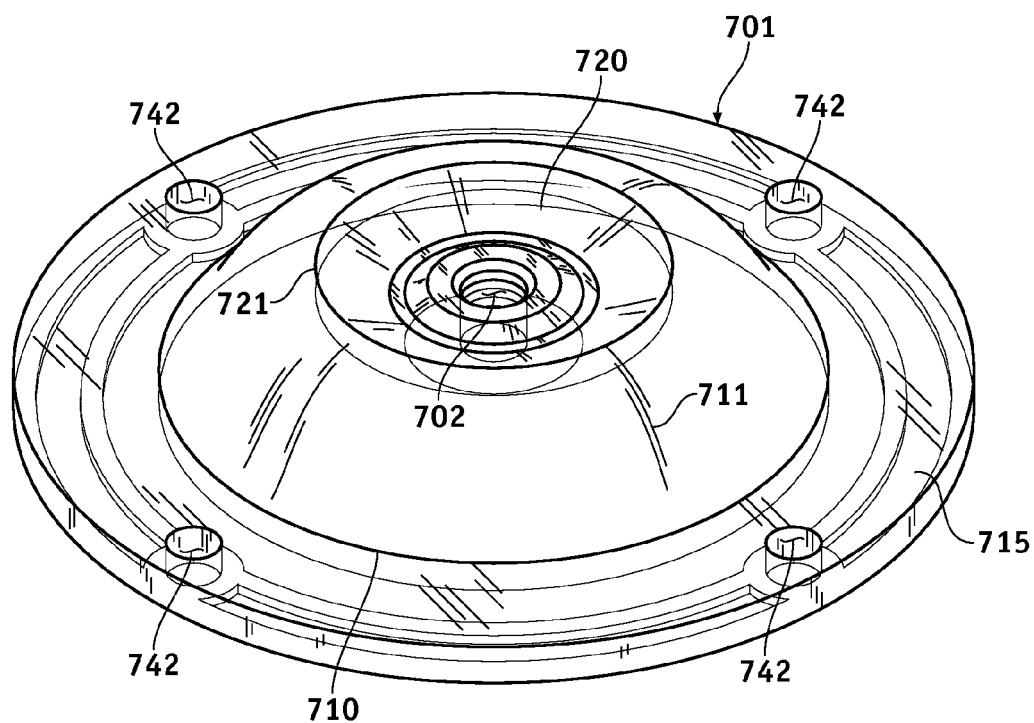
FIG. 51 is a top perspective view of yet still a further embodiment of an oil monitoring and maintenance cap constructed and arranged in accordance with the principle of the invention.
Figure 52:
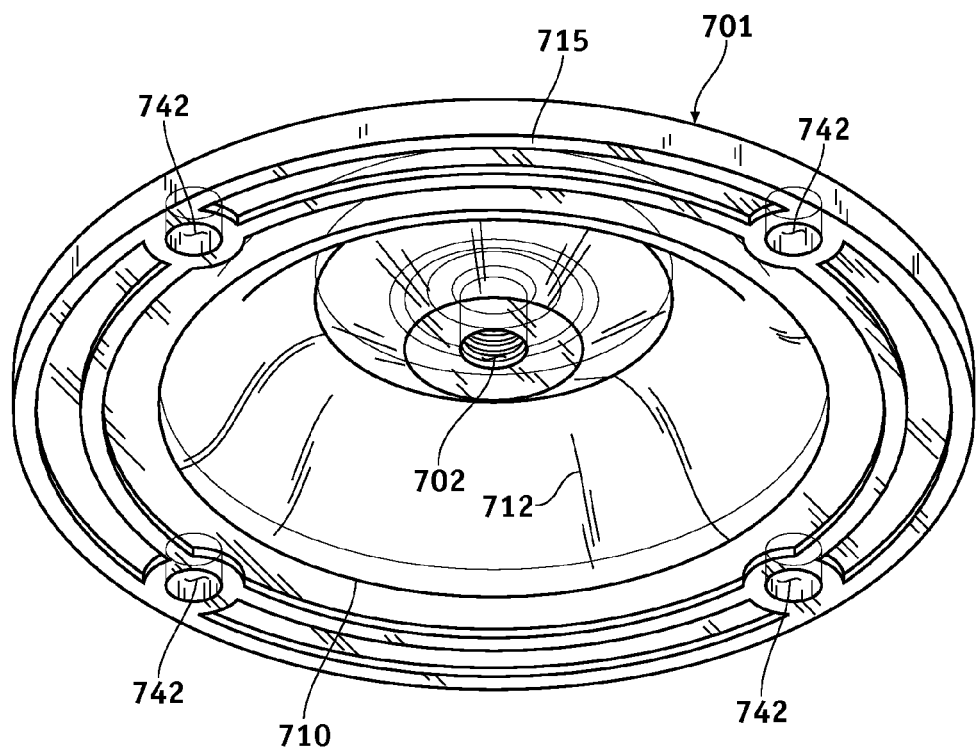
FIG. 52 is a bottom perspective view of the embodiment of FIG. 51.
Figure 53:
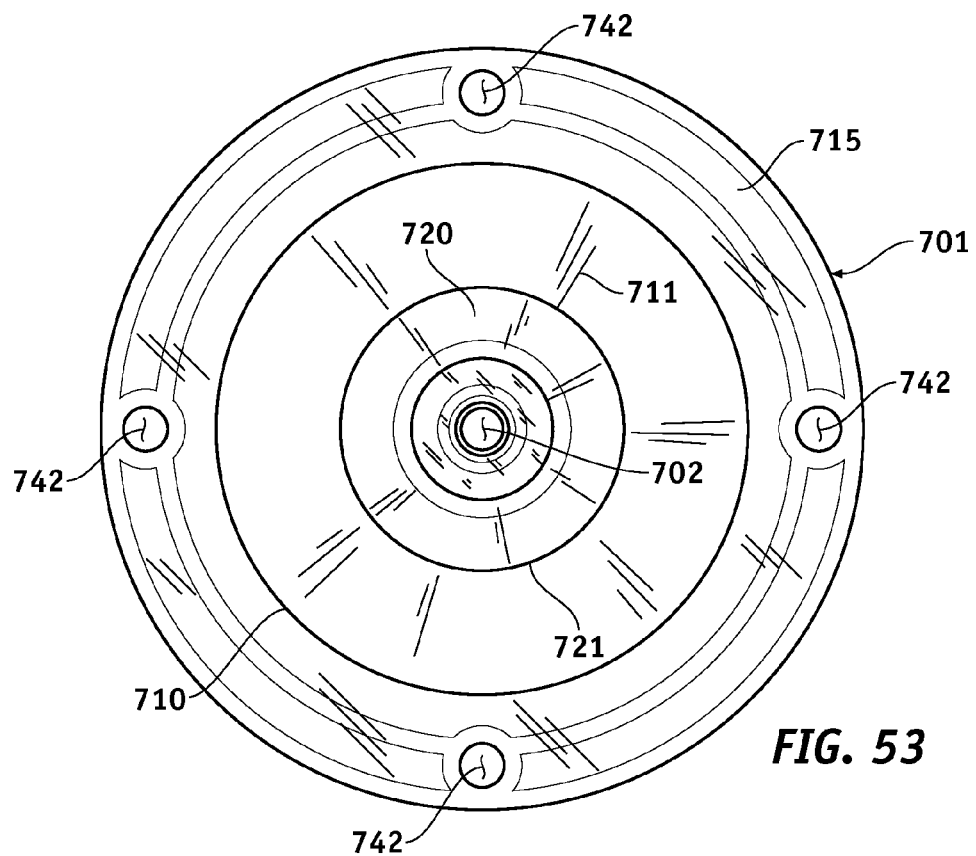
FIG. 53 is a top plan view of the embodiment of FIG. 51.
Figure 54:
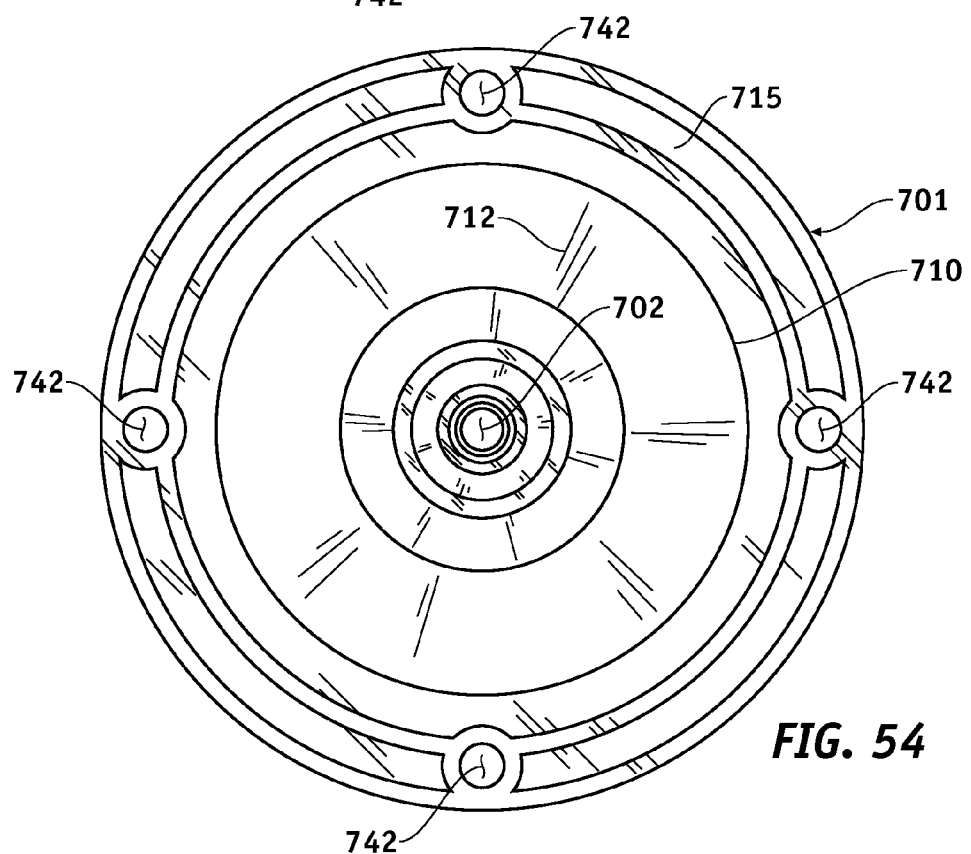
FIG. 54 is a bottom plan view of the embodiment of FIG. 51.
Figure 55:
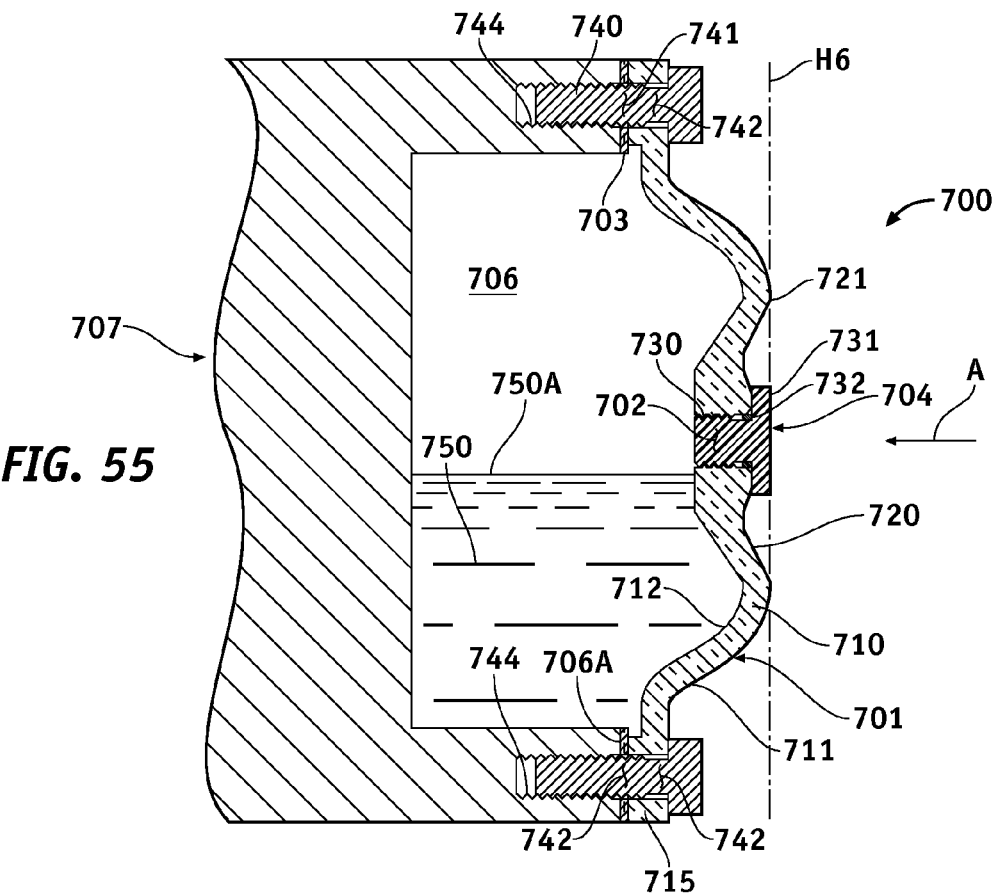
FIG. 55 is a section view of an oil monitoring and maintenance cap assembly, incorporating the oil monitoring and maintenance cap of FIG. 51, shown installed capping a lubricating oil reservoir of a roller.
Figure 56:
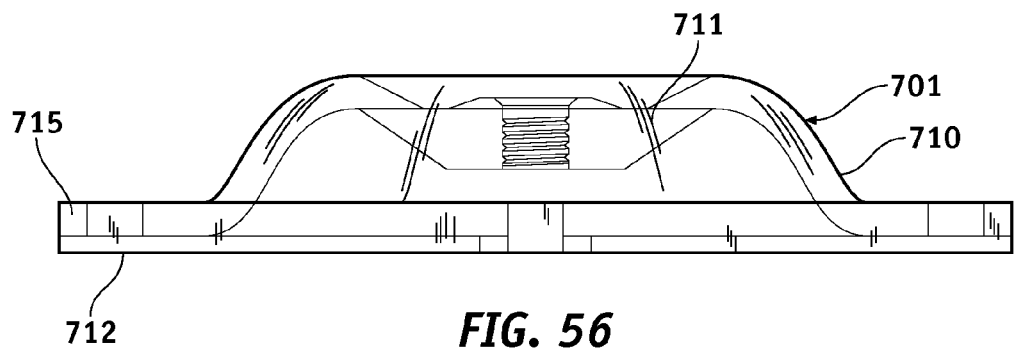
FIG. 56 is a right side elevation view of the oil monitoring and maintenance cap of FIG. 51, the opposite left side elevation view being the same thereof.
Figure 57:
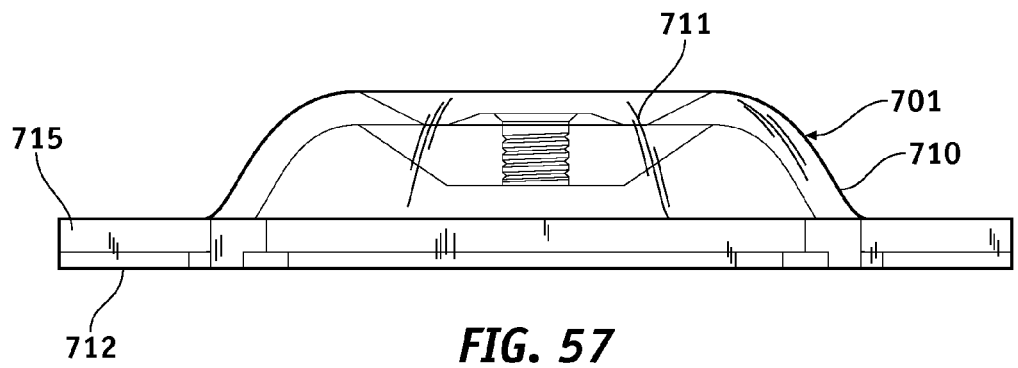
FIG. 57 is a front elevation view of the oil monitoring and maintenance cap of FIG. 51, the opposite rear elevation view being the same thereof.

FIG. 51 is a top perspective view of a yet another embodiment of an oil monitoring and maintenance cap 701 constructed and arranged in accordance with the principle of the invention. FIG. 52 is a bottom perspective view of the embodiment of FIG. 51, FIG. 53 is a top plan view of cap 701, FIG. 54 is a bottom plan view of cap 701, and FIG. 55 is a section view of an oil monitoring and maintenance cap assembly 700, incorporating cap 701, shown installed capping a lubricating oil reservoir 706 of a roller 707. FIG. 56 is a right side elevation view of cap 701, the opposite left side elevation view being the same thereof, and FIG. 57 is a front elevation view of cap 701, the opposite rear elevation view being the same thereof. Roller 707 shown in FIG. 55 is generally representative of a track roller of a tracked vehicle, like roller 80 discussed above. As is known in the art, reservoir 706 maintains a volume of a lubricating oil, which provides lubrication to roller 707 to reduce roller friction and draw and dissipate heat away from roller 707. Cap assembly 700 is removably secured to open end 706A of reservoir 706 closing open end 706A of reservoir 706 enclosing and sealing the volume of lubricating oil in reservoir 706, and provides visual access into reservoir 706 for lubricating oil level and quality monitoring purposes as will be explained.

Referencing FIGS. 51-57 in relevant part, which demonstrate the structure and design attributes of cap 701, cap 701 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 701 is preferably formed integrally, such as by molding, or machining from a billet or other stock work-piece. Cap 701 consists of a sealing body 710 including an outer face 711 and an opposed inner face 712 that meet at an outer perimeter extremity, which, in the present embodiment, is characterized by a circular perimeter or parametric flange 715. Sealing body 710 has a substantially uniform thickness extending between outer and inner faces 711 and 712. In the present embodiment, sealing body 710 has a thickness extending between outer and inner faces 711 and 712 in a range of approximately 7-9 millimeters.

As best seen in FIG. 55, sealing body 710 bulges outwardly from parametric flange 715, characterized in that outer and inner faces 711 and 712 are convex and concave, respectively, extending from parametric flange 715 to a geometric center of sealing body 710 formed by a depression 720 with a raised rim 721 formed in outer face 711 of sealing body. Depression 720 is formed in outer face 711 of sealing body 710 at the geometric center of sealing body 710, and is encircled by raised rim 721. Port 702 is formed in sealing body 710 at the geometric center of sealing body 710, and is formed at depression 720. Port 702 extends through sealing body 710 at depression 720 from outer face 711 of sealing body 710 to inner face 712 of sealing body 710.

Port 702 is adapted to receive plug 704 to close and seal port 702. Looking to FIG. 55, plug 704 is formed of a strong, hard, impact resistant, temperature resistant, chemical resistant, and non-conductive material or combination of materials, such as plastic, and consists of a threaded post 730 formed with a broad, enlarged head 731. A gasket 732 encircles post 730, and is located along the underside of head 731. Post 730 relates to port 702 and is used to open and close port 702, in which case plug 704 is movable between an open position detached from and opening port 702 to provide access therethrough to reservoir 706 depicted in FIG. 55 for lubricating oil replacement and replenishment purposes, and a closed position applied to and closing port 702 as shown in FIG. 55. Port 702 is inwardly threaded, and post 730 of plug 704 is correspondingly outwardly threaded. To apply and secure plug 704 to port 702, plug 704 is taken up, such as by hand, and applied into depression 720 in a direction toward outer face 711 and post 730 is applied to port 702 and is threaded into port 702 through rotation and is tightened securing in place tightening the underside of head 730 against outer face 711 at depression 720. In the closed position of plug 704 as shown in FIG. 55, gasket 732 is applied between head 731 of plug 704 and port 702 providing a fluid-impervious seal between plug 704 and port 702.

As seen in FIG. 55, rim 721 defines and extends along a plane or horizon H6, and depression 720 extends into outer face 711 and is defined inwardly from horizon H6. In the closed position of plug 704 applied to and closing port 702, plug 704 is positioned in depression 720 and extends outwardly from outer face 711 of sealing body 710 into depression 720 no further than horizon H6 of rim 721 thereby isolating plug 704 from shearing forces across outer face 711 of sealing body 710. In a further and more specific aspect, in the close position of plug 704 threaded in port 702 and tightened in place the underside of head 114 is tightened against outer face 711 of sealing body 710 at depression 720, and head 730 of plug 704 projects or otherwise extends outwardly from outer face 711 of sealing body 710 into depression 720 no further than horizon H6 of rim 721 thereby isolating head 730 of plug 704 from shearing forces across outer face 711 of sealing body 710.

FIG. 55 is a highly generalized representation of reservoir 706 formed in roller 707 and which has an open end 706A, and this is a conventional and well-known arrangement in the art. Gasket 703, which is shaped and formed like gasket 112 previously discussed in connection with assembly 100, and flange 715 of cap 701 relate to open end 706A to reservoir 706. In the installation of assembly 250 to reservoir 706, gasket 703 is applied to open end 706A, and cap 701 is taken up and inner face 712 is directed toward open end 706A and cap is then moved toward open end 706A so as to apply inner face 712 of flange 715 of sealing body 710 of cap 701 against gasket 703. Flange 715 is then secured in place to open end 706A closing open end 706A with cap 701, whereby sealing body 710 spans open end 706A of reservoir 706 and gasket 703 is applied between open end 706A of reservoir 706 and flange 715, which provides a fluid-impervious seal between sealing body 710 and open end 706A. With assembly 250 so installed, outer face 711 of sealing body 710 faces away from open end 706A and opposed inner face 712 faces open end 706A to reservoir 706. Cap 701 is preferably installed with plug 704 applied to and closing port 702. However, plug 704 may be applied to close port 702 after cap 701 is installed on open end 706A of reservoir 706.

Cap 701 is secured to open end 706A of reservoir with fasteners, which, in the present embodiment, are bolts 740. In this embodiment, gasket 703 is formed with spaced-apart bolt holes 741 and flange 715 is formed with spaced-apart bolt holes 742 that correspond with bolt holes 741 formed in gasket 703. Bolt holes 741 of gasket 703 and bolt holes 742 of flange 715 relate or otherwise correspond to bolt holes 744 formed in open end 706A of reservoir 706. As a matter of illustration and reference, FIG. 55 shows two such bolt holes 744 formed in open end 706A of reservoir 706. In the application of assembly 700 to open end 706A of reservoir 706, bolt holes 741 of gasket 703 are registered with the bolt holes 744 formed in open end 706A of reservoir 706 and bolt holes 742 of flange 715 are, in turn, registered with bolt holes 741 formed gasket 703 and thus bolt holes 744 formed in open end 706A of reservoir 706. Bolts 740 are applied to the aligned bolt holes 741 and 742 and are threaded into bolt holes 744 formed in open end 706A of reservoir 706 and are then tightened so as to secure assembly 100 in place as shown in FIG. 55. In the present embodiment there are four bolt holes 744 in open end 706A of reservoir 706, and there are four bolt holes 741 in gasket 703 (only two shown in FIG. 55) and four bolt holes 742 in cap 701 that correspond with the four bolt holes 744 formed in open end 706A. The overall design of cap 701 is generally similar to caps 601 and 501 previously discussed and is a variation of caps 601 and 501.

And so having secured assembly 250 in place to open end 706A of reservoir 706 closing open end 706A and with plug 704 installed in place in its closed position closing port 702, a volume of a lubricating oil 750 is then applied to reservoir 706 in the conventional manner, whereby roller 707 is then prepared and ready for use in the operation of a vehicle incorporating roller 707 in the normal manner. As cap 701 is transparent, sealing body 710 spanning open end 706A of reservoir 706 is transparent to provide visual access therethrough in the direction indicated by arrowed line A into reservoir 706 through open end 706A for lubricating oil level and quality monitoring purposes, in accordance with the principle of the invention.

In the normal and customary operational position of roller 707, reservoir 706 is horizontal and open end 706A is vertical, and this orientation is clearly depicted in FIG. 55. In this orientation of reservoir 706 and open end 706A, cap 701 is vertically disposed such that sealing body 710 extends vertically across open end 706A of reservoir 706. The volume of lubricating oil 750 applied to reservoir 706 thus extends upwardly into reservoir 706 along inner face 712 of sealing body 710 to level 750A just below port 702 closed and sealed by plug 704. Again, the transparent character of sealing body 710 provides visual access therethrough into lubricating oil reservoir 706 through open end 706A for lubricating oil 750 level 750A and quality monitoring purposes. As the volume of lubricating oil 750 is readily and easily visualized through sealing body 710, level 750A of oil can easily be seen as can the quality of the volume of lubricating oil 750. Should level 750A of the volume of lubricating oil 750 be seen as too low, it may be replenished. Should the quality of the volume of lubricating oil 750 be seen as compromised, such as by dirt and debris, the volume of lubricating oil 750 may be withdrawn from reservoir 706 and replaced. Port 702 is useful for replenishing and replacing lubricating oil in reservoir 706. To replenish the volume of lubricating oil 750 should level 750A fall to an unacceptably low level, plug 704 is detached from port 702 and moved to its open position to open port 702, replenishing oil is applied to reservoir 706 through open port 702, and port 702 is reclosed by reinstalling plug 704 to port 702 placing plug 704 back to its closed position closing and sealing port 702. To replace volume of lubricating oil 750 with a fresh volume of a lubricating oil, plug 704 is detached from port 702 and moved to its open position to open port 702, volume of lubricating oil 750 is withdrawn from reservoir 706 through port 702, a fresh volume of a lubricating oil is applied to reservoir 706 through port 702, and port 702 is reclosed by reinstalling plug 704 to port 702 placing plug 704 back to its closed position closing and sealing port 702.

In the vertical positioning of cap 701 as shown in FIG. 55 such that sealing body 710 extends vertically across open end 706A of reservoir 706, it is again emphasized that in the closed position of plug 704 applied to and closing port 702, plug 704 is positioned in depression 720 and extends outwardly from outer face 711 of sealing body 710 into depression 720 no further than horizon H6 of rim 721 thereby isolating plug 704 from shearing forces across outer face 711 of sealing body 710 that could otherwise rip plug 704 from port 702 or otherwise damage plug 704. These shearing forces can be applied by plants or crops or bushes or the like that brush across outer face 711 of sealing body 710 in the normal operation of roller 707 in the normal operation of the vehicle incorporating roller 707. More particularly, in the close position of plug 704 threaded in port 702 and tightened in place the underside of head 114 is tightened against outer face 711 of sealing body 710 at depression 720, and head 730 of plug 704 projects or otherwise extends outwardly from outer face 711 of sealing body 710 into depression 720 no further than horizon H6 of rim 721 thereby isolating head 730 of plug 704 from shearing forces across outer face 711 of sealing body 710 that, again, could otherwise rip plug 704 from port 702 or otherwise damage plug 704.

Figure 58:
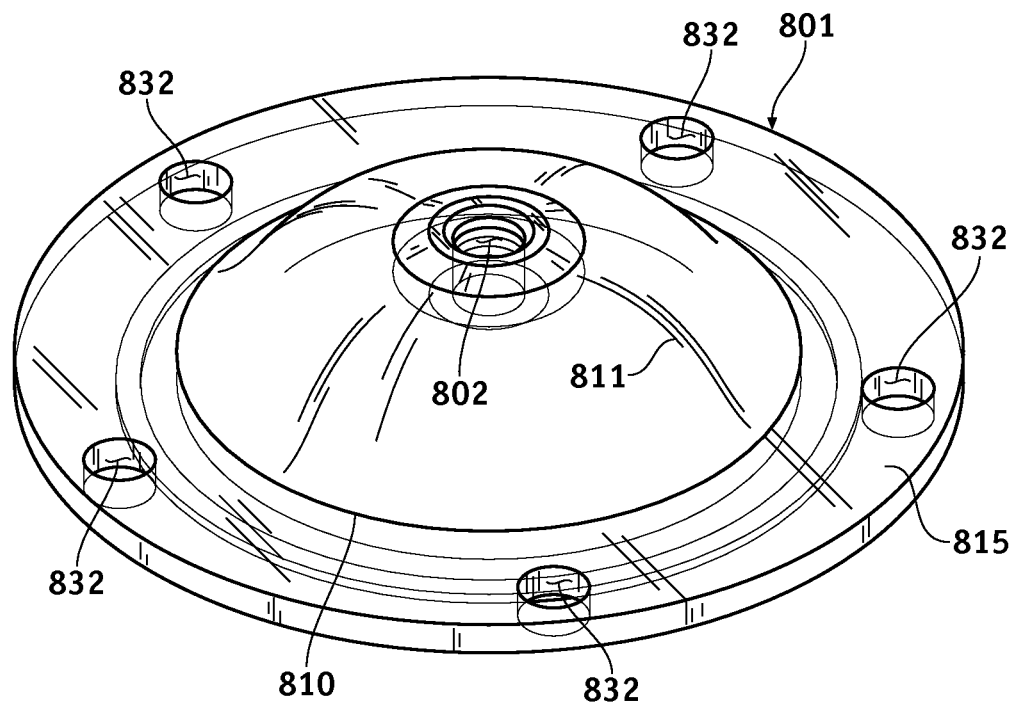
FIG. 58 is a top perspective view of yet another embodiment of an oil monitoring and maintenance cap constructed and arranged in accordance with the principle of the invention.
Figure 59:
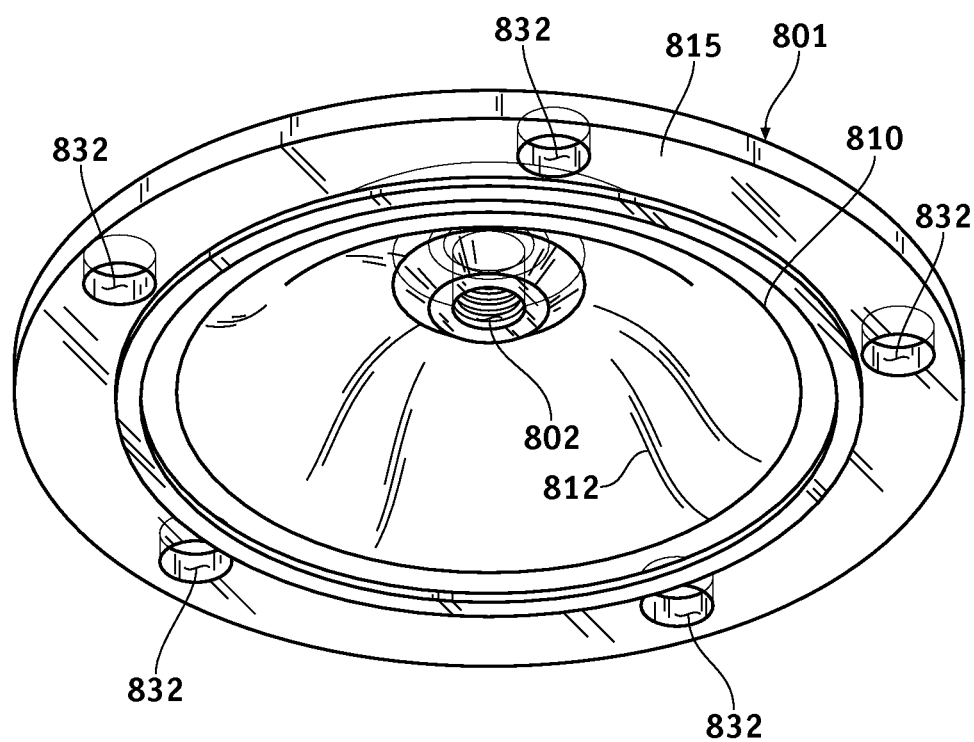
FIG. 59 is a bottom perspective view of the embodiment of FIG. 58.
Figure 60:
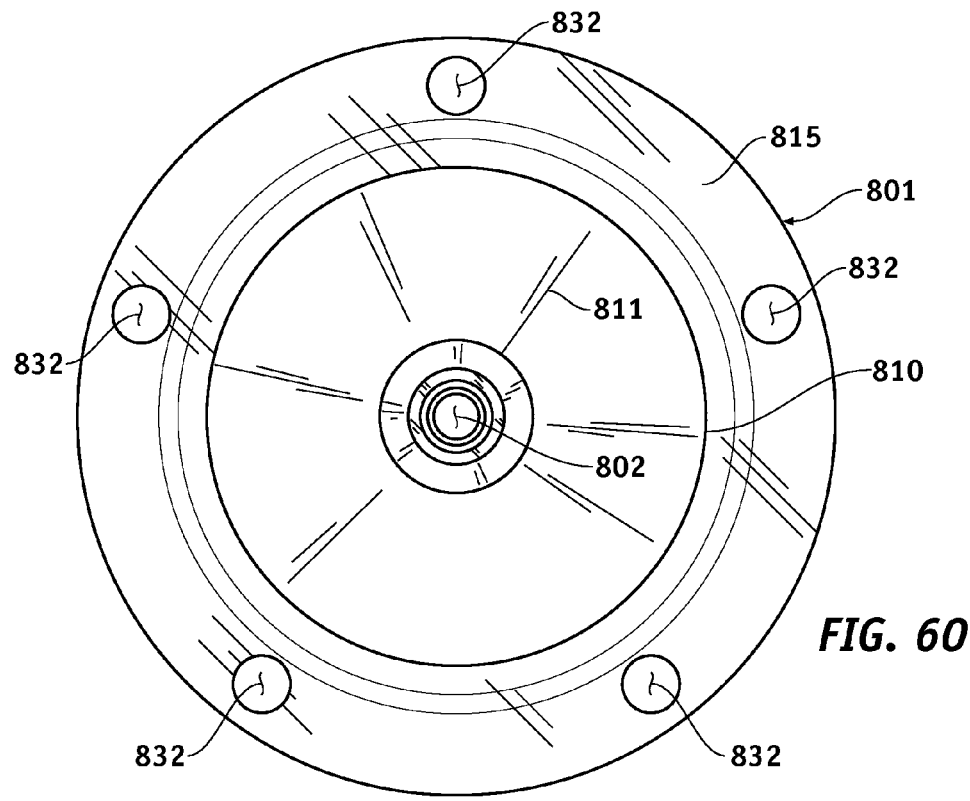
FIG. 60 is a top plan view of the embodiment of FIG. 58.
Figure 61:
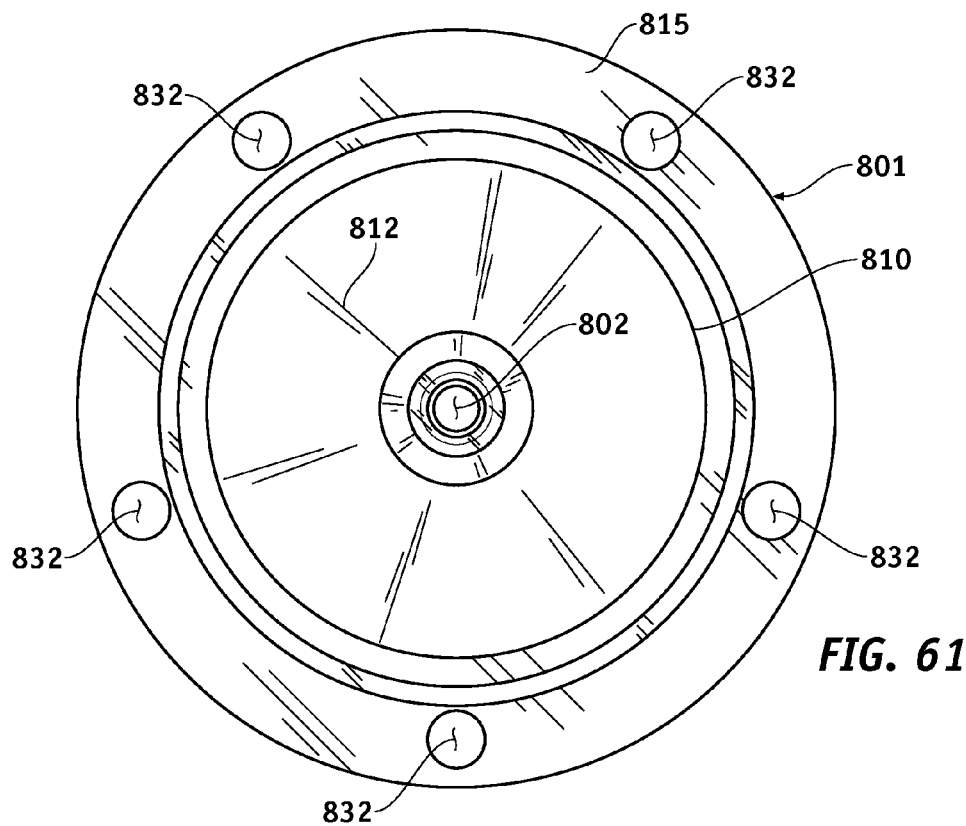
FIG. 61 is a bottom plan view of the embodiment of FIG. 58.
Figure 62:
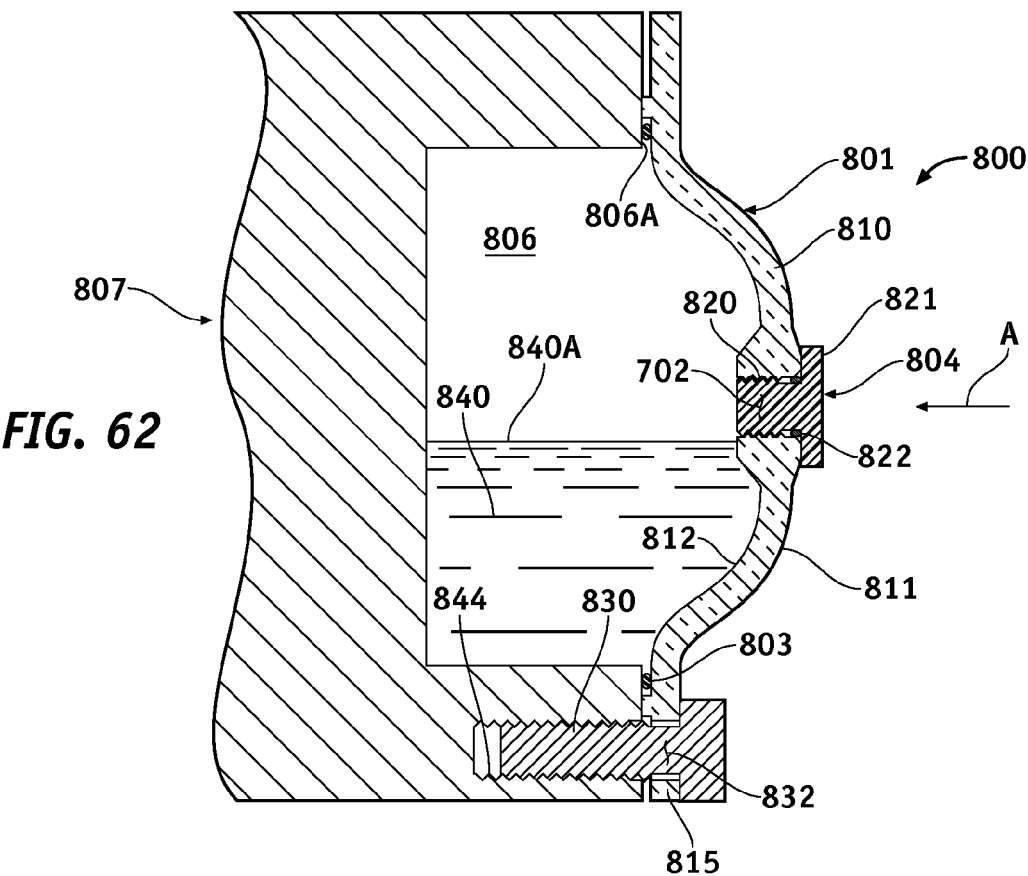
FIG. 62 is a section view of an oil monitoring and maintenance cap assembly, incorporating the oil monitoring and maintenance cap of FIG. 58, shown installed capping a lubricating oil reservoir of a roller.
Figure 63:
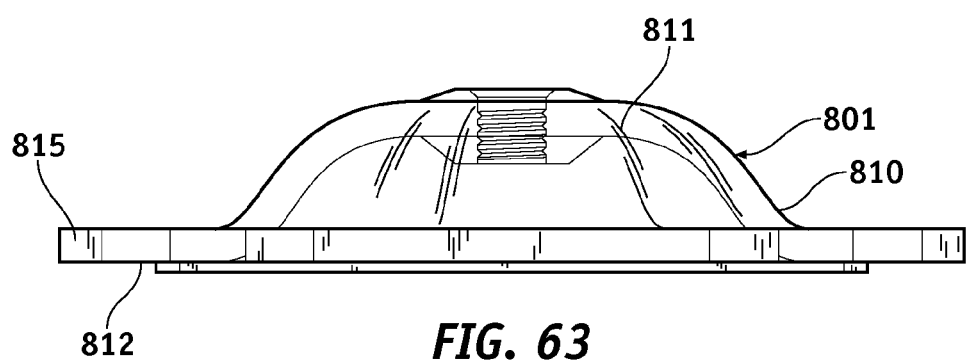
FIG. 63 is a right side elevation view of the oil monitoring and maintenance cap of FIG. 58, the opposite left side elevation view being the same thereof.
Figure 64:
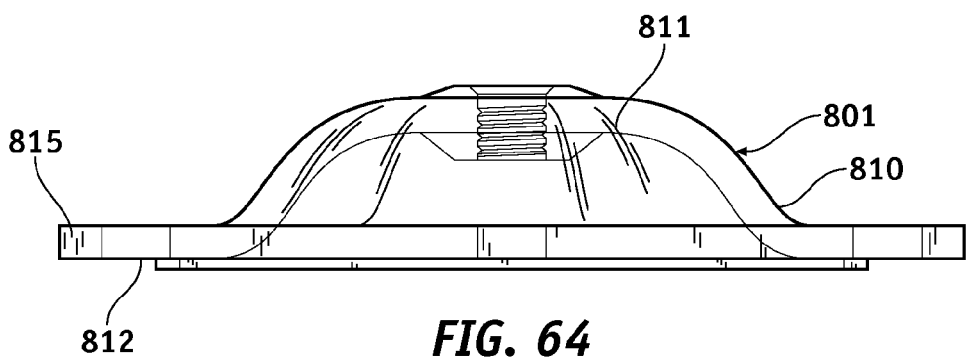
FIG. 64 is a front elevation view of the oil monitoring and maintenance cap of FIG. 58, the opposite rear elevation view being the same thereof.

FIG. 58 is a top perspective view of a further embodiment of an oil monitoring and maintenance cap 801 constructed and arranged in accordance with the principle of the invention. FIG. 59 is a bottom perspective view of the embodiment of FIG. 58, FIG. 60 is a top plan view of cap 801, FIG. 61 is a bottom plan view of cap 801, and FIG. 62 is a section view of an oil monitoring and maintenance cap assembly 800, incorporating cap 801, shown installed capping a lubricating oil reservoir 806 of a roller 807. FIG. 63 is a right side elevation view of cap 801, the opposite left side elevation view being the same thereof, and FIG. 64 is a front elevation view of cap 801, the opposite rear elevation view being the same thereof. Roller 807 shown in FIG. 62 is generally representative of a track roller of a tracked vehicle, like roller 80 discussed above. As is known in the art, reservoir 806 maintains a volume of a lubricating oil, which provides lubrication to roller 807 to reduce roller friction and draw and dissipate heat away from roller 807. Cap assembly 800 is removably secured to open end 806A of reservoir 806 closing open end 806A of reservoir 806 enclosing and sealing the volume of lubricating oil in reservoir 806, and provides visual access into reservoir 806 for lubricating oil level and quality monitoring purposes as will be explained.

Referencing FIGS. 58-64 in relevant part, which demonstrate the structure and design attributes of cap 801, cap 801 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 801 is preferably formed integrally, such as by molding, or machining from a billet or other stock work-piece. Cap 801 consists of a sealing body 810 including an outer face 811 and an opposed inner face 812 that meet at an outer perimeter extremity, which, in the present embodiment, is characterized by a circular perimeter or parametric flange 815. Sealing body 810 has a substantially uniform thickness extending between outer and inner faces 811 and 812. In the present embodiment, sealing body 810 has a thickness extending between outer and inner faces 811 and 812 in a range of approximately 7-9 millimeters.

As best seen in FIG. 62, sealing body 810 bulges outwardly from parametric flange 815, characterized in that outer and inner faces 811 and 812 are convex and concave, respectively, extending from parametric flange 815 to a geometric center of sealing body 810 formed with port 802. Port 802 is formed in sealing body 810 at the geometric center of sealing body 810. Port 802 extends through sealing body 810 at depression 270 from outer face 811 of sealing body 810 to inner face 812 of sealing body 810.

Port 802 is adapted to receive plug 804 to close and seal port 802 as shown in FIG. 62. Plug 804 is formed of a strong, hard, impact resistant, temperature resistant, chemical resistant, and non-conductive material or combination of materials, such as plastic, and consists of a threaded post 820 formed with a broad, enlarged head 821. A gasket 822 encircles post 820, and is located along the underside of head 821. As in the prior embodiments, post 820 relates to port 802 and is used to open and close port 802, in which case plug 804 is movable between an open position detached from and opening port 802 to provide access therethrough to reservoir 806 depicted in FIG. 62 for lubricating oil replacement and replenishment purposes, and a closed position applied to and closing port 802. Port 802 is inwardly threaded, and post 820 of plug 804 is correspondingly outwardly threaded. To apply and secure plug 804 to port 802, plug 804 is taken up, such as by hand, and applied into depression 270 in a direction toward outer face 811 and post 820 is applied to port 802 and is threaded into port 802 through rotation and is tightened securing in place tightening the underside of head 820 against outer face 811 at depression 270. In the closed position of plug 804 as shown in FIG. 62, gasket 822 is applied between head 821 of plug 804 and port 802 providing a fluid-impervious seal between plug 804 and port 802.

FIG. 62 is a highly generalized representation of reservoir 806 formed in roller 807 and which has an open end 806A, and this is a conventional and well-known arrangement in the art. A gasket 803, and flange 815 of cap 801 relate to open end 806A to reservoir 806. In the installation of assembly 800 to reservoir 806, gasket 803 is applied to open end 806A, and cap 801 is taken up and inner face 812 is directed toward open end 806A and cap is then moved toward open end 806A so as to apply inner face 812 of flange 815 of sealing body 810 of cap 801 against gasket 803. Flange 815 is then secured in place to open end 806A closing open end 806A with cap 801, whereby sealing body 810 spans open end 806A of reservoir 806 and gasket 803 is applied between open end 806A of reservoir 806 and flange 815, which provides a fluid-impervious seal between sealing body 810 and open end 806A. With assembly 800 so installed, outer face 811 of sealing body 810 faces away from open end 806A and opposed inner face 812 faces open end 806A to reservoir 806. Cap 801 is preferably installed with plug 804 applied to and closing port 802. However, plug 804 may be applied to close port 802 after cap 801 is installed on open end 806A of reservoir 806.

Cap 801 is secured to open end 806A of reservoir with fasteners, which, in the present embodiment, are bolts 830. In this embodiment, flange 815 is formed with spaced-apart bolt holes 832 that relate or otherwise correspond to bolt holes 834 formed in open end 806A of reservoir 806. As a matter of illustration and reference, FIG. 62 shows two such bolt holes 834 formed in open end 806A of reservoir 806. In the application of assembly 800 to open end 806A of reservoir 806, gasket 803 is positioned between flange 815 and open end 806A and bolt holes 832 of flange 815 of cap 801 are registered with bolt holes 834 formed in open end 806A of reservoir 806. Bolts 830 are applied to bolt holes 832 and are threaded into bolt holes 834 formed in open end 806A of reservoir 806 and are then tightened so as to secure assembly 800 in place as shown in FIG. 62. In the present embodiment there are five bolt holes 834 (only one shown in FIG. 62) in open end 806A of reservoir 806, and there are five bolt holes 832 in cap 801 that correspond with the five bolt holes 834 formed in open end 806A. The overall design of cap 801 is generally similar to cap 311 previously discussed and is a variation of cap 311.

And so having secured assembly 800 in place to open end 806A of reservoir 806 closing open end 806A and with plug 804 installed in place in its closed position closing port 802, a volume of a lubricating 840 is then applied to reservoir 806 in the conventional manner, whereby roller 807 is then prepared and ready for use in the operation of a vehicle incorporating roller 807 in the normal manner. As cap 801 is transparent, sealing body 810 spanning open end 806A of reservoir 806 is transparent to provide visual access therethrough in the direction indicated by arrowed line A into reservoir 806 through open end 806A for lubricating oil level and quality monitoring purposes, in accordance with the principle of the invention.

In the normal and customary operational position of roller 807, reservoir 806 is horizontal and open end 806A is vertical, and this orientation is clearly depicted in FIG. 62. In this orientation of reservoir 806 and open end 806A, cap 801 is vertically disposed such that sealing body 810 extends vertically across open end 806A of reservoir 806. The volume of lubricating oil 840 applied to reservoir 806 thus extends upwardly into reservoir 806 along inner face 812 of sealing body 810 to level 840A just below port 802 closed and sealed by plug 804. Again, the transparent character of sealing body 810 provides visual access therethrough into lubricating oil reservoir 806 through open end 806A for lubricating oil 840 level 840A and quality monitoring purposes. As the volume of lubricating oil 840 is readily and easily visualized through sealing body 810, level 840A of oil can easily be seen as can the quality of the volume of lubricating oil 840. Should level 840A of the volume of lubricating oil 840 be seen as too low, it may be replenished. Should the quality of the volume of lubricating oil 840 be seen as compromised, such as by dirt and debris, the volume of lubricating oil 840 may be withdrawn from reservoir 806 and replaced. Port 802 is useful for replenishing and replacing lubricating oil in reservoir 806. To replenish the volume of lubricating oil 840 should level 840A fall to an unacceptably low level, plug 804 is detached from port 802 and moved to its open position to open port 802, replenishing oil is applied to reservoir 806 through open port 802, and port 802 is reclosed by reinstalling plug 804 to port 802 placing plug 804 back to its closed position closing and sealing port 802. To replace volume of lubricating oil 840 with a fresh volume of a lubricating oil, plug 804 is detached from port 802 and moved to its open position to open port 802, volume of lubricating oil 840 is withdrawn from reservoir 806 through port 802, a fresh volume of a lubricating oil is applied to reservoir 806 through port 802, and port 802 is reclosed by reinstalling plug 804 to port 802 placing plug 804 back to its closed position closing and sealing port 802.

Figure 65:
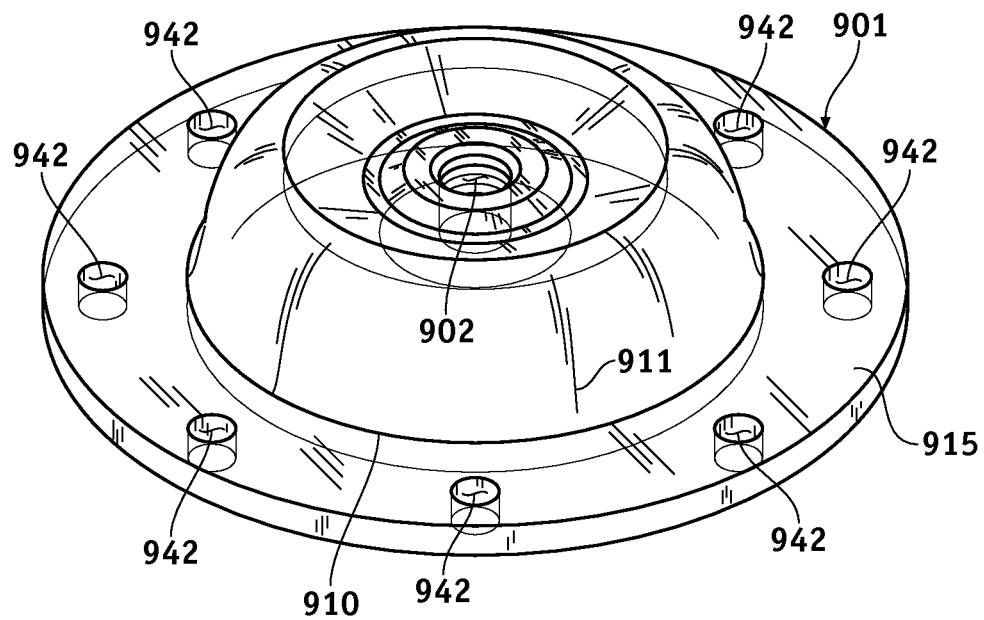
FIG. 65 is a top perspective view of still another embodiment of an oil monitoring and maintenance cap constructed and arranged in accordance with the principle of the invention.
Figure 66:
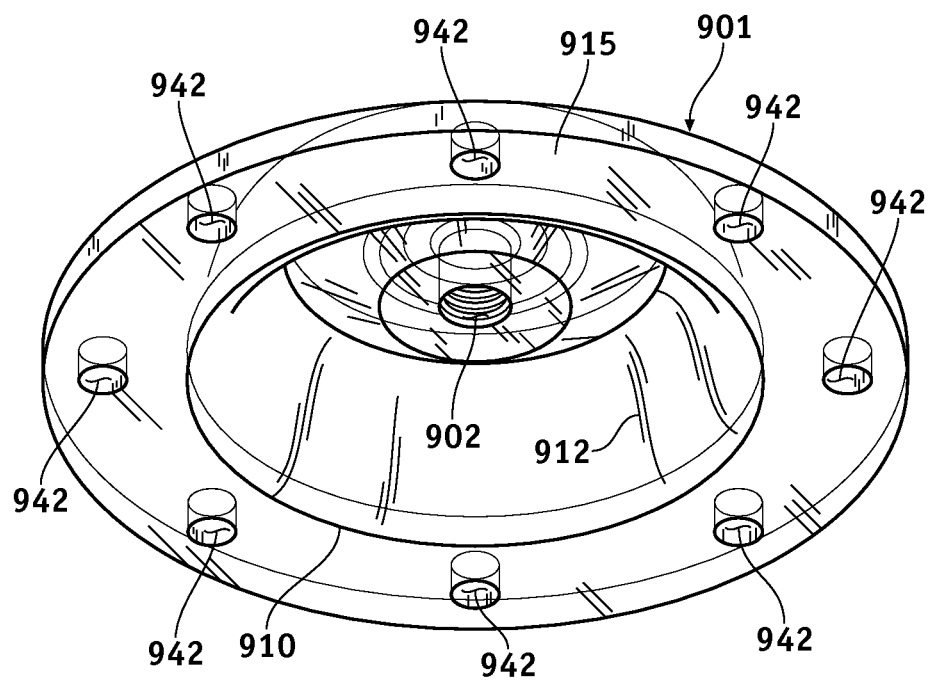
FIG. 66 is a bottom perspective view of the embodiment of FIG. 65.
Figure 67:
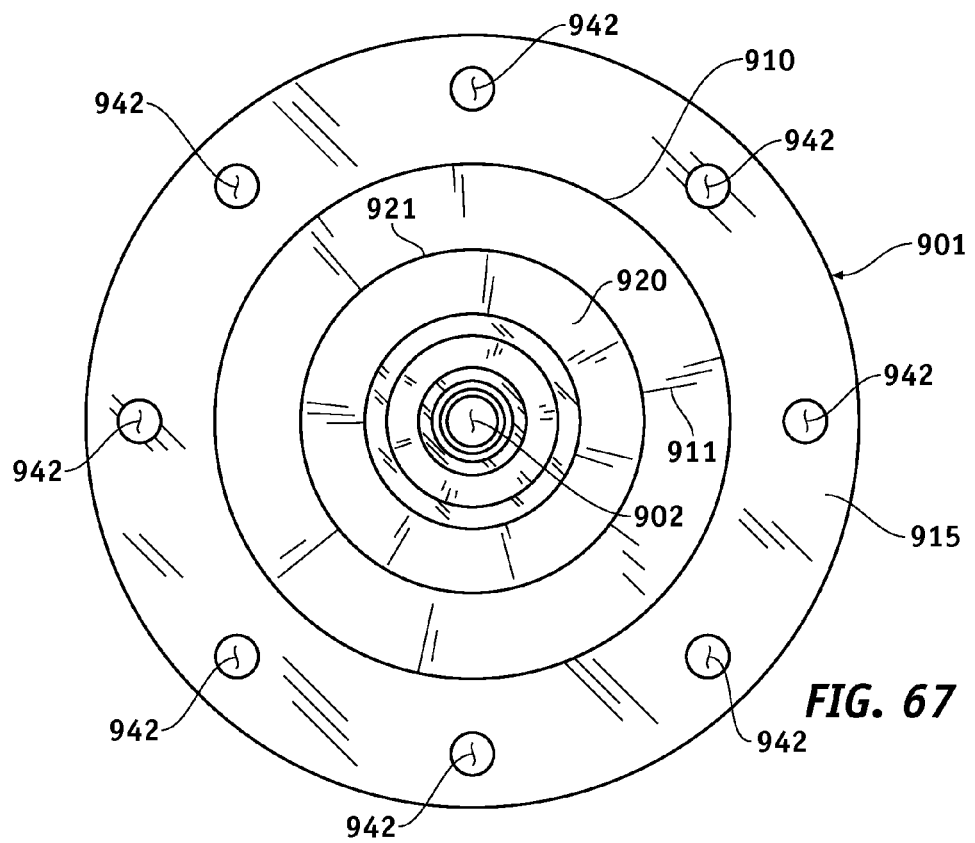
FIG. 67 is a top plan view of the embodiment of FIG. 65.
Figure 68:
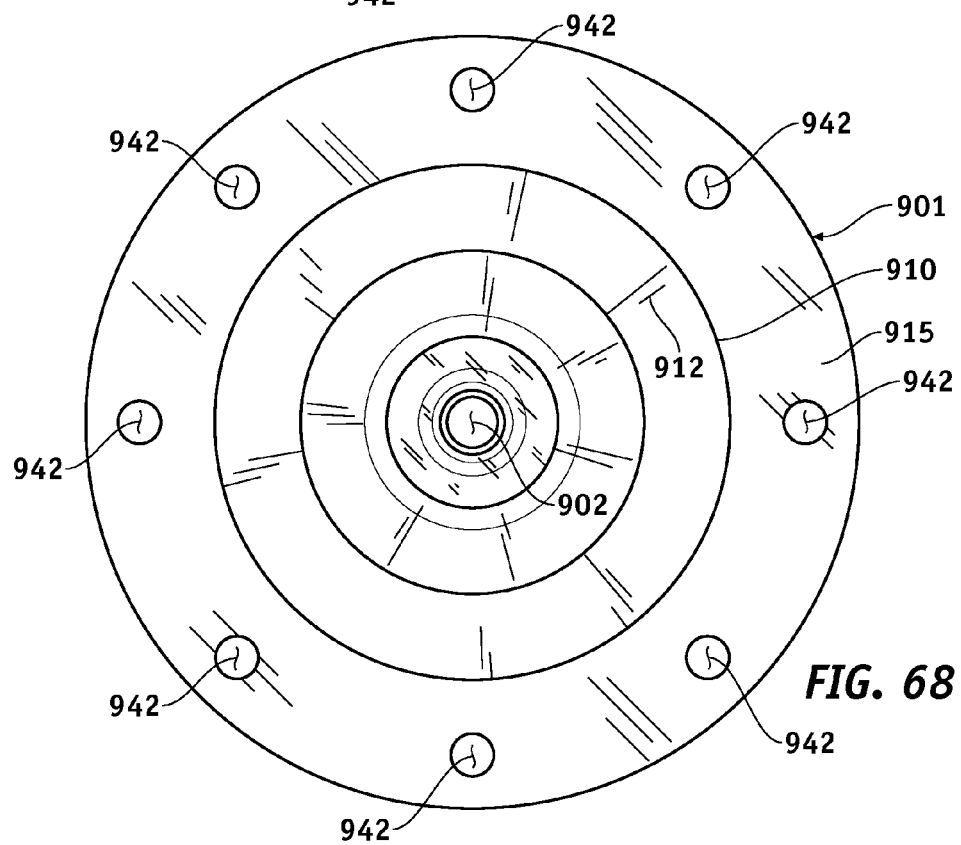
FIG. 68 is a bottom plan view of the embodiment of FIG. 65.
Figure 69:
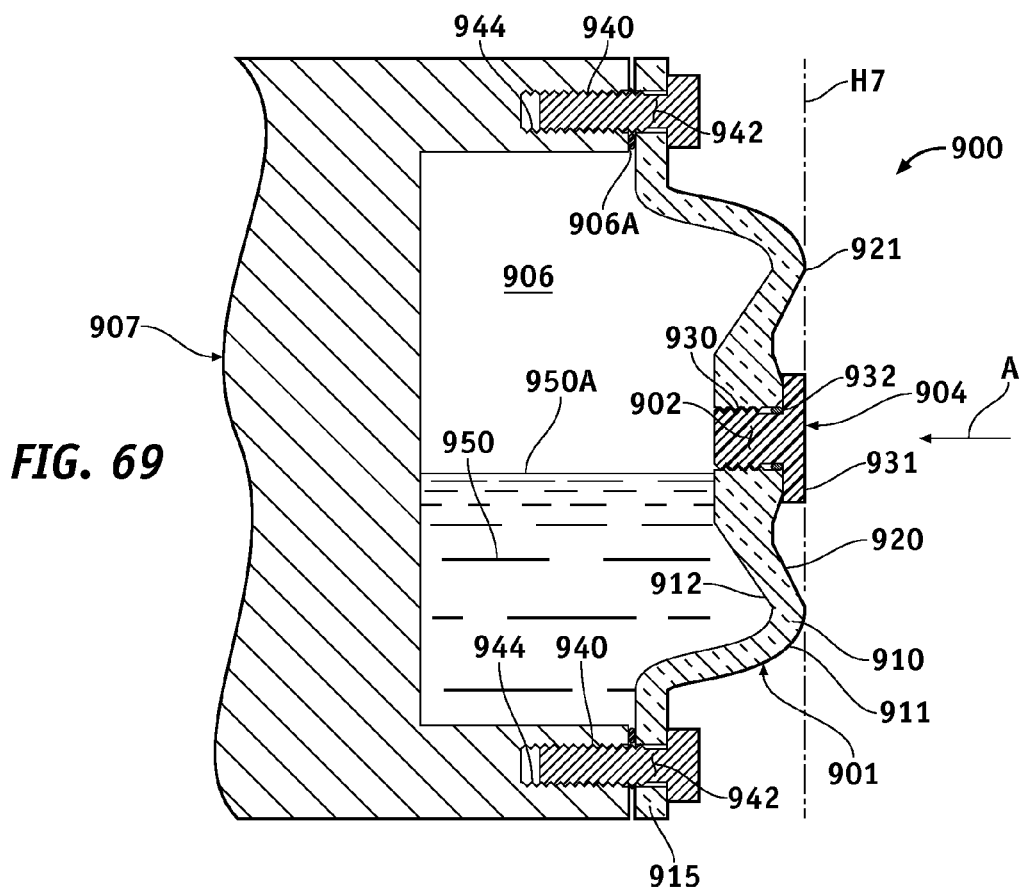
FIG. 69 is a section view of an oil monitoring and maintenance cap assembly, incorporating the oil monitoring and maintenance cap of FIG. 65, shown installed capping a lubricating oil reservoir of a roller.
Figure 70:
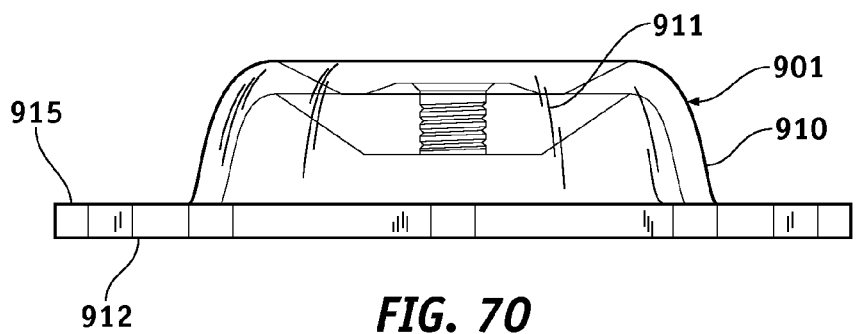
FIG. 70 is a right side elevation view of the oil monitoring and maintenance cap of FIG. 65, the opposite left side elevation view being the same thereof.
Figure 71:
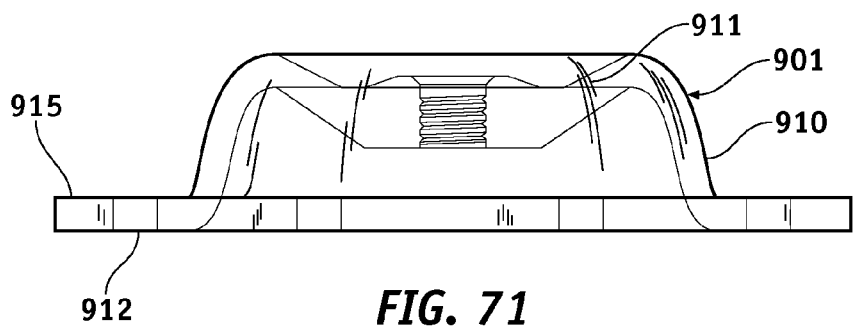
FIG. 71 is a front elevation view of the oil monitoring and maintenance cap of FIG. 65, the opposite rear elevation view being the same thereof.

FIG. 65 is a top perspective view of a yet still a further embodiment of an oil monitoring and maintenance cap 901 constructed and arranged in accordance with the principle of the invention. FIG. 66 is a bottom perspective view of the embodiment of FIG. 65, FIG. 67 is a top plan view of cap 901, FIG. 68 is a bottom plan view of cap 901, and FIG. 69 is a section view of an oil monitoring and maintenance cap assembly 900, incorporating cap 901, shown installed capping a lubricating oil reservoir 906 of a roller 907. FIG. 70 is a right side elevation view of cap 901, the opposite left side elevation view being the same thereof, and FIG. 71 is a front elevation view of cap 901, the opposite rear elevation view being the same thereof. Roller 907 shown in FIG. 69 is generally representative of a track roller of a tracked vehicle, like roller 80 discussed above. As is known in the art, reservoir 906 maintains a volume of a lubricating oil, which provides lubrication to roller 907 to reduce roller friction and draw and dissipate heat away from roller 907. Cap assembly 900 is removably secured to open end 906A of reservoir 906 closing open end 906A of reservoir 906 enclosing and sealing the volume of lubricating oil in reservoir 906, and provides visual access into reservoir 906 for lubricating oil level and quality monitoring purposes as will be explained.

Referencing FIGS. 65-71 in relevant part, which demonstrate the structure and design attributes of cap 901, cap 901 is a broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 901 is preferably formed integrally, such as by molding, or machining from a billet or other stock work-piece. Cap 901 consists of a sealing body 910 including an outer face 911 and an opposed inner face 912 that meet at an outer perimeter extremity, which, in the present embodiment, is characterized by a circular perimeter or parametric flange 915. Sealing body 910 has a substantially uniform thickness extending between outer and inner faces 911 and 912. In the present embodiment, sealing body 910 has a thickness extending between outer and inner faces 911 and 912 in a range of approximately 7-9 millimeters.

As best seen in FIG. 69, sealing body 910 bulges outwardly from parametric flange 915, characterized in that outer and inner faces 911 and 912 are convex and concave, respectively, extending from parametric flange 915 to a geometric center of sealing body 910 formed by a depression 920 with a raised rim 921 formed in outer face 911 of sealing body. Depression 920 is formed in outer face 911 of sealing body 910 at the geometric center of sealing body 910, and is encircled by raised rim 921. Port 902 is formed in sealing body 910 at the geometric center of sealing body 910, and is formed at depression 920. Port 902 extends through sealing body 910 at depression 920 from outer face 911 of sealing body 910 to inner face 912 of sealing body 910.

Port 902 is adapted to receive plug 904 to close and seal port 902. Looking to FIG. 69, plug 904 is formed of a strong, hard, impact resistant, temperature resistant, chemical resistant, and non-conductive material or combination of materials, such as plastic, and consists of a threaded post 930 formed with a broad, enlarged head 931. A gasket 932 encircles post 930, and is located along the underside of head 931. Post 930 relates to port 902 and is used to open and close port 902, in which case plug 904 is movable between an open position detached from and opening port 902 to provide access therethrough to reservoir 906 depicted in FIG. 69 for lubricating oil replacement and replenishment purposes, and a closed position applied to and closing port 902 as shown in FIG. 69. Port 902 is inwardly threaded, and post 930 of plug 904 is correspondingly outwardly threaded. To apply and secure plug 904 to port 902, plug 904 is taken up, such as by hand, and applied into depression 920 in a direction toward outer face 911 and post 930 is applied to port 902 and is threaded into port 902 through rotation and is tightened securing in place tightening the underside of head 930 against outer face 911 at depression 920. In the closed position of plug 904 as shown in FIG. 69, gasket 932 is applied between head 931 of plug 904 and port 902 providing a fluid-impervious seal between plug 904 and port 902.

As seen in FIG. 69, rim 921 defines and extends along a plane or horizon H7, and depression 920 extends into outer face 911 and is defined inwardly from horizon H7. In the closed position of plug 904 applied to and closing port 902, plug 904 is positioned in depression 920 and extends outwardly from outer face 911 of sealing body 910 into depression 920 no further than horizon H7 of rim 921 thereby isolating plug 904 from shearing forces across outer face 911 of sealing body 910. In a further and more specific aspect, in the close position of plug 904 threaded in port 902 and tightened in place the underside of head 114 is tightened against outer face 911 of sealing body 910 at depression 920, and head 930 of plug 904 projects or otherwise extends outwardly from outer face 911 of sealing body 910 into depression 920 no further than horizon H7 of rim 921 thereby isolating head 930 of plug 904 from shearing forces across outer face 911 of sealing body 910.

FIG. 69 is a highly generalized representation of reservoir 906 formed in roller 907 and which has an open end 906A, and this is a conventional and well-known arrangement in the art. Gasket 903 and flange 915 of cap 901 relate to open end 906A to reservoir 906. In the installation of assembly 250 to reservoir 906, gasket 903 is applied to open end 906A, and cap 901 is taken up and inner face 912 is directed toward open end 906A and cap is then moved toward open end 906A so as to apply inner face 912 of flange 915 of sealing body 910 of cap 901 against gasket 903. Flange 915 is then secured in place to open end 906A closing open end 906A with cap 901, whereby sealing body 910 spans open end 906A of reservoir 906 and gasket 903 is applied between open end 906A of reservoir 906 and flange 915, which provides a fluid-impervious seal between sealing body 910 and open end 906A. With assembly 250 so installed, outer face 911 of sealing body 910 faces away from open end 906A and opposed inner face 912 faces open end 906A to reservoir 906. Cap 901 is preferably installed with plug 904 applied to and closing port 902. However, plug 904 may be applied to close port 902 after cap 901 is installed on open end 906A of reservoir 906.

Cap 901 is secured to open end 906A of reservoir with fasteners, which, in the present embodiment, are bolts 941. In this embodiment, flange 915 is formed with spaced-apart bolt holes 942 that relate or otherwise correspond to bolt holes 944 formed in open end 906A of reservoir 906. As a matter of illustration and reference, FIG. 69 shows two such bolt holes 944 formed in open end 906A of reservoir 906. In the application of assembly 900 to open end 906A of reservoir 906, gasket 903 is positioned between flange 915 and open end 906A of reservoir 906, and bolt holes 942 of flange 915 are registered with bolt holes 944 formed in open end 906A of reservoir 906. Bolts 941 are applied to bolt holes 942 and are threaded into bolt holes 944 formed in open end 906A of reservoir 906 and are then tightened so as to secure assembly 100 in place as shown in FIG. 69. In the present embodiment there are eight bolt holes 944 in open end 906A (only two shown) of reservoir 906, and there are eight bolt holes 942 in cap 901 that correspond with the eight bolt holes 944 formed in open end 906A. The overall design of cap 901 is generally similar to cap 701 previously discussed and is a variation of cap 701.

And so having secured assembly 250 in place to open end 906A of reservoir 906 closing open end 906A and with plug 904 installed in place in its closed position closing port 902, a volume of a lubricating oil 950 is then applied to reservoir 906 in the conventional manner, whereby roller 907 is then prepared and ready for use in the operation of a vehicle incorporating roller 907 in the normal manner. As cap 901 is transparent, sealing body 910 spanning open end 906A of reservoir 906 is transparent to provide visual access therethrough in the direction indicated by arrowed line A into reservoir 906 through open end 906A for lubricating oil level and quality monitoring purposes, in accordance with the principle of the invention.

In the normal and customary operational position of roller 907, reservoir 906 is horizontal and open end 906A is vertical, and this orientation is clearly depicted in FIG. 69. In this orientation of reservoir 906 and open end 906A, cap 901 is vertically disposed such that sealing body 910 extends vertically across open end 906A of reservoir 906. The volume of lubricating oil 950 applied to reservoir 906 thus extends upwardly into reservoir 906 along inner face 912 of sealing body 910 to level 950A just below port 902 closed and sealed by plug 904. Again, the transparent character of sealing body 910 provides visual access therethrough into lubricating oil reservoir 906 through open end 906A for lubricating oil 950 level 950A and quality monitoring purposes. As the volume of lubricating oil 950 is readily and easily visualized through sealing body 910, level 950A of oil can easily be seen as can the quality of the volume of lubricating oil 950. Should level 950A of the volume of lubricating oil 950 be seen as too low, it may be replenished. Should the quality of the volume of lubricating oil 950 be seen as compromised, such as by dirt and debris, the volume of lubricating oil 950 may be withdrawn from reservoir 906 and replaced. Port 902 is useful for replenishing and replacing lubricating oil in reservoir 906. To replenish the volume of lubricating oil 950 should level 950A fall to an unacceptably low level, plug 904 is detached from port 902 and moved to its open position to open port 902, replenishing oil is applied to reservoir 906 through open port 902, and port 902 is reclosed by reinstalling plug 904 to port 902 placing plug 904 back to its closed position closing and sealing port 902. To replace volume of lubricating oil 950 with a fresh volume of a lubricating oil, plug 904 is detached from port 902 and moved to its open position to open port 902, volume of lubricating oil 950 is withdrawn from reservoir 906 through port 902, a fresh volume of a lubricating oil is applied to reservoir 906 through port 902, and port 902 is reclosed by reinstalling plug 904 to port 902 placing plug 904 back to its closed position closing and sealing port 902.

In the vertical positioning of cap 901 as shown in FIG. 69 such that sealing body 910 extends vertically across open end 906A of reservoir 906, it is again emphasized that in the closed position of plug 904 applied to and closing port 902, plug 904 is positioned in depression 920 and extends outwardly from outer face 911 of sealing body 910 into depression 920 no further than horizon H7 of rim 921 thereby isolating plug 904 from shearing forces across outer face 911 of sealing body 910 that could otherwise rip plug 904 from port 902 or otherwise damage plug 904. These shearing forces can be applied by plants or crops or bushes or the like that brush across outer face 911 of sealing body 910 in the normal operation of roller 907 in the normal operation of the vehicle incorporating roller 907. More particularly, in the close position of plug 904 threaded in port 902 and tightened in place the underside of head 114 is tightened against outer face 911 of sealing body 910 at depression 920, and head 930 of plug 904 projects or otherwise extends outwardly from outer face 911 of sealing body 910 into depression 920 no further than horizon H7 of rim 921 thereby isolating head 930 of plug 904 from shearing forces across outer face 911 of sealing body 910 that, again, could otherwise rip plug 904 from port 902 or otherwise damage plug 904.

Figure 72:
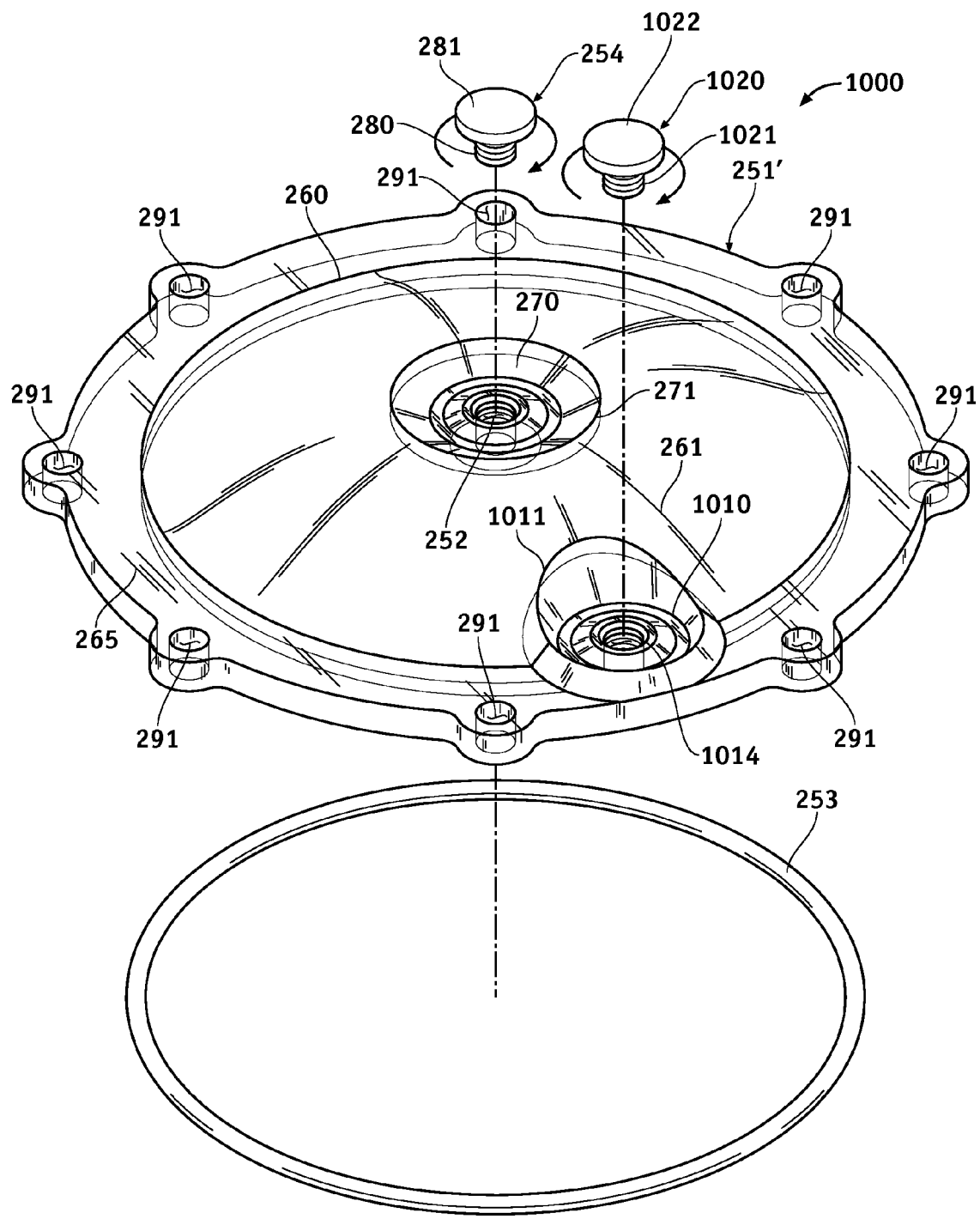
FIG. 72 is an exploded top perspective view of yet still another embodiment of an oil monitoring and maintenance cap assembly including an oil monitoring and maintenance cap formed with a lubricating oil maintenance and drain ports, a gasket, and a plugs used to open and close the respective ports formed in the oil monitoring and maintenance cap.
Figure 73:
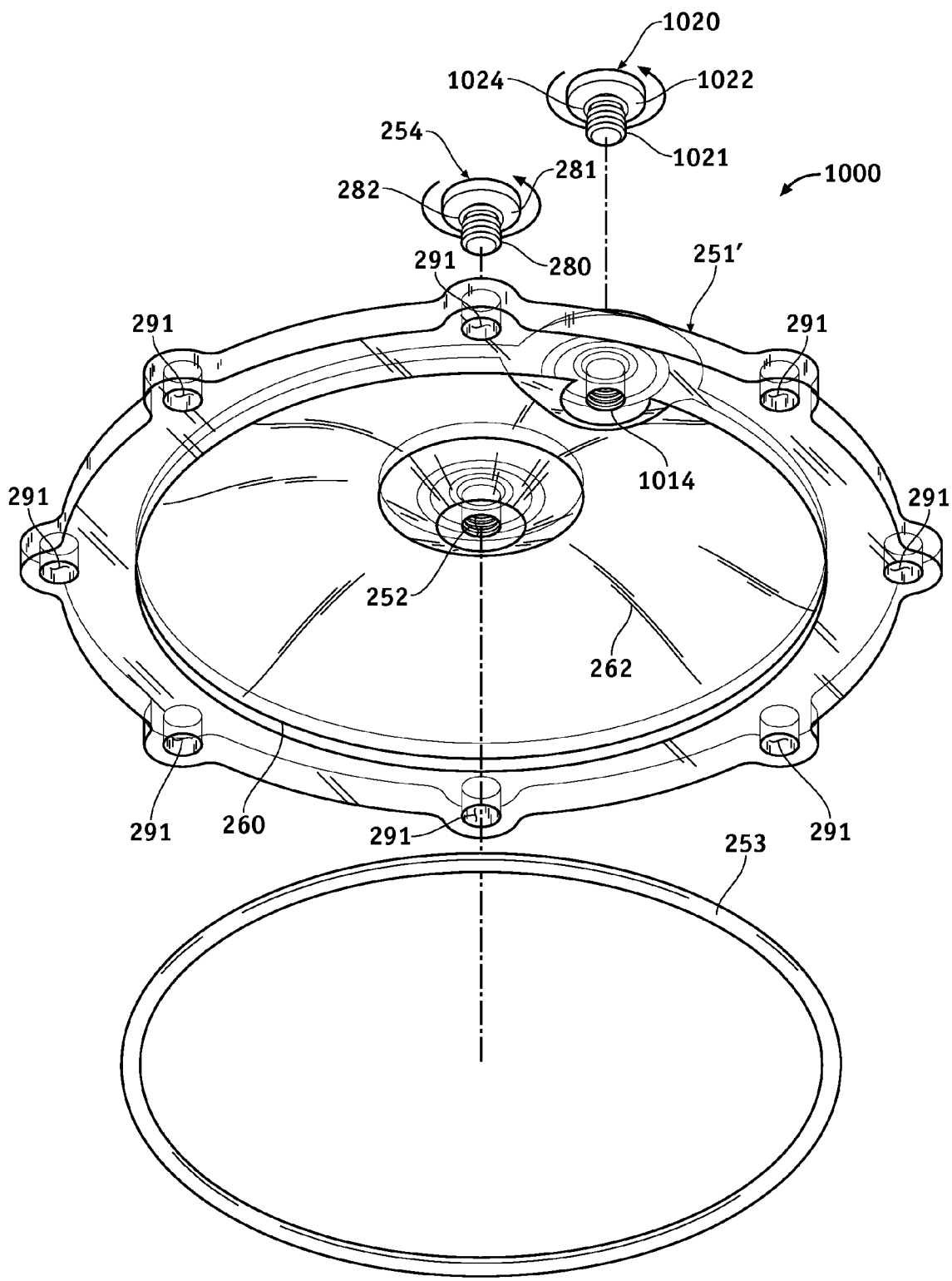
FIG. 73 is an exploded bottom perspective view of the embodiment of FIG. 72.
Figure 74:
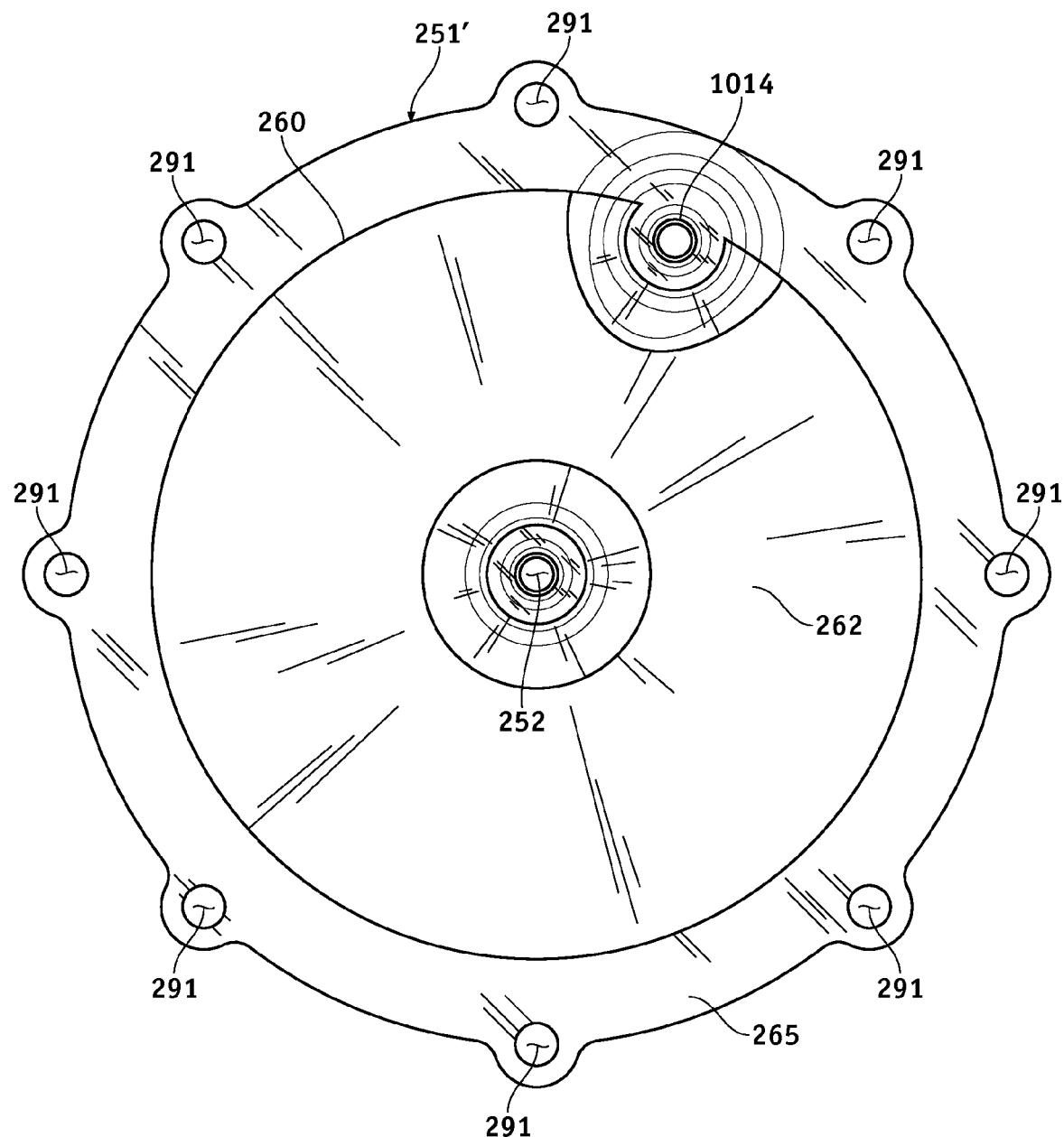
FIG. 74 is a bottom plan view of the oil monitoring and maintenance cap of FIG. 72.
Figure 75:
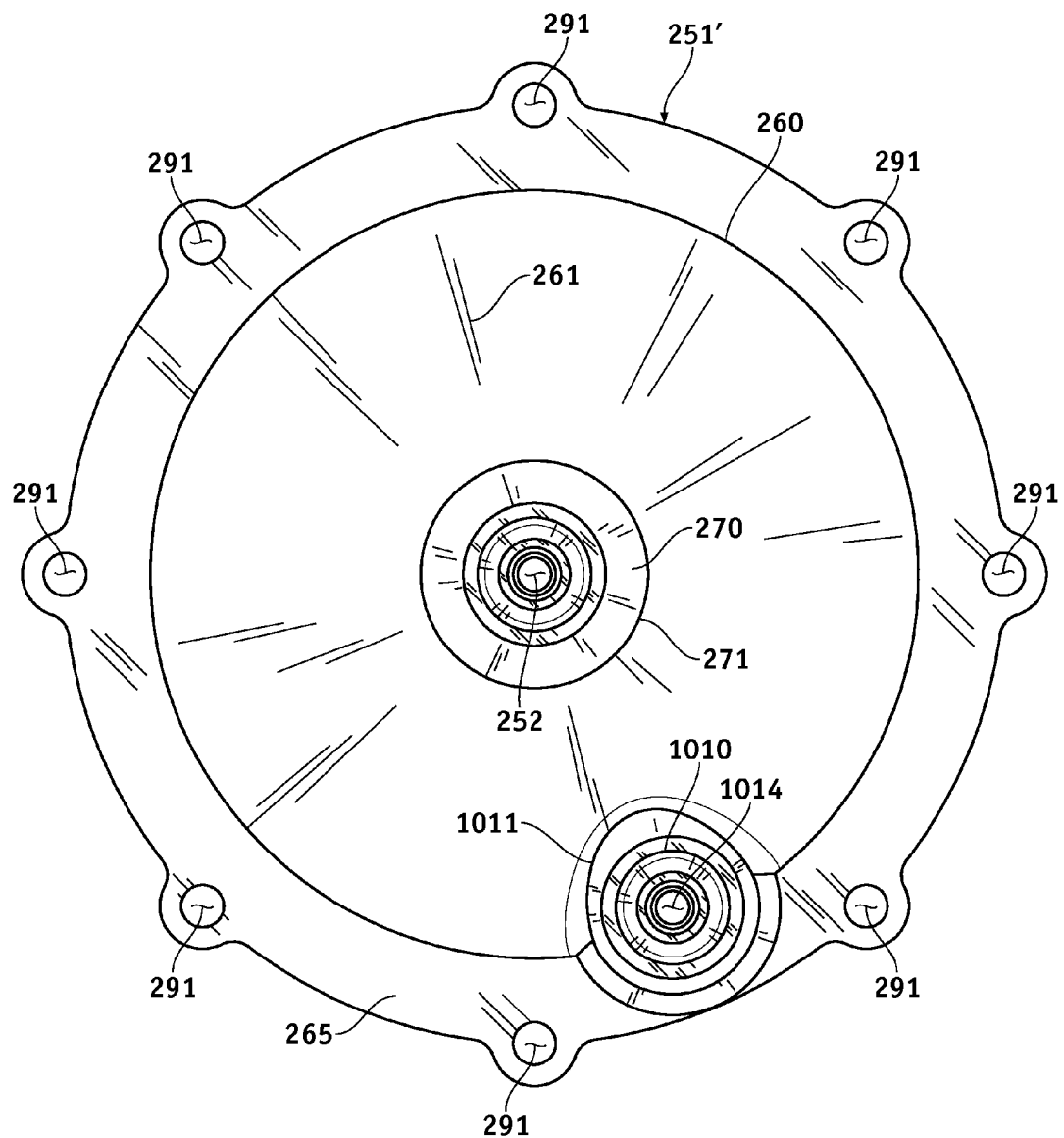
FIG. 75 is a top plan view of the oil monitoring and maintenance cap of FIG. 72.
Figure 76:
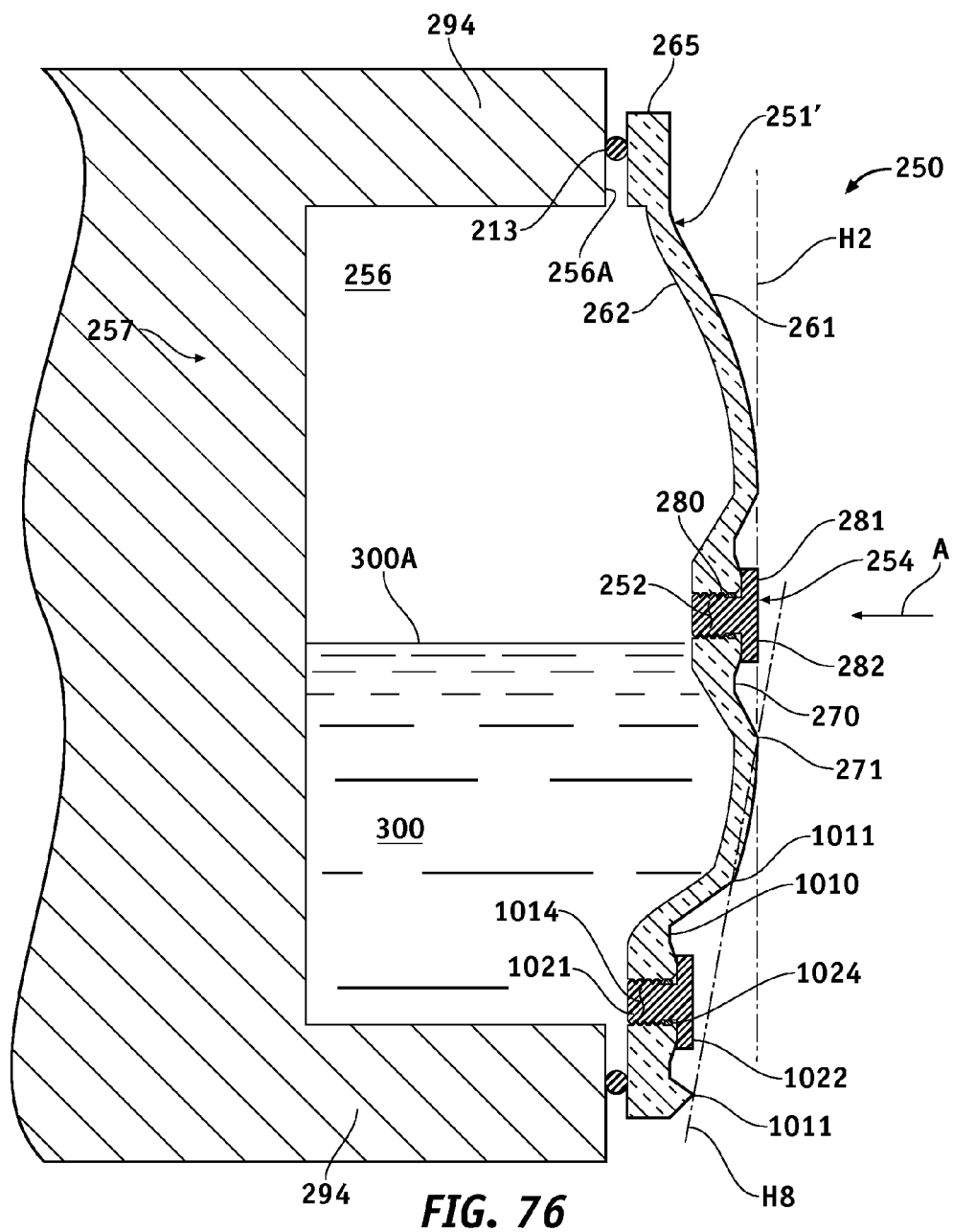
FIG. 76 is a section view of the embodiment of FIG. 72 shown installed capping a lubricating oil reservoir of a roller.
Figure 77:
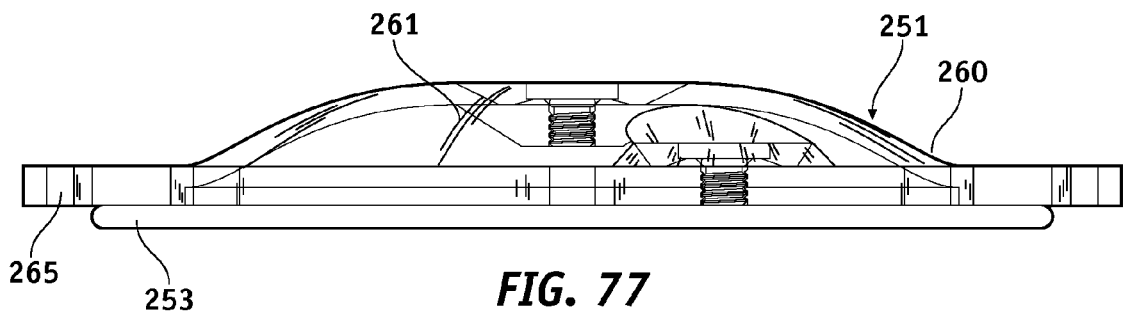
FIG. 77 is a side elevation view of the oil monitoring and maintenance cap of FIG. 72.

FIG. 72 is an exploded top perspective view of yet another embodiment of an oil monitoring and maintenance cap assembly 1000. In common with oil monitoring and maintenance cap assembly 250 in FIGS. 16-22, oil monitoring and maintenance cap assembly 1000 shares oil monitoring and maintenance cap 251 formed with lubricating oil maintenance port 252, gasket 253, and plug 254 used to open and close port 252 formed in cap 251. For the purposes of clarity, reference numeral 251 of cap assembly 1000 is denoted with a prime ("'") symbol throughout the discussion of cap assembly 1000. As matter of illustration and reference, FIG. 73 is an exploded bottom perspective view of the embodiment of FIG. 72, FIG. 74 is a bottom plan view of cap 251', FIG. 75 is a top plan view of cap 251', FIG. 76 is a section view of the embodiment of FIG. 72 shown installed capping lubricating oil reservoir 256 of roller 257 first referenced in FIG. 20, and FIG. 77 is a side elevation view of cap 251' with gasket 253 applied thereto. Roller 257 in FIG. 76 is generally representative of a track roller of a tracked vehicle, like roller 80 discussed above. As is known in the art, reservoir 256 maintains a volume of a lubricating oil, which provides lubrication to roller 257 to reduce roller friction and draw and dissipate heat away from roller 257. Cap assembly 1000 is removably secured to open end 256A of reservoir 256 closing open end 256A of reservoir 256 enclosing and sealing the volume of lubricating oil in reservoir 256, and provides visual access into reservoir 256 for lubricating oil level and quality monitoring purposes as will be explained.

Cap 251' is an exemplary dual port oil monitoring and maintenance cap, which is useful for capping an open end of a reservoir, and in a particular embodiment for capping the open end of a reservoir of a roller of a tracked vehicle. Referencing FIGS. 72-77 in relevant part, which demonstrate the structure and design attributes of cap 251', cap 251' is broad and disc-shaped and of substantial construction, and is formed a strong, hard, impact resistant, temperature resistant, chemical resistant, non-conductive, and transparent material or combination of materials. A preferred material is transparent plastic, such as transparent nylon. Cap 251' is preferably formed integrally, such as by molding, or machining from a billet or other stock work-piece. In common with cap 251, cap 251' consists of sealing body 260 including outer face 261 and opposed inner face 262 that meet at an outer perimeter extremity, which is circular perimeter or parametric flange 265. For reference purposes, reference numeral 265 is used interchangeably for the parametric flange and the perimeter extremity of sealing body 260 of cap 251'. Reference numeral 265 is Sealing body 260 has a substantially uniform thickness extending between outer and inner faces 261 and 262. In the present embodiment, sealing body 260 has a thickness extending between outer and inner faces 261 and 262 in a range of approximately 7-9 millimeters.

As best seen in FIG. 76, sealing body 260 bulges outwardly from parametric flange 265, characterized in that outer and inner faces 261 and 262 are convex and concave, respectively, extending from parametric flange 265 to a geometric center of sealing body 260 formed by depression 270 with rim 271 formed in outer face 261 of sealing body. Depression 270 is formed in outer face 261 of sealing body 260 at the geometric center of sealing body 260, and is encircled by rim 271. The geometric center of sealing body 260 is a central location of sealing body 260 relative to the perimeter extremity of sealing body 260 defined by perimeter or parametric flange 265. Port 252 is formed in sealing body 260 at the geometric center or central location of sealing body 260, and is formed at depression 270. Port 252 extends through sealing body 260 at depression 270 from outer face 261 of sealing body 260 to inner face 262 of sealing body 260.

In common with cap assembly 250, in cap assembly 1000 port 252 is adapted to receive plug 254 to close and seal port 252. Plug 254 is formed of a strong, hard, impact resistant, temperature resistant, chemical resistant, and non-conductive material or combination of materials, such as plastic, and consists of threaded post 280 formed with head 281. Gasket 282, shown in FIGS. 73 and 76, encircles post 280, and is located along the underside of head 281. Post 280 relates to port 252 and is used to open and close port 252, in which case plug 254 is movable between an open position detached from and opening port 252 as shown in FIGS. 72 and 73 to provide access therethrough to reservoir 256 depicted in FIG. 76 for lubricating oil replacement and replenishment purposes, and a closed position applied to and closing port 252 in FIG. 76. Port 252 is inwardly threaded, and post 280 of plug 254 is correspondingly outwardly threaded. In common with cap assembly 250, to apply and secure plug 254 to port 252, plug 254 is taken up, such as by hand, and applied into depression 270 in a direction toward outer face 261 and post 280 is applied to port 252 and is threaded into port 252 through rotation and is tightened securing in place tightening the underside of head 280 against outer face 261 at depression 270. In the closed position of plug 254 FIG. 76, gasket 282 is applied between head 281 of plug 254 and port 252 providing a fluid-impervious seal between plug 254 and port 252.

As seen in FIG. 76, rim 271 defines and extends along plane or horizon H2, and depression 270 extends into outer face 261 and is defined inwardly from horizon H2. In the closed position of plug 254 applied to and closing port 252, plug 254 is positioned in depression 270 and extends outwardly from outer face 261 of sealing body 260 into depression 270 no further than horizon H2 of rim 271 thereby isolating plug 254 from shearing forces across outer face 261 of sealing body 260 at the geometric center of, or otherwise the central location of, sealing body 260 of cap 251'. In a further and more specific aspect, in the close position of plug 254 threaded in port 252 and tightened in place the underside of head 114 is tightened against outer face 261 of sealing body 260 at depression 270, and head 280 of plug 254 projects or otherwise extends outwardly from outer face 261 of sealing body 260 into depression 270 no further than horizon H2 of rim 271 thereby isolating head 280 of plug 254 from shearing forces across outer face 261 of sealing body 260 at the geometric center of, or otherwise the central location of, sealing body 260 of cap 251'. In FIGS. 76 and 77, plug 254 is shown installed with cap 251'.

FIG. 76 is a highly generalized representation of reservoir 256 formed in roller 257 and which has open end 256A, and, again, this is a conventional and well-known arrangement in the art. Gasket 253 and flange 265 of cap 251' relate to open end 256A to reservoir 256. In the installation of assembly 250 to reservoir 256, gasket 253 is applied to open end 256A, and cap 251' is taken up and inner face 262 is directed toward open end 256A and cap is then moved toward open end 256A so as to apply inner face 262 of flange 265 of sealing body 260 of cap 251' against gasket 253. Flange 265 is then secured in place to open end 256A closing open end 256A with cap 251', whereby sealing body 260 spans open end 256A of reservoir 256 and gasket 253 is applied between open end 256A of reservoir 256 and flange 265, which provides a fluid-impervious seal between sealing body 260 and open end 256A. With assembly 250 so installed, outer face 261 of sealing body 260 faces away from open end 256A and opposed inner face 262 faces open end 256A to reservoir 256. Cap 251' is preferably installed with plug 254 applied to and closing port 252. However, plug 254 may be applied to close port 252 after cap 251' is installed on open end 256A of reservoir 256.

Like cap 251 of cap assembly 250 in FIG. 20, cap 251' is secured to open end 256A of reservoir with fasteners, which are preferably bolts. In this embodiment, flange 265 is formed with spaced-apart bolt holes 291, which relate or otherwise correspond to bolt holes (not shown in FIG. 76) formed in open end 256A of reservoir 256. In the application of cap assembly 1000 to open end 256A of reservoir, bolt holes 291 of flange 265 of cap 251' are registered with the corresponding bolt holes formed in open end 256A of reservoir 256, the bolts are applied to the aligned bolt holes 291 and are threaded into the corresponding bolt holes formed in open end 256A of reservoir 256 and are then tightened so as to secure assembly 250 in place as in FIG. 76. In the present embodiment there are eight bolt holes in open end 256A of reservoir 256, and there are eight bolt holes 291 in cap 251' that correspond with the eight bolt holes formed in open end 256A.

And so having secured assembly 250 in place to open end 256A of reservoir 256 closing open end 256A and with plug 254 installed in place in its closed position closing port 252, a volume of lubricating 300 is then applied to reservoir 256 in the conventional manner, whereby roller 257 is then prepared and ready for use in the operation of a vehicle incorporating roller 257 in the normal manner. As cap 251' is transparent, sealing body 260 spanning open end 256A of reservoir 256 is transparent to provide visual access therethrough in the direction indicated by arrowed line A into reservoir 256 through open end 256A for lubricating oil level and quality monitoring purposes, in accordance with the principle of the invention.

In the normal and customary operational position of roller 257, reservoir 256 is horizontal and open end 256A is vertical, and this orientation is clearly depicted in FIG. 76. In this orientation of reservoir 256 and open end 256A, cap 251' is vertically disposed such that sealing body 260 extends vertically across open end 256A of reservoir 256. The volume of lubricating oil 300 applied to reservoir 256 thus extends upwardly into reservoir 256 along inner face 262 of sealing body 260 to level 300A just below port 252 closed and sealed by plug 254. Again, the transparent character of sealing body 260 provides visual access therethrough into lubricating oil reservoir 256 through open end 256A for lubricating oil 300 level 300A and quality monitoring purposes. As the volume of lubricating oil 300 is readily and easily visualized through sealing body 260, level 300A of oil can easily be seen as can the quality of the volume of lubricating oil 300. Should level 300A of the volume of lubricating oil 300 be seen as too low, it may be replenished. Should the quality of the volume of lubricating oil 300 be seen as compromised, such as by dirt and debris, the volume of lubricating oil 300 may be withdrawn from reservoir 256 and replaced. Port 252 is useful for replenishing and replacing lubricating oil in reservoir 256. To replenish the volume of lubricating oil 300 should level 300A fall to an unacceptably low level, plug 254 is detached from port 252 and moved to its open position to open port 252, replenishing oil is applied to reservoir 256 through open port 252, and port 252 is reclosed by reinstalling plug 254 to port 252 placing plug 254 back to its closed position closing and sealing port 252. To replace volume of lubricating oil 300 with a fresh volume of a lubricating oil, plug 254 is detached from port 252 and moved to its open position to open port 252, volume of lubricating oil 300 is withdrawn from reservoir 256 through port 252, a fresh volume of a lubricating oil is applied to reservoir 256 through port 252, and port 252 is reclosed by reinstalling plug 254 to port 252 placing plug 254 back to its closed position closing and sealing port 252.

In the vertical positioning of cap 251' as shown in FIG. 76 such that sealing body 260 extends vertically across open end 256A of reservoir 256, it is again emphasized that in the closed position of plug 254 applied to and closing port 252, plug 254 is positioned in depression 270 and extends outwardly from outer face 261 of sealing body 260 into depression 270 no further than horizon H2 of rim 271 thereby isolating plug 254 from shearing forces across outer face 261 of sealing body 260 that could otherwise rip plug 254 from port 252 or otherwise damage plug 254. These shearing forces can be applied by plants or crops or bushes or the like that brush across outer face 261 of sealing body 260 in the normal operation of roller 257 in the normal operation of the vehicle incorporating roller 257. More particularly, in the close position of plug 254 threaded in port 252 and tightened in place the underside of head 114 is tightened against outer face 261 of sealing body 260 at depression 270, and head 280 of plug 254 projects or otherwise extends outwardly from outer face 261 of sealing body 260 into depression 270 no further than horizon H2 of rim 271 thereby isolating head 280 of plug 254 from shearing forces across outer face 261 of sealing body 260 that, again, could otherwise rip plug 254 from port 252 or otherwise damage plug 254.

As best seen in FIG. 76, depression 1010 with raised rim 1011 are formed in outer face 261 of sealing body 260 proximate to perimeter extremity 265 at a location that is offset relative to the geometric center or central location of cap 251' at which depression 270, rim 271, and port 252 are formed. Depression 1010 is formed in outer face 261 of sealing body 260 proximate to perimeter extremity 265 of sealing body 260, and is encircled by rim 1011. Depression 1010 extends inwardly to drain port 1014 formed in sealing body 260 proximate to perimeter extremity 265. Drain port 1014 extends through sealing body 260 at depression 1010 from outer face 261 of sealing body 260 to inner face 262 of sealing body 260.

Drain port 1014 is adapted to receive a drain plug 1020 to close and seal port 1014. Plug 1020 is formed of a strong, hard, impact resistant, temperature resistant, chemical resistant, and non-conductive material or combination of materials, such as plastic, and consists of threaded post 1021 formed with enlarged head 1022. Gasket 1024, shown in FIGS. 73 and 76, encircles post 1021, and is located along the underside of head 1022. Post 1021 relates to drain port 1014 and is used to open and close drain port 1014, in which case drain plug 1020 is movable between an open position detached from and opening drain port 1020 as shown in FIGS. 72 and 73 to provide access therethrough to reservoir 256 depicted in FIG. 76 for lubricating oil draining purposes, and a closed position applied to and closing drain port 1014 in FIG. 76. Drain port 1014 inwardly threaded, and post 1021 of drain plug 1020 is correspondingly outwardly threaded. To apply and secure drain plug 1020 to drain port 1014, drain plug 1020 is taken up, such as by hand, and applied into depression 1010 in a direction toward outer face 261 and post 1021 is applied to drain port 1014 and is threaded into drain port 1014 through rotation and is tightened securing in place tightening the underside of head 1022 against outer face 261 at depression 1010. In the closed position of drain plug 1020 in FIG. 76, gasket 1024 is applied between head 1022 of drain plug 1020 and drain port 1014 providing a fluid-impervious seal between drain plug 1020 and drain port 1014.

As seen in FIG. 76, 1011 defines and extends along plane or horizon H8, and depression 1010 extends into outer face 261 and is defined inwardly from horizon H8. In the closed position of drain plug 1020 applied to and closing drain port 1014, drain plug 1020 is positioned in depression 1010 and extends outwardly from outer face 261 of sealing body 260 into depression 1010 no further than horizon H8 of rim 1011 thereby isolating drain plug 1020 from shearing forces across outer face 261 of sealing body 260 at the geometric center of, or otherwise the central location of, sealing body 260 of cap 251'. In a further and more specific aspect, in the close position of drain plug 1020 threaded in drain port 1014 and tightened in place the underside of head 114 is tightened against outer face 261 of sealing body 260 at depression 1010, and head 280 of drain plug 1020 projects or otherwise extends outwardly from outer face 261 of sealing body 260 into depression 1010 no further than horizon H8 of rim 1011 thereby isolating head 280 of drain plug 1020 from shearing forces across outer face 261 of sealing body 260 proximate to perimeter extremity 265 of sealing body 260 of cap 251'. In FIGS. 76 and 77 drain plug 1020 is shown installed with cap 251'.

In FIG. 76, gasket 253 is applied to open end 256A of reservoir 256, inner face 262 of cap 251' is directed toward open end 256A, and inner face 262 of flange 265 of sealing body 260 of cap 251' is applied against gasket 253. Flange 265 is secured in place to open end 256A as discussed above closing open end 256A with cap 251', whereby sealing body 260 spans open end 256A of reservoir 256 and gasket 253 is applied between open end 256A of reservoir 256 and flange 265, which provides a fluid-impervious seal between sealing body 260 and open end 256A. With assembly 250 so installed, outer face 261 of sealing body 260 faces away from open end 256A and opposed inner face 262 faces open end 256A to reservoir 256. Cap 251' is preferably installed with drain plug 1020 applied to and closing drain port 1014. However, drain plug 1020 may be applied to close drain port 1014 after cap 251' is installed on open end 256A of reservoir 256. Drain port 1014 closed with drain plug 1020 proximate to perimeter extremity 265 of sealing body 260 of cap 251' of assembly 1000 is positioned near the side of open end 256A along one side of reservoir 256.

With assembly 250 secured in place to open end 256A of reservoir 256 closing open end 256A and with drain plug 1020 installed in place in its closed position closing drain port 1014 and with plug 254 installed in place in its closed position closing port 252, the volume of lubricating 300 is applied to reservoir 256 in the conventional manner, whereby roller 257 is then prepared and ready for use in the operation of a vehicle incorporating roller 257 in the normal manner.

Again, in the normal and customary operational position of roller 257, reservoir 256 is horizontal and open end 256A is vertical, and this orientation is clearly depicted in FIG. 76. In this orientation of reservoir 256 and open end 256A, cap 251' is vertically disposed such that sealing body 260 extends vertically across open end 256A of reservoir 256. The volume of lubricating oil 300 applied to reservoir 256 extends upwardly into reservoir 256 along inner face 262 of sealing body 260 to level 300A just below drain port 1014 closed and sealed by drain plug 1020. Should the volume of lubricating oil 300 require replacement, lubricating oil in reservoir 256 may be drained through drain port 1014 located proximate to perimeter extremity 265 of sealing body 260 of cap 251' of assembly 1000 the side of open end 256A along one side of reservoir 256. Preferably, roller 257 is rotated, such as by driving the tracked vehicle incorporating roller over the ground, until drain port 1014 is located at a lowermost position under level 300A of volume of lubricating oil 300 as in FIG. 76. At this point, drain plug 1020 is detached from drain port 1014 and moved to its open position to open drain port 1014, in which gravity acting on the volume of lubricating oil automatically causes the volume of lubricating oil 300 to drain through drain port 1014 from open end 256 of reservoir 256. After draining the volume of lubricating oil 300 form reservoir 256 through drain port 1014, drain port 1014 is reclosed by reinstalling drain plug 1020 to drain port 1014 placing drain plug 1020 back to its closed position closing and sealing drain port 1014. To replace the drained volume of lubricating oil 300 with a fresh volume of a lubricating oil, plug 254 is detached from port 252 and moved to its open position to open port 252, a fresh volume of a lubricating oil is applied to reservoir 256 through port 252, and port 252 is reclosed by reinstalling plug 254 to drain 252 placing plug 254 back to its closed position closing and sealing port 252.

In the vertical positioning of cap 251' as shown in FIG. 76 such that sealing body 260 extends vertically across open end 256A of reservoir 256, it is again emphasized that in the closed position of drain plug 1020 applied to and closing drain port 1014, drain plug 1020 is positioned in depression 1010 and extends outwardly from outer face 261 of sealing body 260 into depression 1010 no further than horizon H8 of rim 1011 thereby isolating drain plug 1020 from shearing forces across outer face 261 of sealing body 260 at or otherwise proximate to perimeter extremity 265 of sealing body 260 that could otherwise rip drain plug 1020 from drain port 1014 or otherwise damage drain plug 1020. These shearing forces can be applied by plants or crops or bushes or the like that brush across outer face 261 of sealing body 260 at perimeter extremity 265 in the normal operation of roller 257 in the normal operation of the vehicle incorporating roller 257. More particularly, in the close position of drain plug 1020 threaded in drain port 1014 and tightened in place the underside of head 1022 is tightened against outer face 261 of sealing body 260 at depression 1010, and head 1022 of drain plug 1020 projects or otherwise extends outwardly from outer face 261 of sealing body 260 into depression 1010 no further than horizon H8 of rim 1011 thereby isolating head 1022 of drain plug 1020 from shearing forces across outer face 261 of sealing body 260 at or otherwise proximate to perimeter extremity 265 of sealing body 260 that, again, could otherwise rip drain plug 1020 from drain port 1014 or otherwise damage drain plug 1020.

As a matter of example, cap 251' of oil monitoring and maintenance cap assembly 1000 is substantially identical in design to cap 251 described in detail above. Depression 1010 with raised rim 1011, drain port 1014, and drain plug 1020 may be similarly incorporated into the caps of the remaining embodiments discussed throughout this specification.

The embodiments of the present invention presented herein are for illustrative purposes. Those skilled in the art will recognize that changes and modifications may be made in the described embodiments without departing from the nature and scope of the present invention. Various further changes and modifications to the embodiments herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. Apparatus, comprising:
    a reservoir has an open end closed by a sealing body, the sealing body includes a perimeter extremity engaged to the open end of the reservoir and spans the open end of the reservoir, the sealing body has an outer face facing away from the open end, an opposed inner face facing the open end to the reservoir, a depression with a rim formed in the outer face of the sealing body proximate to the perimeter extremity, the depression extends inwardly from the rim to a drain port formed in the sealing body proximate to the perimeter extremity, and the drain port extends through the sealing body at the depression from the outer face of the sealing body to the inner face of the sealing body;
    a drain plug movable between a first position detached and separated from the drain port and the sealing body so as to open the drain port to provide liquid draining therethrough from the open end of the reservoir, and a second position detachably attached to the drain port and the sealing body so as to close the drain port; and
    in the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body proximate to the perimeter extremity.

2. Apparatus according to claim 1, further comprising a gasket applied between the perimeter extremity of the sealing body and the open end of the reservoir for providing a fluid-impervious seal between the sealing body and the open end of the reservoir.

3. Apparatus according to claim 1, further comprising:
    a gasket applied to the drain plug; and
    in the second position of the drain plug, the gasket is applied between the drain plug and the drain port providing a fluid-impervious seal between the drain plug and the drain port.

4. A cap for closing an open end of a reservoir, comprising:
    a sealing body including a perimeter extremity engagable to the open end of the reservoir in a closure position of the sealing body spanning the open end of the reservoir, the sealing body has an outer face to face away from the open end of the reservoir in the closure position of the sealing body, an opposed inner face to face the open end of the reservoir in the closure position of the sealing body, a depression with a rim formed in the outer face of the sealing body proximate to the perimeter extremity, the depression extends inwardly from the rim to a drain port formed in the sealing body proximate to the perimeter extremity, and the drain port extends through the sealing body at the depression from the outer face of the sealing body to the inner face of the sealing body;
    a drain plug movable between a first position detached and separated from the drain port and the sealing body so as to open the drain port, and a second position detachably attached to the drain port and the sealing body so as to close the drain port; and
    in the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body.

5. The cap according to claim 4, further comprising a gasket positionable between the perimeter extremity of the sealing body and the open end of the reservoir in the closure position of the sealing body for providing a fluid-impervious seal between the closure body and the open end of the reservoir in the closure position of the sealing body.

6. The cap according to claim 4, further comprising a gasket positionable between the drain plug and the drain port in the second position of the drain plug for providing a fluid impervious seal between the drain plug and the drain port in the second position of the drain plug.

7. The cap according to claim 4, wherein the perimeter extremity of the sealing body is formed with spaced-apart openings to receive fasteners for fastening the perimeter extremity of the sealing body to the open end of the reservoir in the closure position of the sealing body.

8. Apparatus, comprising:
    a reservoir has an open end closed by a sealing body, the sealing body includes a perimeter extremity engaged to the open end of the reservoir and spans the open end of the reservoir, the sealing body has an outer face facing away from the open end, and an opposed inner face facing the open end to the reservoir;
    a first depression with a first rim formed in the outer face of the sealing body at a central location relative to the open end of the reservoir and the perimeter extremity, the first depression extends inwardly from the first rim to a first port formed in the sealing body at the central location, and the first port extends through the sealing body at the first depression from the outer face of the sealing body to the inner face of the sealing body;

a first plug movable between a first position detached and separated from the first port and the sealing body so as to open the first port to provide access therethrough to the reservoir, and a second position detachably attached to the first port and the sealing body so as to close the first port;

in the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location;

a second depression with a second rim formed in the outer face of the sealing body proximate to the perimeter extremity, the second depression extends inwardly from the second rim to a second port formed in the sealing body proximate to the perimeter extremity, and the second port extends through the sealing body at the second depression from the outer face of the sealing body to the inner face of the sealing body;

a second plug movable between a first position detached and separated from the second port and the sealing body so as to open the second port to provide liquid draining therethrough from the open end of the reservoir proximate to the perimeter extremity, and a second position detachably attached to the second port and the sealing body so as to close the second port; and in the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity.

9. Apparatus according to claim 8, further comprising a gasket applied between the sealing body and the open end of the reservoir for providing a fluid-impervious seal between the sealing body and the open end of the reservoir.

10. Apparatus according to claim 8, further comprising:
a gasket applied to the first plug; and
in the second position of the first plug, the gasket is applied between the first plug and the first port providing a fluid-impervious seal between the first plug and the first port.

11. Apparatus according to claim 8, further comprising:
a gasket applied to the second plug; and
in the second position of the second plug, the gasket is applied between the second plug and the second port providing a fluid-impervious seal between the second plug and the second port.

12. A cap for closing an open end of a reservoir, comprising:
a sealing body including a perimeter extremity engagable to the open end of the reservoir in a closure position of the sealing body spanning the open end of the reservoir, the sealing body has an outer face to face away from the open end of the reservoir in the closure position of the sealing body, and an opposed inner face to face the open end of the reservoir in the closure position of the sealing body;
a first depression with a first rim formed in the outer face of the sealing body at a central location relative to the perimeter extremity, the first depression extends inwardly from the first rim to a first port formed in the sealing body at the central location, and the first port extends through the sealing body at the first depression from the outer face of the sealing body to the inner face of the sealing body;

a first plug movable between a first position detached and separated from the first port and the sealing body so as to open the first port, and a second position detachably attached to the first port and the sealing body so as to close the first port;

in the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location;

a second depression with a second rim formed in the outer face of the sealing body proximate to the perimeter extremity, the second depression extends inwardly from the second rim to a second port formed in the sealing body proximate to the perimeter extremity, and the second port extends through the sealing body at the second depression from the outer face of the sealing body to the inner face of the sealing body;

a second plug movable between a first position detached and separated from the second port and the sealing body so as to open the second port to provide liquid draining therethrough from the open end of the reservoir proximate to the perimeter extremity, and a second position detachably attached to the second port and the sealing body so as to close the second port; and in the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity.

13. The cap according to claim 12, further comprising a gasket positionable between the perimeter extremity of the sealing body and the open end of the reservoir in the closure position of the sealing body for providing a fluid-impervious seal between the closure body and the open end of the reservoir in the closure position of the sealing body.

14. The cap according to claim 12, wherein the perimeter extremity of the sealing body is formed with spaced-apart openings to receive fasteners for fastening the perimeter extremity of the sealing body to the open end of the reservoir in the closure position of the sealing body.

15. The cap according to claim 12, further comprising a gasket positionable between the first plug and the first port in the second position of the first plug for providing a fluid impervious seal between the first plug and the first port in the second position of the first plug.

16. The cap according to claim 12, further comprising a gasket positionable between the second plug and the second port in the second position of the second plug for providing a fluid impervious seal between the second plug and the second port in the second position of the second plug.

17. Apparatus, comprising:
a roller of a tracked vehicle, the roller formed with a lubricating oil reservoir having an open end closed by a sealing body, the sealing body includes a perimeter extremity engaged to the open end of the reservoir and spans the open end of the reservoir, the sealing body has an outer face facing away from the open end, an opposed inner face facing the open end to the reservoir, a depression with a rim formed in the outer face of the sealing body proximate to the perimeter extremity, the depression extends inwardly from the rim to a drain port formed in the sealing body proximate to the perimeter extremity, and the drain port extends through the sealing body at the depression from the outer face of the sealing body to the inner face of the sealing body;

a drain plug movable between a first position detached and separated from the drain port and the sealing body so as to open the drain port to provide liquid draining therethrough from the open end of the reservoir, and a second position detachably attached to the drain port and the sealing body so as to close the drain port; and in the second position of the drain plug detachably attached to the drain port thereby closing the drain port, the drain plug is positioned in the depression and extends outwardly from the outer face of the sealing body no further than the rim isolating the drain plug from shearing forces across the outer face of the sealing body proximate to the perimeter extremity.

18. Apparatus according to claim 17, further comprising a gasket applied between the perimeter extremity of the sealing body and the open end of the reservoir for providing a fluid-impervious seal between the sealing body and the open end of the reservoir.

19. Apparatus according to claim 17, further comprising:
a gasket applied to the drain plug; and
in the second position of the drain plug, the gasket is applied between the drain plug and the drain port providing a fluid-impervious seal between the drain plug and the drain port.

20. Apparatus, comprising:
a roller of a tracked vehicle, the roller formed with a horizontal lubricating oil reservoir having a vertical open end closed by a sealing body, the sealing body includes a perimeter extremity engaged to the open end of the reservoir and spans the open end of the reservoir, the sealing body has an outer face facing away from the open end, and an opposed inner face facing the open end to the reservoir;

a first depression with a first rim formed in the outer face of the sealing body at a central location relative to the open end of the reservoir and the perimeter extremity, the first depression extends inwardly from the first rim to a first port formed in the sealing body at the central location, and the first port extends through the sealing body at the first depression from the outer face of the sealing body to the inner face of the sealing body;

a first plug movable between a first position detached and separated from the first port and the sealing body so as to open the first port to provide access therethrough to the reservoir for lubricating oil replenishment purposes, and a second position detachably attached to the first port and the sealing body so as to close the first port;

in the second position of the first plug detachably attached to the first port thereby closing the first port, the first plug is positioned in the first depression and extends outwardly from the outer face of the sealing body no further than the first rim isolating the first plug from shearing forces across the outer face of the sealing body at the central location;

a second depression with a second rim formed in the outer face of the sealing body proximate to the perimeter extremity, the second depression extends inwardly from the second rim to a second port formed in the sealing body proximate to the perimeter extremity, and the second port extends through the sealing body at the second depression from the outer face of the sealing body to the inner face of the sealing body;

a second plug movable between a first position detached and separated from the second port and the sealing body so as to open the second port to provide lubricating oil draining therethrough from the open end of the reservoir proximate to the perimeter extremity, and a second position detachably attached to the second port and the sealing body so as to close the second port; and in the second position of the second plug detachably attached to the second port thereby closing the second port, the second plug is positioned in the second depression and extends outwardly from the outer face of the sealing body no further than the second rim isolating the second plug from shearing forces across the outer face of the sealing body proximate to the perimeter extremity.

21. Apparatus according to claim 20, further comprising a gasket applied between the sealing body and the open end of the reservoir for providing a fluid-impervious seal between the sealing body and the open end of the reservoir.

22. Apparatus according to claim 20, further comprising:
a gasket applied to the first plug; and
in the second position of the first plug, the gasket is applied between the first plug and the first port providing a fluid-impervious seal between the first plug and the first port.

23. Apparatus according to claim 20, further comprising:
a gasket applied to the second plug; and
in the second position of the second plug, the gasket is applied between the second plug and the second port providing a fluid-impervious seal between the second plug and the second port.

* * * * *